United States Patent
Kondo et al.

(10) Patent No.: US 7,460,178 B2
(45) Date of Patent: Dec. 2, 2008

(54) IMAGE PROCESSING APPARATUS AND IMAGE PROCESSING METHOD

(75) Inventors: Tetsujiro Kondo, Tokyo (JP); Hideo Nakaya, Kanagawa (JP); Nobuyuki Yamaguchi, Kanagawa (JP); Katsuhisa Shinmei, Tokyo (JP)

(73) Assignee: Sony Corporation, Tokyo (JP)

( * ) Notice: Subject to any disclaimer, the term of this patent is extended or adjusted under 35 U.S.C. 154(b) by 588 days.

(21) Appl. No.: 11/116,393

(22) Filed: Apr. 28, 2005

(65) Prior Publication Data

US 2005/0264693 A1    Dec. 1, 2005

(30) Foreign Application Priority Data

May 14, 2004 (JP) ............................. 2004-145558
May 14, 2004 (JP) ............................. 2004-145559

(51) Int. Cl.
*H04N 9/64* (2006.01)
*H04N 5/445* (2006.01)

(52) U.S. Cl. .................. 348/576; 348/564; 348/678; 345/589; 382/167

(58) Field of Classification Search ................ 348/576, 348/571, 563, 564, 569, 561, 562, 588, 678, 348/687, 587, 578; 345/589, 593; 382/167
See application file for complete search history.

(56) References Cited

U.S. PATENT DOCUMENTS

| 5,898,436 | A  | * | 4/1999  | Stewart et al. .............. 345/594 |
| 6,333,752 | B1 | * | 12/2001 | Hasegawa et al. ........... 715/764 |
| 6,839,064 | B2 | * | 1/2005  | Nakami ...................... 345/556 |

* cited by examiner

*Primary Examiner*—M. Lee
(74) *Attorney, Agent, or Firm*—Oblon, Spivak, McClelland, Maier & Neustadt, P.C.

(57) ABSTRACT

An image processing apparatus executes image processing on an original image. The image processing apparatus includes a display unit configured to display adjusting images each corresponding to a part or the entirety of the original image; a setting unit allowing setting of values of parameters defining respective degrees of the image processing for the adjusting images such that the values differ among the adjusting images; and an operating unit allowing specification of one of the adjusting images by an external operation. When one of the adjusting images is specified using the operating unit, the setting unit modifies the values of the parameters defining the respective degrees of the image processing for the other adjusting images so that the values for the other adjusting images are approximated to the values for the specified adjusting image. The display unit displays the adjusting images according to the respective modified degrees of the image processing.

12 Claims, 44 Drawing Sheets

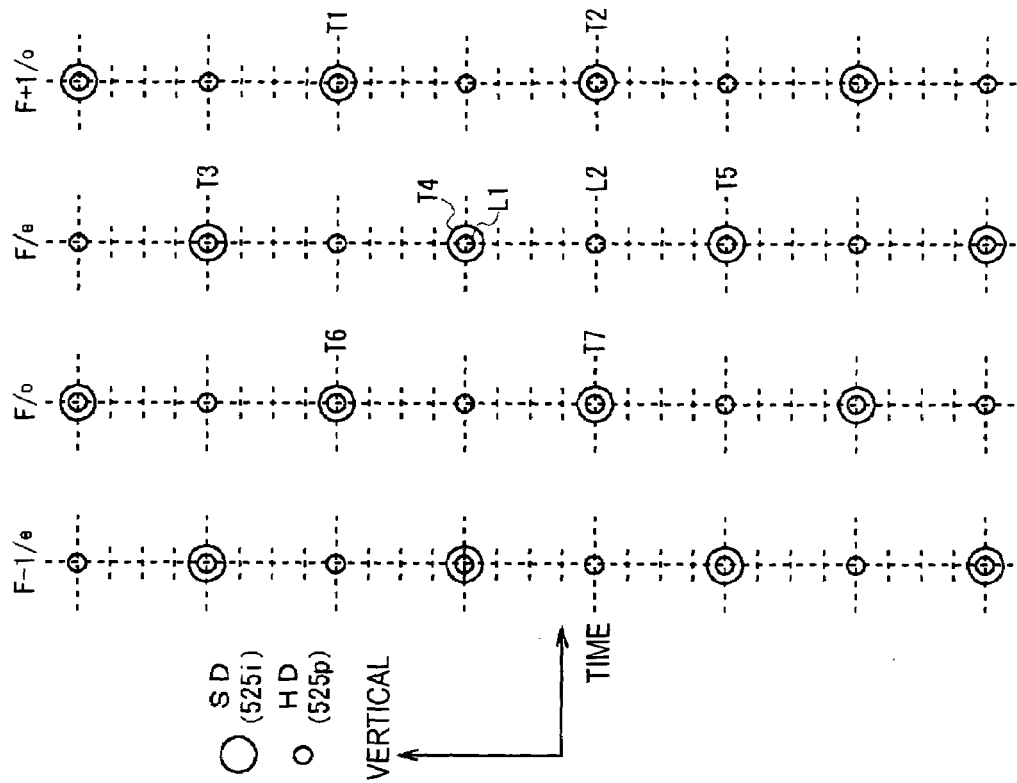
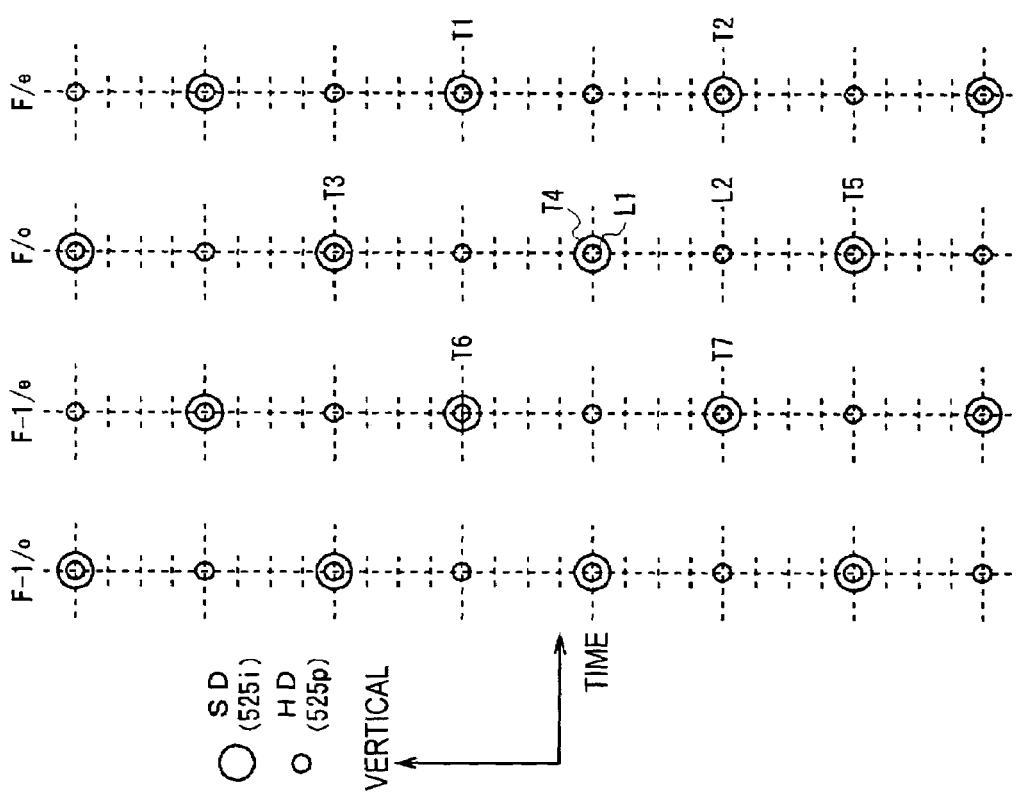

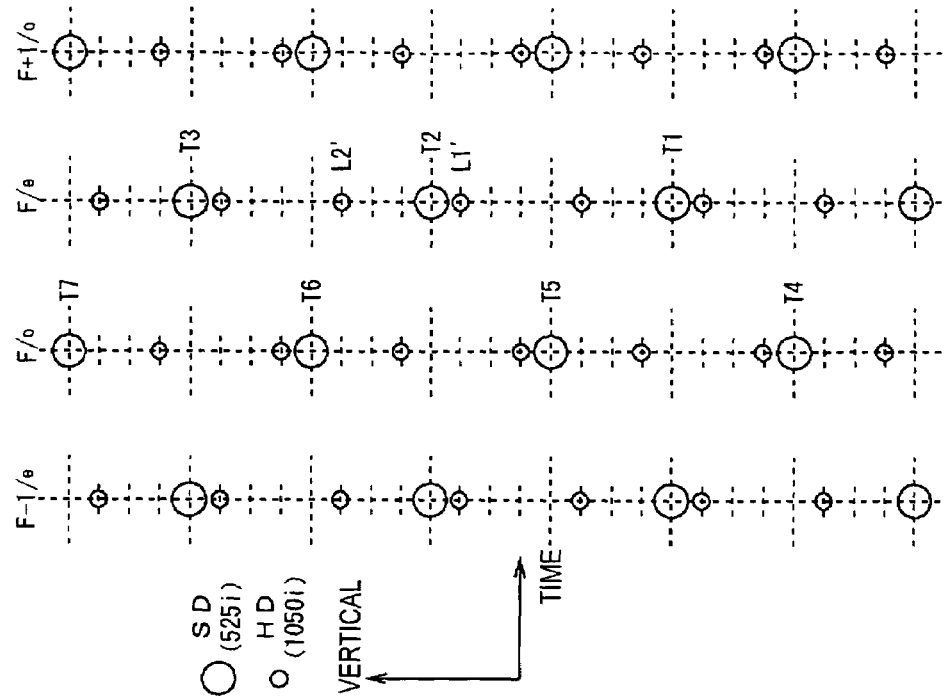
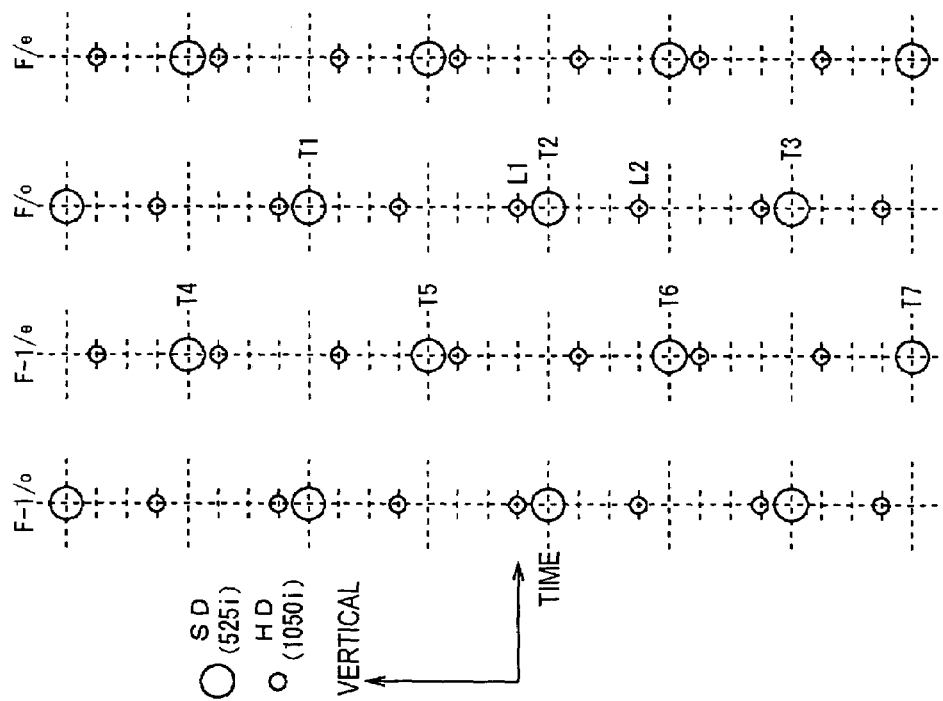

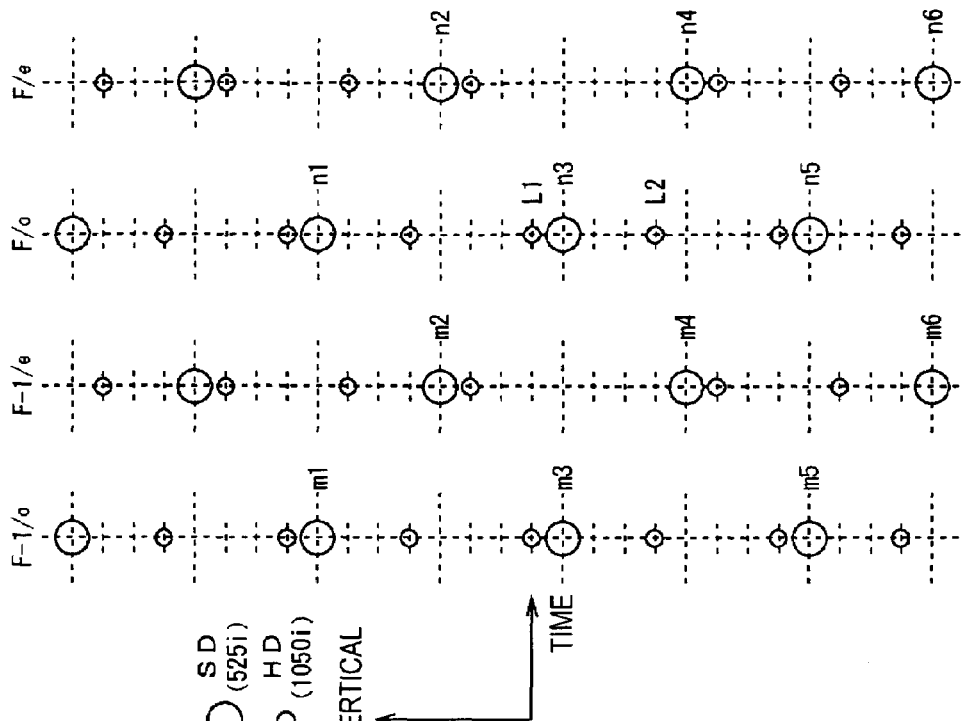
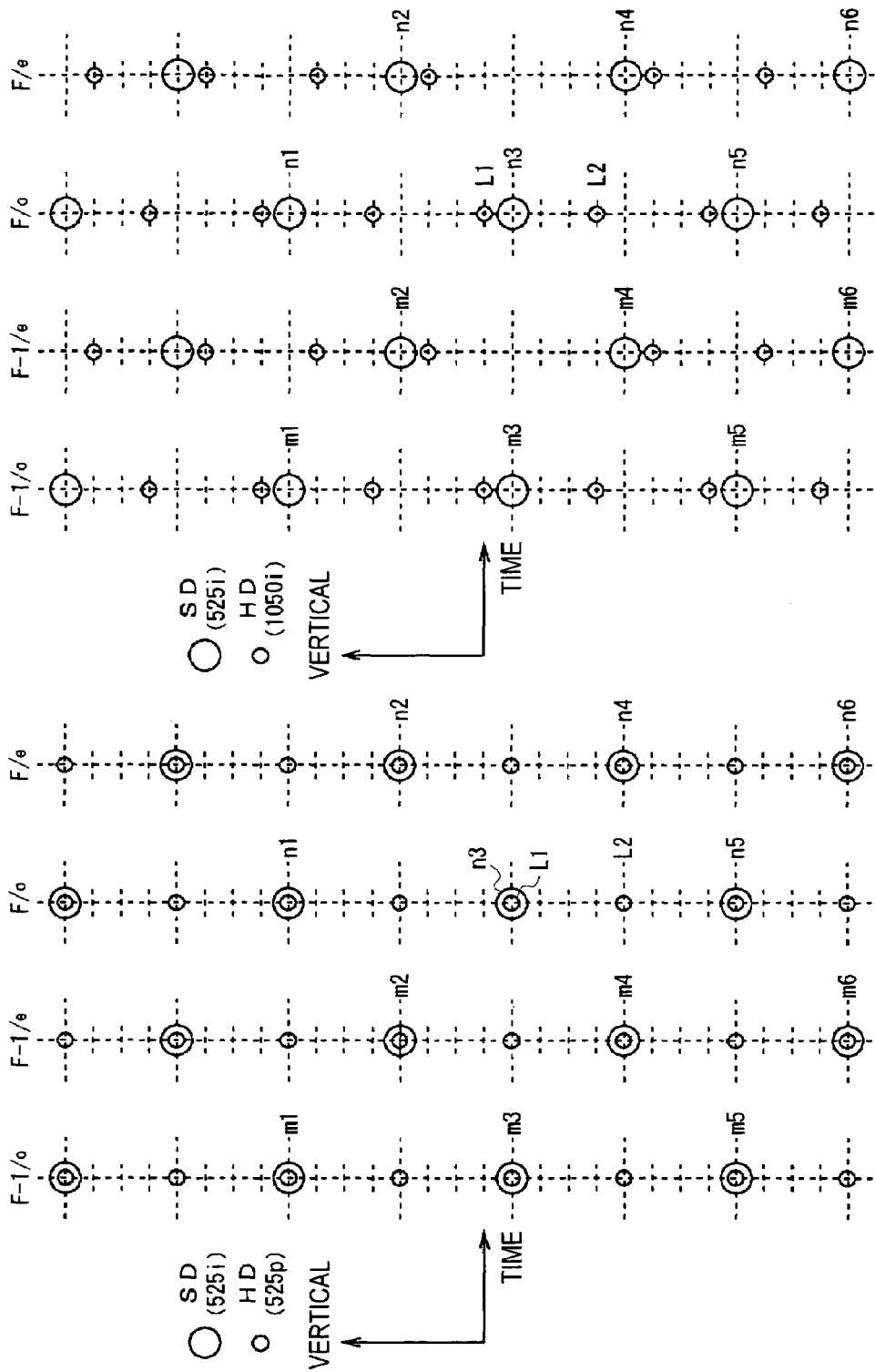

| VALUE OF PARAMETER P | FUNCTION |
|---|---|
| $P_1$ | INCREASE RESOLUTION |
| $P_2$ | SUPPRESS NOISE |
| $P_3$ | MPEG DECODING (RATE a) |
| $P_4$ | MPEG DECODING (RATE b) |
| $P_5$ | CONVERT COMPOSITE SIGNALS INTO COMPONENT SIGNALS |
| $P_6$ | JPEG DECODING |

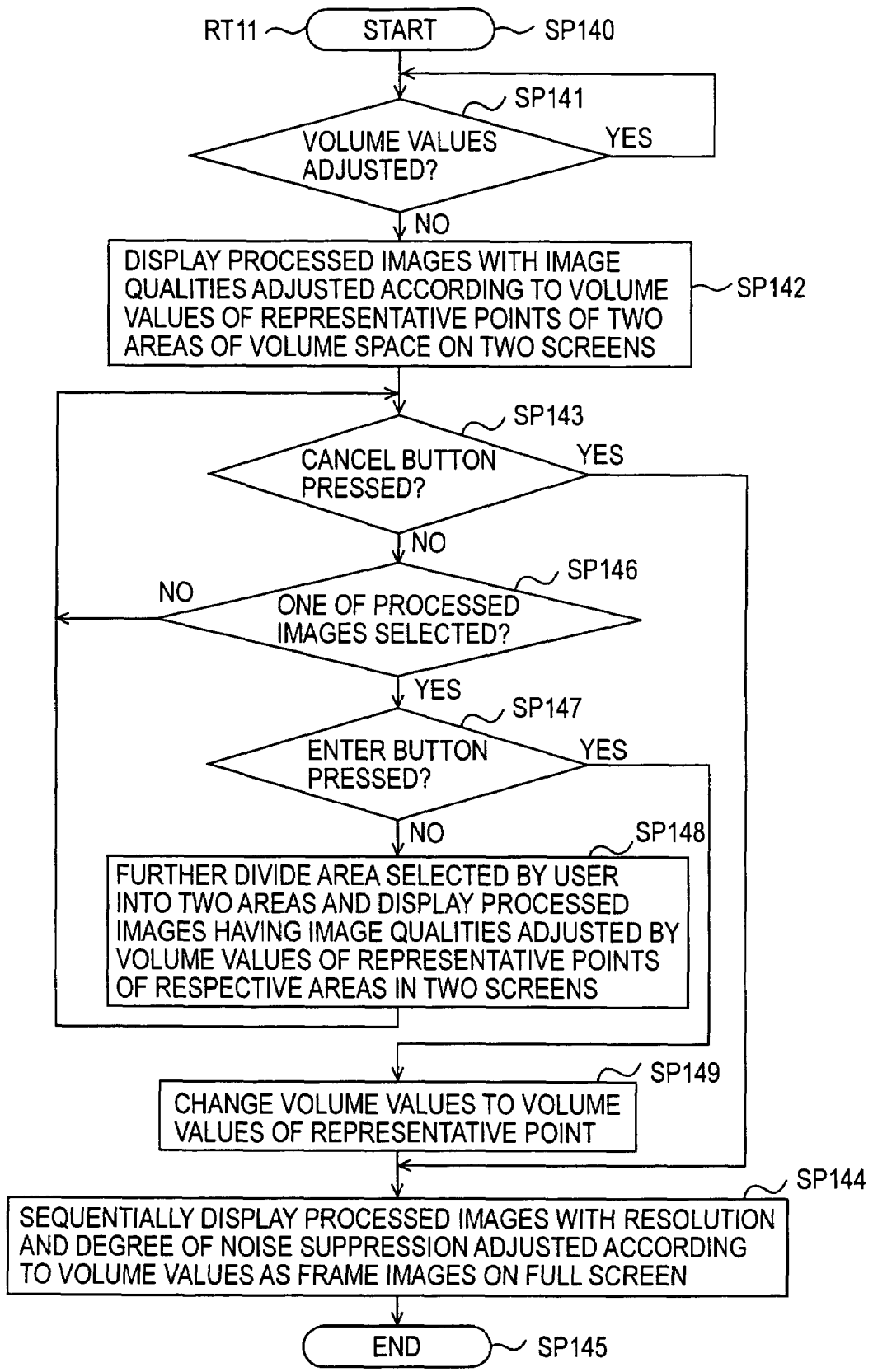

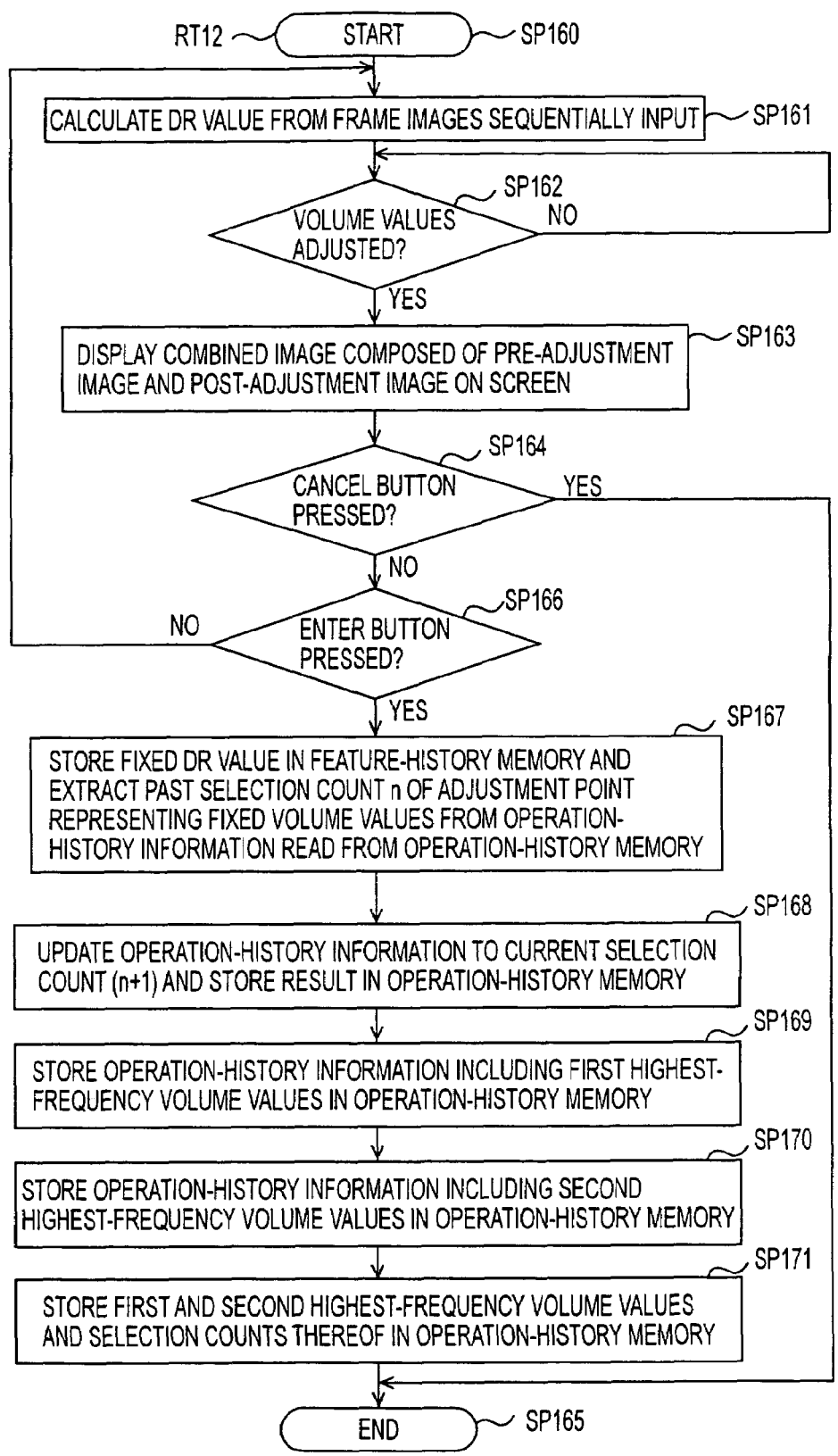

IMAGE PROCESSING APPARATUS AND IMAGE PROCESSING METHOD

CROSS REFERENCES TO RELATED APPLICATIONS

The present invention contains subject matter related to Japanese Patent Applications JP 2004-145558 and 2004-145559 both filed in the Japanese Patent Office on May 14, 2004, the entire contents of which are incorporated herein by reference.

BACKGROUND OF THE INVENTION

1. Field of the Invention

The present invention relates to image processing apparatuses and image processing methods, and can be suitably applied, for example, to television receivers.

2. Description of the Related Art

Television receivers of a type that allow up-conversion, for example, from an NTSC (National Television System Committee) video signal into a high-definition television signal that has a higher resolution and that is more realistic, have been proposed and implemented.

In the high-definition signal, the number of scanning lines is 1,125, which is twice as large compared with the current television system, and the aspect ratio is 9:16, i.e., the horizontal size is larger compared with the current television system.

Generally, functions for adjusting image quality, such as contrast or sharpness, are provided in television receivers so that a user is allowed to adjust image quality to achieve a desired display status.

Recently, television receivers of a type have been proposed that allow a plurality of parameters to be adjusted independently while maintaining correlation, as in the case of adjusting resolution or the degree of removing noise (e.g., refer to Japanese Unexamined Patent Application Publication No. 2002-218413), in addition to adjustment of image quality based on a single parameter such as contrast or sharpness.

In the television receiver, for example, when horizontal resolution and vertical resolution are simultaneously adjusted to adjust image quality, first, an adjusting screen of a desired size is superposed on a display screen of a monitor. In the adjusting screen, a two-dimensional coordinate system is set, allowing the value of a parameter defining horizontal resolution to be adjusted along the horizontal axis while allowing the value of a parameter defining vertical resolution to be adjusted along the vertical axis.

In the adjusting screen, for example, an icon representing a star mark is displayed. When a user operates a joystick, cross-shaped button, or the like of a remote controller in a desired direction, the icon in the adjusting screen is moved in accordance with the operation, and the entire display screen is adjusted to horizontal and vertical resolutions corresponding to the current position of the icon.

Also, video display apparatuses of a type that up-convert a standard-definition (SD) television signal obtained from a received broadcasting signal into a high-definition (HD) signal by image conversion such as classification and adaptation have been proposed.

In the classification and adaptation, an input SD image is converted into an HD image having a higher resolution, for example, with respect to the spatial axis, based on predetermined coefficients generated in advance. Video display apparatuses of a type that allow a user to adjust image quality along volume axes representing resolution and the degree of noise suppression have also been proposed (e.g., Japanese Unexamined Patent Application Publication NO. 2002-218414).

Also, in another proposed type of video display apparatuses (e.g., Japanese Unexamined Patent Application Publication No. 2003-224830), in classification and adaptation, history of operation by a user is stored in a memory in advance. When the user adjusts volume values for adjusting image quality such as resolution or the degree of noise suppression, the operation history is read from the memory and analyzed to reflect the operation history on image processing.

SUMMARY OF THE INVENTION

When a plurality of parameters is simultaneously adjusted, two much flexibility is provided. Thus, it is laborious for a user who is unfamiliar with such operations to adjust the parameters to desired values.

Furthermore, even when the user adjusts the plurality of parameters simultaneously, the user views a single display screen. Thus, it is difficult for the user to recognize the degree of change in image quality on the display screen before and after the adjustment.

In the video display apparatus described earlier, a single classification and adaptation circuit is used or a single LSI (large-scale integration) chip of classification and adaptation circuit is used, and each time the user adjusts the volume value to achieve desired image quality, an image after the adjustment is displayed.

Thus, the user is not allowed to visually check both an image processed according to volume values before adjustment and an image processed according to volume values after adjustment simultaneously. Therefore, it is difficult for the user to determine whether the image after adjustment has a resolution closer to a desired resolution than the image before adjustment.

For human beings, it is easier to directly compare two objects both in view, so that the method of displaying images before and after the adjustment separately is not suitable for the characteristics of the human vision.

Furthermore, in the method of displaying the images before and after the adjustment separately with respect to time, when the user wishes to return to the value before adjustment after adjusting the volume value to a certain value, the image changes in real time each time the volume value is adjusted, so that it is often difficult to return to the accurate volume value before adjustment, particularly when the volume value is changed by an incorrect operation or when the user has adjusted the volume value a number of times as intended but has forgotten the volume value before adjustment.

According to the method of reflecting operation history of the user on image processing as disclosed in Japanese Unexamined Patent Application Publication No. 2003-224830, problems could arise if the operation history is used in all cases. More specifically, since operation history is stored in a memory as user's intentions even when the volume value is changed by an incorrect operation or when the user quits adjustment in the middle after adjusting the volume value a number of times as intended, so that operation history unwanted for the user is analyzed and reflected on image processing.

As described above, when a single classification and adaptation circuit is used or when a single LSI chip of classification and adaptation circuit is used, when generating processed images and displaying the processed images in real time on a screen, ease of operations by a user is not satisfactory, and analysis of operation history is complex, posing difficult problems in practice.

It is desired that an image processing apparatus and an image processing method that allow the degree of adjustment of image quality or image processing to be readily adjusted in accordance with user's preferences.

According to an embodiment of the present invention, an image processing apparatus for executing predetermined image processing on an original image that is based on image signals supplied is provided. The image processing apparatus includes display means for displaying a plurality of adjusting images each corresponding to a part or the entirety of the original image; setting means for setting values of a plurality of parameters defining respective degrees of the image processing for the adjusting images such that the values differ among the plurality of adjusting images; and operating means for specifying one of the plurality of adjusting images by an external operation. When one of the plurality of adjusting images is specified using the operating means, the setting means, with reference to the degree of the image processing for the specified adjusting image, modifies the values of the plurality of parameters defining the respective degrees of the image processing for the other adjusting images so that the values for the other adjusting images are approximated to the values for the specified adjusting image. The display means displays the adjusting images according to the respective degrees of the image processing modified by the setting means.

According to the image processing apparatus, a user can finally achieve a desired degree of image processing simply by specifying an adjusting image having a desired degree of image processing a number of times while viewing a plurality of adjusting images displayed on the display means. Thus, the user is readily allowed to visually check the degrees of image quality before and after the adjustment. Furthermore, adjustment can be readily performed without the laboriousness of adjusting a plurality of parameters simultaneously.

According to another embodiment of the present invention, an image processing method for executing predetermined image processing on an original image that is based on image signals supplied is provided. The image processing method includes the steps of displaying a plurality of adjusting images corresponding to a part or the entirety of the original image, and setting values of a plurality of parameters defining respective degrees of the image processing for the adjusting images such that the values differ among the plurality of adjusting images; when one of the plurality of adjusting images is specified by an external operation, modifying the values of the plurality of parameters defining the respective degrees of the image processing for the other adjusting images with reference to the degree of the image processing for the specified adjusting image so that the values for the other adjusting images are approximated to the values for the specified adjusting image; and displaying the adjusting images according to the respective modified degrees of the image processing.

According to the image processing method, a user can finally achieve a desired degree of image processing simply by specifying an adjusting image having a desired degree of image processing a number of times while viewing a plurality of adjusting images displayed. Thus, the user is readily allowed to visually check the degrees of image quality before and after the adjustment. Furthermore, adjustment can be readily performed without the laboriousness of adjusting a plurality of parameters simultaneously.

According to another embodiment of the present invention, a video processing apparatus for executing predetermined video processing on a video image that is based on video signals supplied is provided. The video processing apparatus includes a plurality of image converting means for executing image conversion on each frame image of the video image through a plurality of processing lines; video display means for displaying, on a frame basis, a plurality of processed images obtained by the image conversion by the plurality of image converting means, so that all the plurality of processed images are entirely or partially included simultaneously in a display screen; operation inputting means for specifying, by an external operation, one of the plurality of processed images simultaneously displayed on the video display means, and for setting a volume value representing a degree of adjustment of image quality for the specified processed image; and display setting means for adjusting the image quality of the processed image specified using the operation inputting means according to the volume value set for the processed image, and for displaying the resulting processed image on a frame basis on the video display means.

According to the video processing apparatus, a user is allowed to readily adjust image quality by directly comparing images that are displayed simultaneously, so that the user can adjust image quality efficiently by adjusting a volume value. Furthermore, the user can readily find a volume value corresponding to an image quality that the user individually desires.

The display setting means may include storage means for storing frequencies representing the numbers of times that respective volume values have been set using the operation inputting means as volume values representing degrees of adjustment of image quality in a volume space in which a plurality of types of adjustment of image quality is allowed. In that case, when desired volume values are set using the operation inputting means, the frequencies of the respective volume values are read from the storage means, and smaller step sizes are set for the volume values as the frequencies become higher while larger step sizes are set for the volume values as the frequencies become lower.

According to the video processing apparatus, each time the user performs a predetermined operation for adjusting the volume value, the volume value representing the degree of adjustment of image quality can be approximated to a value desired by the user in a relatively short time, and delicate adjustment is allowed in the vicinity of the desired value.

According to another embodiment of the present invention, a video processing method for executing predetermined image processing on a video image that is based on video signals supplied is provided. The video processing method includes the steps of executing image conversion on each frame image of the video image through a plurality of processing lines; displaying, on a frame basis, a plurality of processed images obtained by the image conversion through the plurality of processing lines, so that all the plurality of processed images are entirely or partially included simultaneously in a display screen; and when one of the plurality of processed images simultaneously displayed in the display screen is specified by an external operation and a volume value representing a degree of adjustment of image quality for the specified processed image is set, adjusting the image quality of the processed image according to the volume value set for the processed image, and displaying the resulting processed image on a frame basis in the display screen.

According to the video processing method, a user is allowed to readily adjust image quality by directly comparing images that are displayed simultaneously, so that the user can adjust image quality efficiently by adjusting a volume value. Furthermore, the user can readily find a volume value corresponding to an image quality that the user individually desires.

Furthermore, frequencies representing the numbers of times that respective volume values have been set using the operation inputting means as volume values representing degrees of adjustment of image quality in a volume space in which a plurality of types of adjustment of image quality is allowed may be stored. In that case, when desired volume values are set, the frequencies of the respective volume values stored are read, and smaller step sizes are set for the volume values as the frequencies become higher while larger step sizes are set for the volume values as the frequencies become lower.

According to the video processing apparatus, each time the user performs a predetermined operation for adjusting the volume value, the volume value representing the degree of adjustment of image quality can be approximated to a value desired by the user in a relatively short time, and delicate adjustment is allowed in the vicinity of the desired value.

BRIEF DESCRIPTION OF THE DRAWINGS

FIGS. 8A and 8B are schematic diagrams for explaining relationship between the positions of pixels of an SD signal (525*i* signal) and an HD signal (525*p* signal) and examples of spatial-class taps;

FIGS. 9A and 9B are schematic diagrams for explaining relationship between the positions of pixels of an SD signal (525*i* signal) and an HD signal (1050*i* signal) and examples of spatial-class taps;

FIGS. 10A and 10B are schematic diagrams for explaining relationship between the positions of pixels of an SD signal (525*i* signal) and an HD signal (525*p* signal and 1050*i* signal) and examples of motion-class taps;

FIG. 49 is a flowchart of a volume-value adjusting routine according to a fifth embodiment of the present invention;

FIG. 51 is a flowchart of an operation-history maintaining routine according to a sixth embodiment of the present invention.

DESCRIPTION OF THE PREFERRED EMBODIMENTS

Now, embodiments of the present invention will be described with reference to the drawings.

(1) Overall Construction of Television Receiver According to First Embodiment

Figure 1:
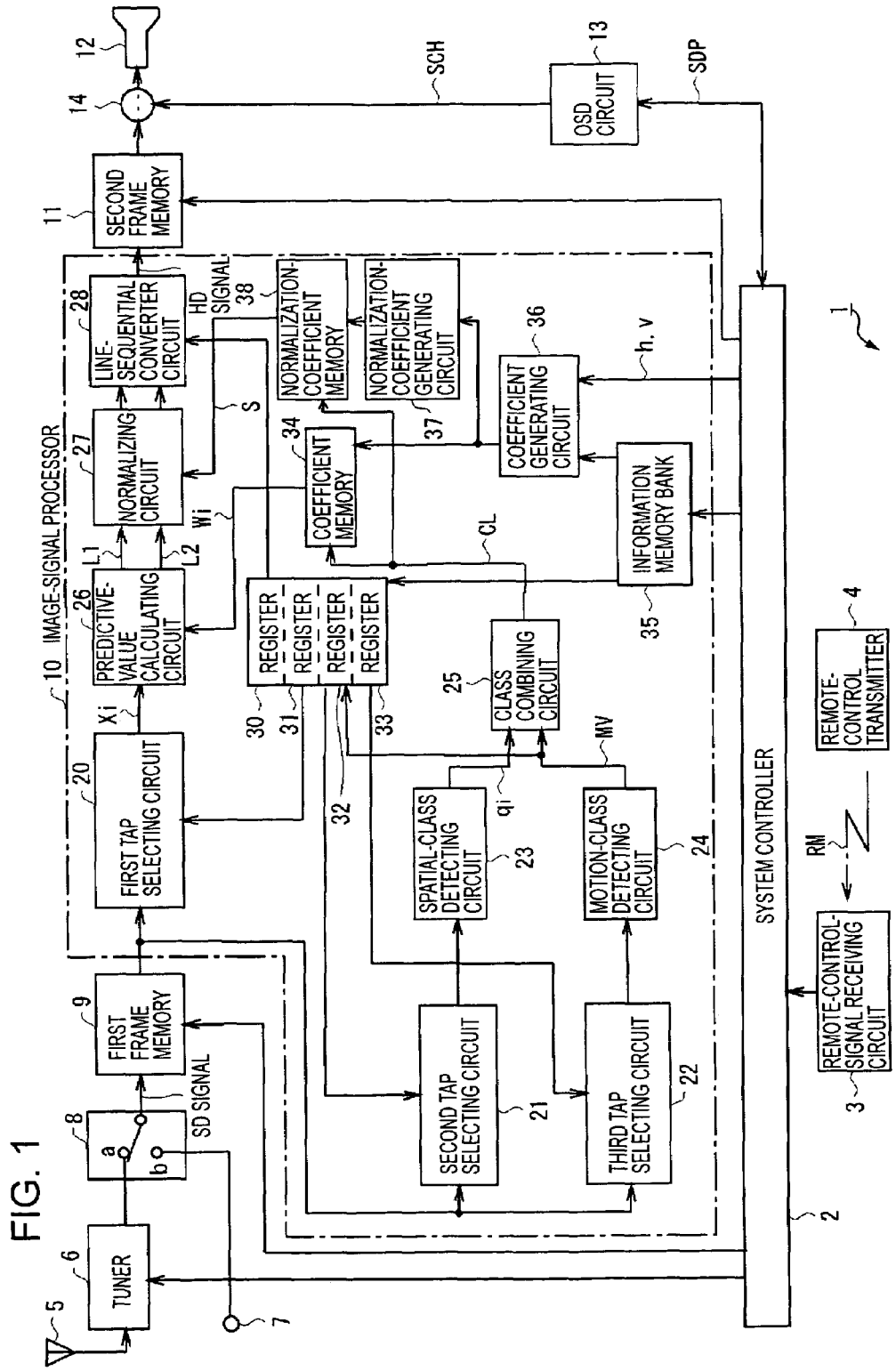
FIG. 1 is a block diagram showing the construction of a television receiver according to an embodiment of the present invention.

Referring to FIG. 1, a television receiver 1 according to a first embodiment of the present invention up-converts a standard-definition (SD) signal obtained from a received broadcasting signal into a high definition (HD) signal.

The SD signal is an interlaced video signal having 525 lines (525$i$ signal), and the HD signal is a progressive (non-interlaced) video signal having 525 lines (525$p$ signal) or an interlaced video signal having 1,050 lines (1050$i$ signal).

The television receiver 1 is implemented using a microcomputer, and it includes a system controller 2 that controls the overall system, and a remote-control-signal receiving circuit 3 that receives remote-control signals RM transmitted from an external remote-control transmitter 4.

The remote-control-signal receiving circuit 3 is connected to the system controller 2. The remote-control-signal receiving circuit 3 receives remote-control signals RM output from the remote-control transmitter 4 according to user's operations, and sends operation signals corresponding to the signals RM to the system controller 2.

When a broadcasting signal (RF modulated signal) is fed to a tuner 6 via a receiving antenna 5, the tuner 6 selects a channel, amplifies an intermediate-frequency signal, and detects a signal to obtain an SD signal (525$i$ signal), which is fed to an input terminal a of a selector switch 8. Furthermore, an SD signal (525$i$ signal) fed to another input terminal b of the selector switch 8 via an external input terminal 7.

The system controller 2 controls switching of the selector switch 8 so that an SD signal (525$i$ signal) fed from one of the input terminals a and b as specified by a user is fed to a first frame memory 9 and temporarily stored therein.

Furthermore, an image-signal processor 10 is provided at a subsequent stage of the first frame memory 9. The image-signal processor 10, under the control of the system controller 2, up-converts an SD signal (525$i$ signal) read from the first frame memory 9 into an HD signal (525$p$ signal or 1050$i$ signal).

At a subsequent stage of the image-signal processor 10, a second frame memory 11 is provided. The system controller 2 temporarily stores an HD signal (525$p$ signal or 1050$i$ signal) output from the image-signal processor 10 as needed.

Furthermore, an on-screen display (OSD) circuit 13 is provided between the system controller 2 and a combiner 14. When a reading instruction is issued as needed from the system controller 2, the OSD circuit 13 reads a display pattern based on the reading instruction from among various display patterns such as characters or graphics stored in advance, and supplies it to the combiner 14 as a display signal SCH.

Then, the system controller 2 combines the HD signal fed to the combiner 14 from the image-signal processor 10 via the second frame memory 11 and the display signal SCH fed from the OSD circuit 13, and displays an image corresponding to the resulting video signal on a display screen of a display 12 implemented by, for example, a cathode-ray tube (CRT) display or a liquid crystal display (LCD).

The OSD circuit 13 sends to the system controller 2 a display position signal SDP indicating a position where the display pattern based on the display signal SCH is displayed on the display screen of the display 12. This allows the system controller 2 to find any time the position where the display pattern is currently displayed on the display screen of the display 12 based on the display position signal SDP.

In the television receiver 1, the horizontal and vertical resolution of images displayed on the display screen of the display 12 according to user's operations of the remote-control transmitter 4 can be adjusted smoothly.

More specifically, the image-signal processor 10 calculates pixel data of an HD signal (525$p$ signal or 1050$i$ signal) according to a predetermined estimating equation, as will be described later. Coefficient data of the estimating equation corresponds to parameters h and v that defines the horizontal and vertical resolutions and that are adjusted by the user according to signals transmitted from the remote-control transmitter 4.

Figure 2:
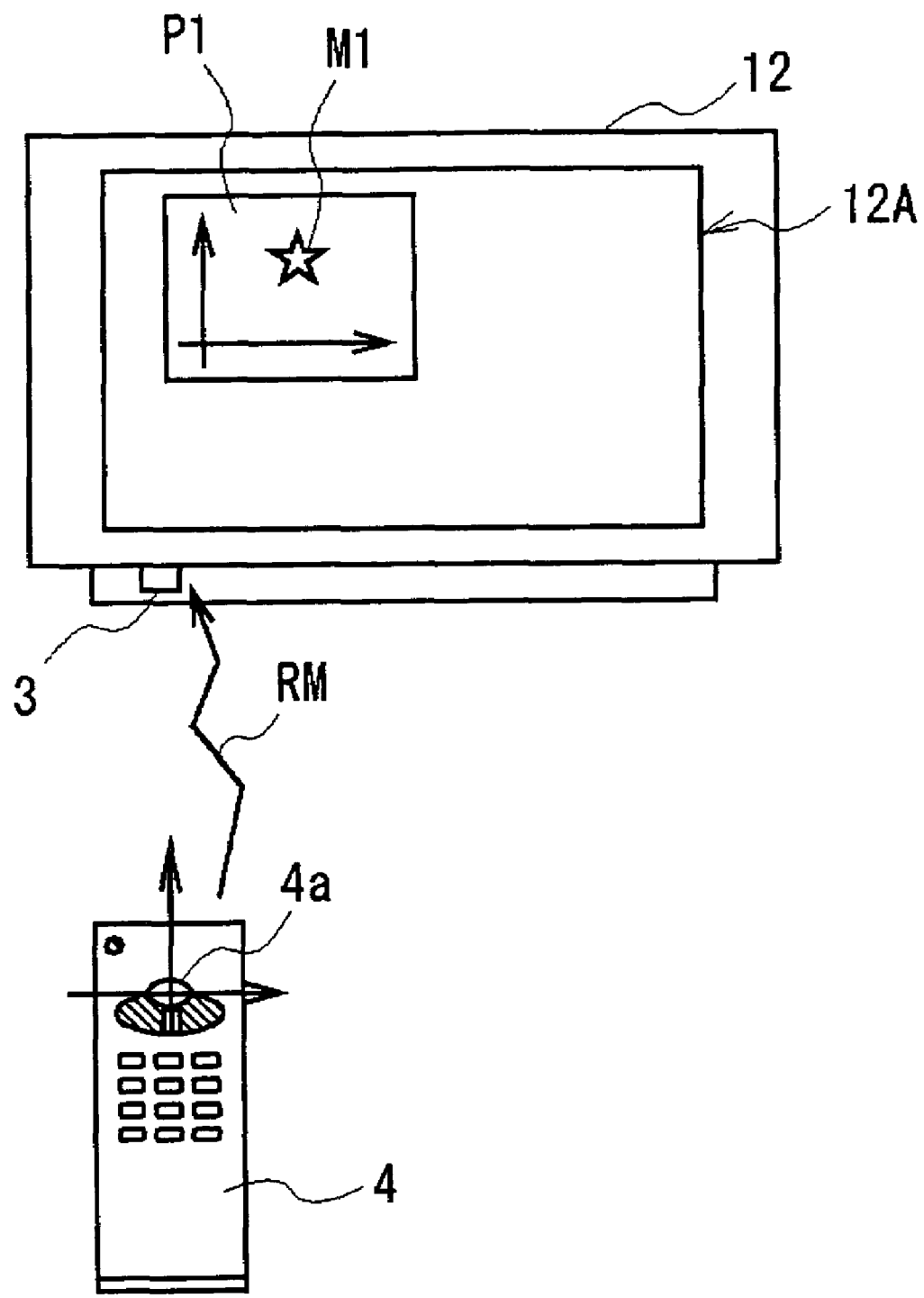
FIG. 2 is a schematic diagram for explaining a user interface for adjusting parameters.

FIG. 2 shows an example of user interface for adjusting the parameters h and v. When the resolutions are adjusted, on a display screen 12A of the display 12, an adjusting screen P1 on which an adjustment position of the parameters h and v is indicated by a star-shaped icon M1 is OSD-displayed.

The user can move the icon M1 in a desired direction on the adjusting screen P1 by vertically or horizontally moving a joystick 4a mounted on the remote-control transmitter 4 so that the values of the parameters h and v defining the horizontal and vertical resolutions can be adjusted as desired according to the position of the icon M1.

Figure 3:
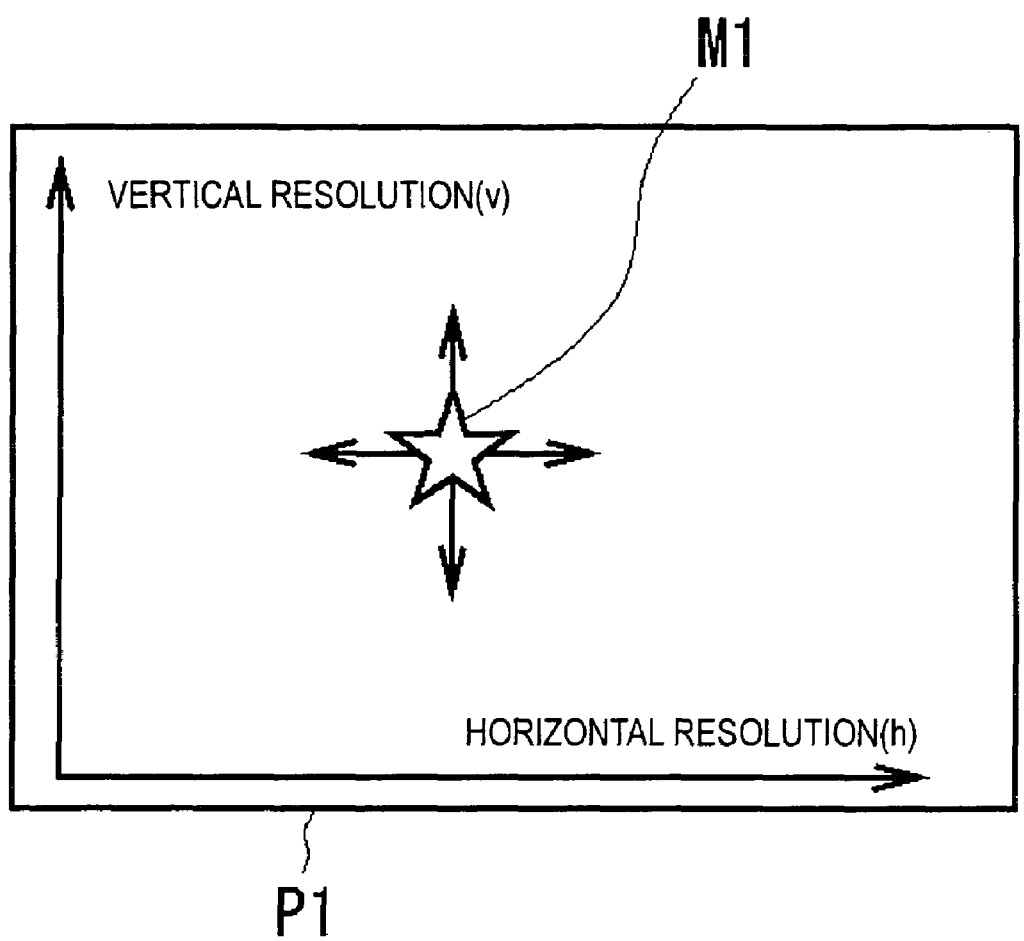
FIG. 3 is a schematic plan view showing display status of an adjusting screen.

More specifically, referring to a partially enlarged view of the adjusting screen P1 shown in FIG. 3, when the icon M1 is moved horizontally, the value of the parameter h defining the horizontal resolution is adjusted. When the icon M1 is moved vertically, the value of the parameter v defining the vertical resolution is adjusted. As described above, the user can freely and readily adjust the values of the parameters h and v with reference to the adjusting screen P1 displayed on the display screen 12A of the display 12, using the remote-control transmitter 4.

Although the parameters h and v are adjusted using the joystick 4a mounted on the remote-control transmitter 4 in this embodiment, without limitation thereto, other pointing devices may be provided, such as a mouse or a trackball. Furthermore, the values of the parameters h and v adjusted by the user may be displayed in the form of numeric values on the adjusting screen P1.

(1-1) Internal Construction of Image-Signal Processor

In the television receiver 1 constructed as shown in FIG. 1, the image-signal processor 10 converts pixel data of SD signals (525$i$ signals) fed via the first frame memory 9 (hereinafter referred to as SD pixel data) into pixel data of HD signals (525$p$ signals or 1050$i$ signals) (hereinafter referred to as HD pixel data). As the HD signals, 525*p* signals or 1050*i* signals are chosen according to a user's operation of the remote-control transmitter 4.

The image-signal processor 10 includes first to third tap selecting circuits 20 to 22 connected in parallel to the output stage of the first frame memory 9 so that a plurality of pieces of SD pixel data of pixels located in the proximity of a subject pixel relating to an HD signal (525*p* signal or 1050*i* signal) is selectively extracted from an SD signal (525*i* signal) stored in the first frame memory 9.

The first tap selecting circuit 20 selectively extracts data of SD signals that are used for prediction (hereinafter referred to as prediction taps). The second tap selecting circuit 21 selectively extracts data of SD signals that are used for classification based on a pattern of distribution of the levels of the SD pixel data (hereinafter referred to as spatial-class taps). The third tap selecting circuit 22 selectively extracts data of SD pixels that are used for classification regarding motion (hereinafter referred to as motion-class taps). When a spatial class (classification mainly for representation of a spatial waveform) is determined using SD pixel data belonging to a plurality of fields, the spatial class involves information regarding motion.

Figure 4:
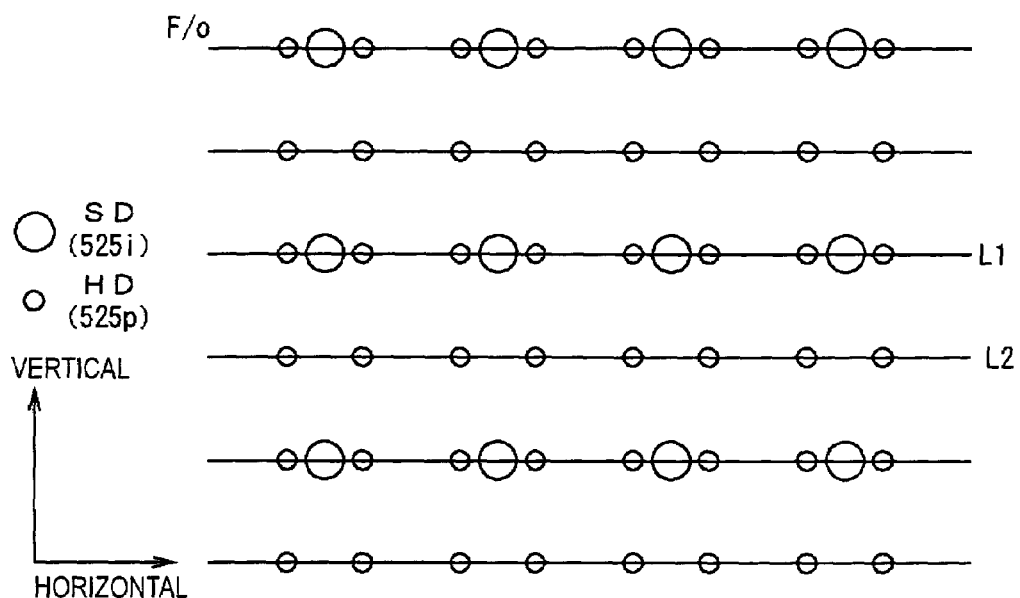
FIG. 4 is a schematic diagram for explaining relationship between the positions of pixels of an SD signal (525*i* signal) and an HD signal (525*p* signal)

FIG. 4 shows relationship of pixel positions of an SD signal (525*i* signal) and an HD signal (525*p* signal) in the odd-numbered field (o) of a frame (F). In FIG. 4, large dots represent pixels of the 525*i* signal, and small dots represent pixels of the converted 525*p* signal. Although not shown, in the even-numbered field (e), the lines of the 525 signals are spatially shifted by 0.5.

As will be understood from FIG. 4, pixel data of the HD signal (525*p* signal) includes line data L1 of pixels that are located on the same lines as the SD signal (525*i* signal), and line data L2 of pixels that are located on lines between the lines of the SD signal (525*i* signal). The number of pixels on each line of the HD signal (525*p* signal) is twice the number of pixels on each line of the SD signal (525*i* signal).

Figure 5:
FIG. 5 is a schematic diagram for explaining relationship between the positions of pixels of an SD signal (525*i* signal) and an HD signal (1050*i* signal)

FIG. 5 shows relationship of pixel positions of an SD signal (525*i* signal) and an HD signal (1050*i* signal) in the odd-numbered field (o) and the even-numbered field (e) of a frame (F). In FIG. 5, large dots represent pixels of the 525*i* signal, and small dots represent pixels of the converted 1050*i* signal.

As will be understood from FIG. 5, pixel data of the HD signal (1050*i* signal) includes line data L1 and L1' of pixels that are located on lines close to the lines of the SD signal (525*i* signal), and line data L2 and L2' of pixels that are located on lines that are remote from the lines of the SD signal (525*i* signal). L1 and L2 are line data of the odd-numbered field, and L1' and L2' are line data of the even-numbered field. The number of pixels on each line of the HD signal (1050*i* signal) is twice the number of pixels on each line of the SD signal (525*i* signal).

Figure 6A:
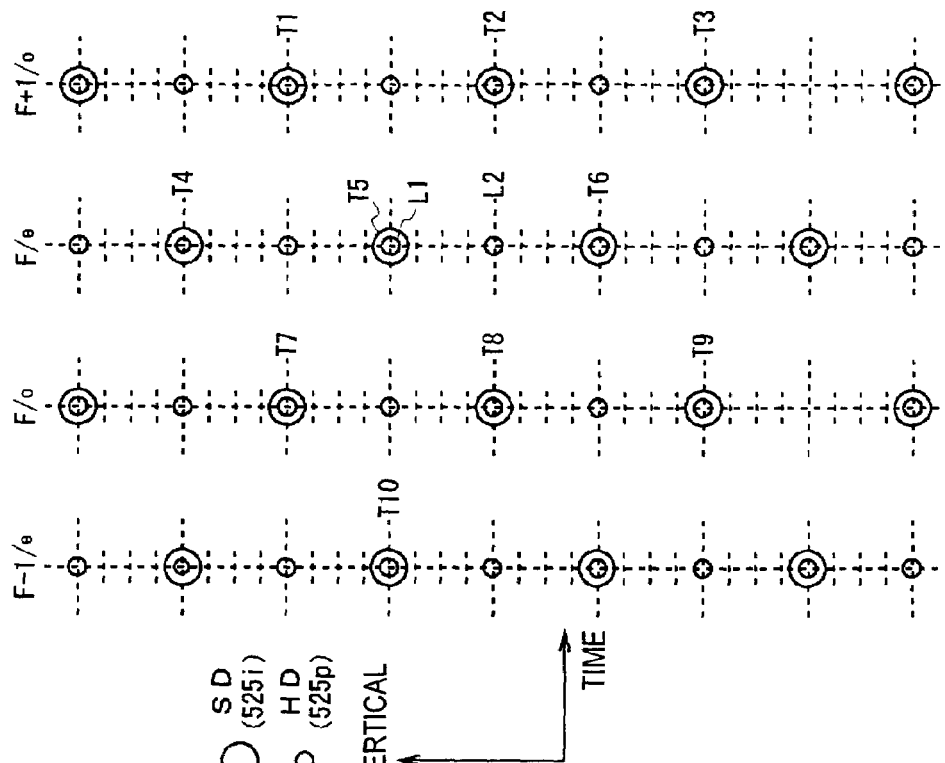
FIGS. 6A and 6B are schematic diagrams for explaining relationship between the positions of pixels of an SD signal (525*i* signal) and an HD signal (525*p* signal) and examples of prediction taps.
Figure 6B:
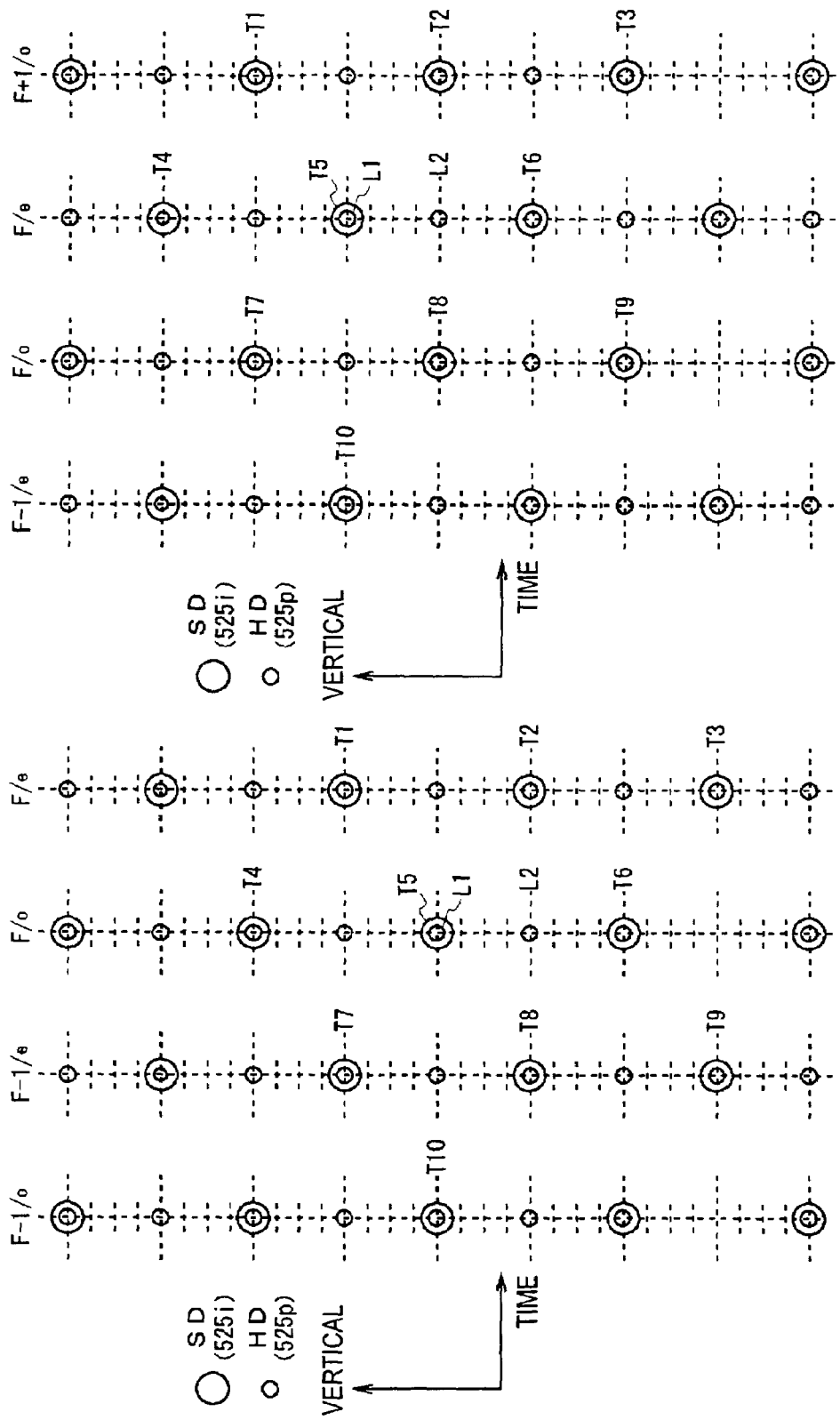

FIGS. 6A and 6B show specific examples of prediction taps (SD pixels) that are selected by the first tap selecting circuit 20 when an SD signal (525*i* signal) is up-converted into an HD signal (525*p* signal). FIGS. 6A and 6B show relationship between positions of pixels with respect to the vertical direction in the odd-numbered fields (o) and the even-numbered fields (e) of temporally successive frames (F−1), F, and (F+1).

As shown in FIG. 6A, prediction taps for predicting the line data L1 and L2 representing the odd-numbered field (F/o) of the frame F are composed of SD pixels T1, T2, and T3 that are included in the next even-numbered field (F/e) and spatially located in the proximity of the subject pixel of the converted HD signal (525*p* signal), SD pixels T4, T5, and T6 that are included in the odd-numbered field (F/o) and spatially located in the proximity of the subject pixel of the converted HD signal (525*p* signal), SD pixels T7, T8, and T9 that are included in the even-numbered field (F−1/e) of the previous frame (F−1) and spatially located in the proximity of the subject pixel of the converted HD signal (525*p* signal), and an SD pixel T10 that is included in the odd-numbered field (F−1/o) of the frame (F−1) and spatially located in the proximity of the subject pixel of the converted HD signal (525*p* signal).

As shown in FIG. 6B, prediction taps for predicting the line data L1 and L2 representing the even-numbered field (F/e) of the frame F are composed of SD pixels T1, T2, and T3 that are included in the odd-numbered field (F+1/o) of the next frame (F+1) and spatially located in the proximity of the subject pixel of the converted HD signal (525*p* signal), SD pixels T4, T5, and T6 that are included in the even-numbered field (F/e) of the previous frame F and spatially located in the proximity of the subject pixel of the converted HD signal (525*p* signal), SD pixels T7, T8, and T9 that are included in the odd-numbered field (F/o) of the frame F and spatially located in the proximity of the subject pixel of the converted HD signal (525*p* signal), and an SD pixel T10 that is included in the even-numbered field (F−1/e) of the previous frame (F−1) and spatially located in the proximity of the subject pixel of the converted HD signal (525*p* signal).

The SD pixel T9 may be omitted from prediction taps when predicting line data L1, and the SD pixel T4 may be omitted from prediction taps when predicting line data L2.

Figure 7B:
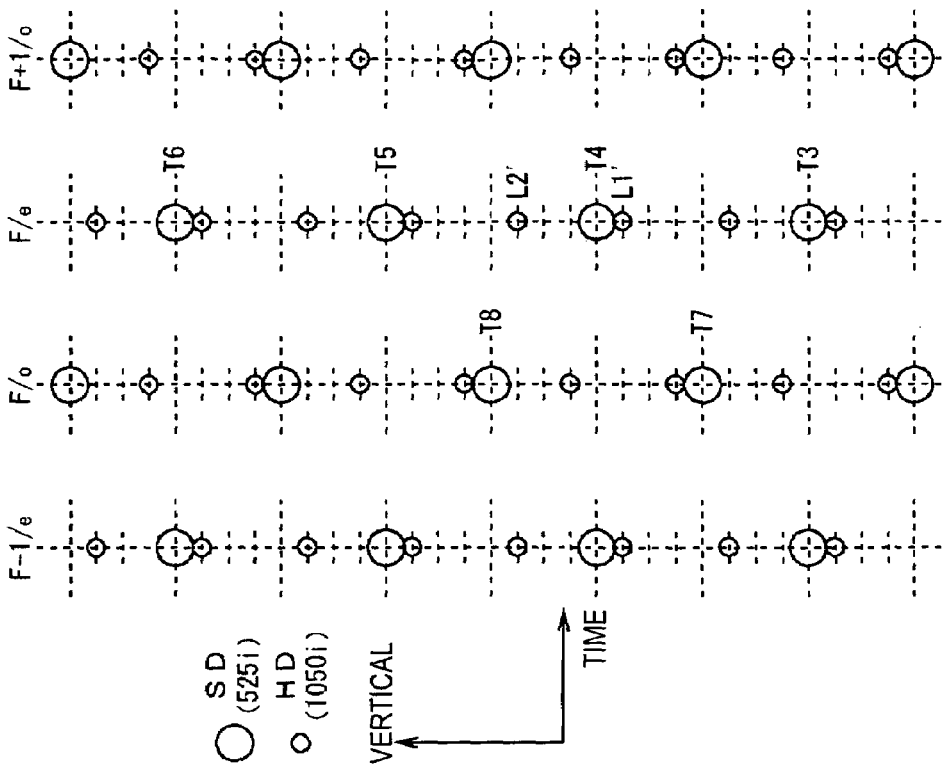
FIGS. 7A and 7B are schematic diagrams for explaining relationship between the positions of pixels of an SD signal (525*i* signal) and an HD signal (10560*i* signal) and examples of prediction taps.
Figure 7A:
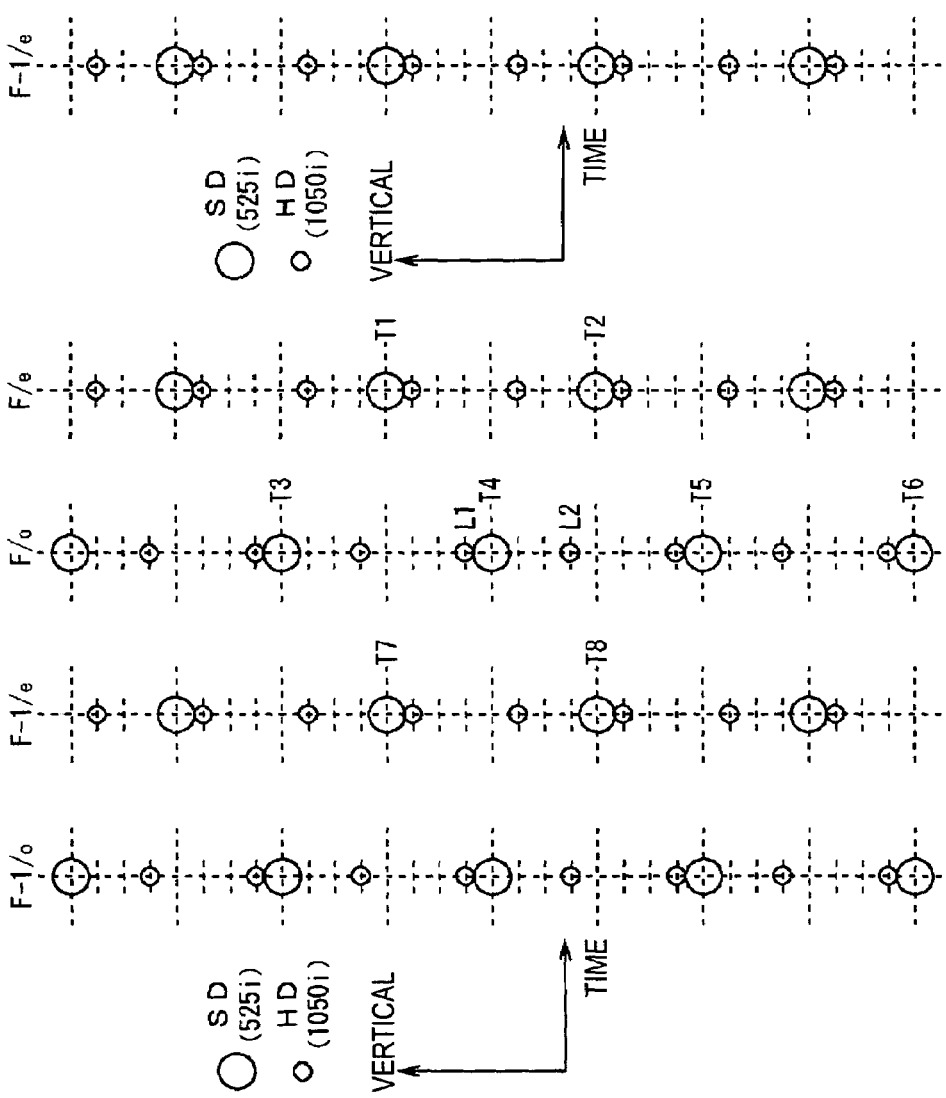

FIGS. 7A and 7B show specific examples of prediction taps (SD pixels) that are selected by the first tap selecting circuit 20 when an SD signal (525*i* signal) is up-converted into an HD signal (1050*i* signal). FIGS. 7A and 7B show relationship between positions of pixels with respect to the vertical direction in the odd-numbered fields (o) and the even-numbered fields (e) of temporally successive frames (F−1), F, and (F+1).

As shown in FIG. 7A, prediction taps for predicting line data L1 and L2 representing the odd-numbered field (F/o) of the frame F are composed of SD pixels T1 and T2 that are included in the next even-numbered field (F/e) and spatially located in the proximity of the subject pixel of the converted HD signal (1050*i* signal), SD pixels T3, T4, T5, and T6 that are included in the odd-numbered field (F/o) and spatially located in the proximity of the subject pixel of the converted HD signal (1050*i* signal), and SD pixels T7 and T8 that are included in the even-numbered field (F−1/e) of the previous frame (F−1) and spatially located in the proximity of the subject of the converted HD signal (1050*i* signal).

As shown in FIG. 7B, prediction taps for predicting line data L1' and L2' representing the even-numbered field (F/e) of the frame F are composed of SD pixels T1 and T2 that are included in the odd-numbered field (F+1/o) of the next frame (F+1) and spatially located in the proximity of the subject pixel of the converted HD signal (1050*i* signal), SD pixels T3, T4, T5, and T6 that are included in the even-numbered field (F/e) of the previous frame F and spatially located in the proximity of the subject pixel of the converted HD signal (1050*i* signal), and SD pixels T7 and T8 that are included in the odd-numbered field (F/o) of the frame F and spatially located in the proximity of the subject pixel of the converted HD signal (1050*i* signal).

The SD pixel T6 may be omitted from prediction taps when predicting the line data L1 and L1', and the SD pixel T3 may be omitted from prediction taps when predicting the line data L2 and L2'.

Furthermore, in addition to SD pixels at corresponding positions of a plurality of fields (the odd-numbered field and the even-numbered field) as shown in FIGS. 6A to 7B, one or more SD pixels arranged in the horizontal direction may be selected as prediction taps.

FIGS. 8A and 8B show specific examples of spatial-class taps (SD pixels) selected by the second tap selecting circuit 21 when an SD signal (525$i$ signal) is up-converted into an HD signal (525$p$ signal). FIGS. 8A and 8B shows relationship between positions of pixels with respect to the vertical direction in the odd-numbered fields (o) and the even-numbered fields (e) of temporally successive frames (F−1), F, and (F+1).

As shown in FIG. 8A, spatial-class taps for predicting line data L1 and L2 representing the odd-numbered field (F/o) of the frame F are composed of SD pixels T1 and T2 that are included in the next even-numbered field (F/e) and spatially located in the proximity of the subject pixel of the converted HD signal (525$p$ signal), SD pixels T3, T4, and T5 that are included in the odd-numbered field (F/o) and spatially located in the proximity of the subject pixel of the converted HD signal (525$p$ signal), and SD pixels T6 and T7 that are included in the even-numbered field (F−1/e) of the previous frame (F−1) and spatially located in the proximity of the subject pixel of the converted HD signal (525$p$ signal).

As shown in FIG. 8B, spatial-class taps for predicting line data L1 and L2 representing the even-numbered field (F/e) of the frame F are composed of SD pixels T1 and T2 that are included in the odd-numbered field (F+1/o) of the next frame (F+1) and spatially located in the proximity of the subject pixel of the converted HD signal (525$p$ signal), SD pixels T3, T4, and T5 that are included in the even-numbered field (F/e) of the previous frame F and spatially located in the proximity of the subject pixel of the converted HD signal (525$p$ signal), and SD pixels T6 and T7 that are included in the odd-numbered field (F/o) of the frame F and spatially located in the proximity of the subject pixel of the converted HD signal (525$p$ signal).

The SD pixel T7 may be omitted from spatial-class taps when predicting the line data L1, and the SD pixel T6 may be omitted from spatial-class taps when predicting the line data L2.

FIGS. 9A and 9B show specific examples of spatial-class taps (SD pixels) that are selected by the second tap selecting circuit 21 when an SD signal (525$i$ signal) is up-converted into an HD signal (1050$i$ signal). FIGS. 9A and 9B show relationship between positions of pixels with respect to the vertical direction in temporally successive frames (F−1), F, and (F+1).

As shown in FIG. 9A, spatial class-taps for predicting line data L1 and L2 representing the odd-numbered field (F/o) of the frame F are composed of SD pixels T1, T2, and T3 that are included in the odd-numbered field (F/o) and spatially located in the proximity of the subject pixel of the converted HD signal (1050$i$ signal), and SD pixels T4, T5, T6, and T7 that are included in the even-numbered field (F−1/e) of the previous frame (F−1) and spatially located in the proximity of the subject pixel of the converted HD signal (1050$i$ signal).

As shown in FIG. 9B, spatial-class taps for predicting line data L1' and L2' of the even-numbered field (F/e) of the frame F are composed of SD pixels T1, T2, and T3 that are included in the even-numbered field (F/e) and spatially located in the proximity of the subject pixel of the converted HD signal (1050$i$ signal), and SD signals T4, T5, T6, and T7 that are included in the previous odd-numbered field (F/o) and spatially located in the proximity of the subject pixel of the converted HD signal (1050$i$ signal).

The SD pixel T7 may be omitted from spatial-class taps when predicting the line data L1 and L1', and the SD pixel T4 may be omitted from spatial-class taps when predicting the line data L2 and L2'.

Furthermore, in addition to SD pixels at corresponding positions in a plurality of fields (the odd-numbered field and the even-numbered field) as shown in FIGS. 8A to 9B, one or more SD signals arranged in the horizontal direction may be selected as spatial-class taps.

FIG. 10A shows a specific example of motion-class taps (SD pixels) that are selected by the third tap selecting circuit 22 when an SD signal (525$i$ signal) is up-converted into an HD signal (525$p$ signal). FIG. 10A shows relationship between positions of pixels with respect to the vertical direction in the odd-numbered fields (o) and the even-numbered fields (e) of temporally successive frames (F−1) and F.

As shown in FIG. 10A, motion-class taps for predicting line data L1 and l2 of the odd-numbered field (F/o) of the frame F are composed of SD pixels n2, n4, and n6 that are included in the next even-numbered field (F/e) and spatially located in the proximity of the subject pixel of the converted HD signal (525$p$ signal), SD pixels n1, n3, and n5 that are included in the odd-numbered field (F/o) and spatially located in the proximity of the subject pixel of the converted HD signal (525$p$ signal), SD pixels m2, m4, and m6 that are included in the even-numbered field (F−1/e) of the previous frame (F−1) and spatially located in the proximity of the subject pixel of the converted HD signal (525$p$ signal), and SD pixels m1, m3, and m5 that are included in the odd-numbered field (F−1/o) of the previous frame (F−1) and spatially located in the proximity of the subject pixel of the converted HD signal (525$p$ signal). The positions of the SD pixels n1 to n6 with respect to the vertical direction correspond to the positions of the SD pixels m1 to m6 with respect to the vertical direction.

FIG. 10B shows a specific example of motion-class taps (SD pixels) that are selected by the third tap selecting circuit 22 when an SD signal (525$i$ signal) is up-converted into an HD signal (1050$i$ signal). FIG. 10B shows relationship between positions of pixels with respect to the vertical direction in the odd-numbered fields (o) and the even-numbered fields (e) of temporally successive frames (F−1) and F.

As shown in FIG. 10B, motion-class taps for predicting line data L1 and L2 of the odd-numbered field (F/o) of the frame F are composed of SD pixels n2, n4, and n6 that are included in the next even-numbered field (F/e) and spatially located in the proximity of the subject pixel of the converted HD signal (1050$i$ signal), SD pixels n1, n3, and n5 that are included in the odd-numbered field (F/o) and spatially located in the proximity of the subject pixel of the converted HD signal (1050$i$ signal), SD pixels m2, m4, and m6 that are included in the even-numbered field (F−1/e) of the previous frame (F−1) and spatially located in the proximity of the subject pixel of the converted HD signal (1050$i$ signal), and SD pixels m1, m3, and m5 that are included in the odd-numbered field (F−1/e) of the frame (F−1) and spatially located in the proximity of the subject pixel of the converted HD signal (1050$i$ signal). The positions of the SD pixels n1 to n6 with respect to the vertical direction correspond to the positions of the SD pixels m1 to m6 with respect to the vertical direction.

In the image-signal processor 10 shown in FIG. 1, a spatial-class detecting circuit 23 detects a pattern of distribution of the levels of the spatial-class-tap data (SD pixel data) selectively extracted by the second tap selecting circuit 21, and detects a spatial class based on the pattern of distribution of the levels, outputting corresponding class information.

The spatial-class detecting circuit 23 compresses each piece of pixel data by a compression method such as adaptive dynamic range coding (ADRC), for example, from 8 bits to 2 bits, and sends the compressed data as class information representing a spatial class to a class combining circuit 25.

ADRC was originally developed for high-performance coding for video tape recorders (VTRs). However, since ADRC allows efficient representation of a local pattern of signal levels by a short word length, ADRC is also suitable for the data compression described above. Instead of ADRC, information may be compressed using differential pulse code modulation (DPCM), vector quantization (VQ), or the like.

When ADRC is employed, letting the maximum value of the spatial-class-tap data (SD pixel data) be denoted by MAX, the minimum value thereof by MIN, the dynamic range thereof by DR (=MAX−MIN+1), and the number of re-quantization bits by P, a re-quantization code qi as compressed data can be expressed by equation (1) below in relation to each piece of pixel data ki as spatial-class-tap data:

$$qi = [(ki - MIN + 0.5) \cdot 2^P / DR] \quad (1)$$

where [ ] denotes truncation. When the number of pieces of SD pixel data as spatial-class-tap data is Na, i ranges from 1 to Na.

Furthermore, in the image-signal processor 10 shown in FIG. 1, a motion-class detecting circuit 24, based on motion-class-tap data (SD pixel data) selectively extracted by the third tap selecting circuit 22, detects a motion class mainly representing a degree of motion, outputting corresponding class information.

The motion-class detecting circuit 24 calculates inter-frame differences from the motion-class-tap data (SD pixel data), and applies a predetermined threshold processing on the average of the absolute values of the inter-frame differences to detect a motion class representing a degree of motion, sending corresponding class information to the class combining circuit 25.

More specifically, the motion-class detecting circuit 24 calculates the average AV of the absolute values of the inter-frame differences from the SD pixel data mi and ni according to equation (2) below:

$$AV = \frac{\sum_{i=1}^{Nb} |m_i - n_i|}{Nb} \quad (2)$$

In equation (2), when 12 pieces of SD pixel data (m1 to m6 and n1 to n6) are extracted by the third tap selecting circuit 22, the maximum value Nb of i is 6.

Then, the motion-class detecting circuit 24 obtains class information MV representing a motion class by comparing the average AV calculated as described above with one or more thresholds. For example, when three thresholds th1, th2, and th3 (th1<th2<th3) are used for classification among four motion classes, MV=0 when AV≦th1, MV=1 when th1<AV≦th2, MV=2 when th2<AV≦th3, and MV=3 when th3<AV.

As described above, based on the re-quantization code qi as class information representing a spatial class, received from the spatial-class detecting circuit 23, and class information MV representing a motion class, received from the motion-class detecting circuit 24, the class combining circuit 25 generates a class code CL representing a class to which the subject pixel of the converted HD signal (525p signal or 1050i signal) belongs.

That is, letting the number of pieces of spatial-class-tap data (SD pixel data) be denoted by Na and the number of re-quantization bits for ADRC by P, the class combining circuit 25 obtains a class code CL according to equation (3) below:

$$CL = \sum_{i=1}^{Na} q_i (2^P)^i + MV \cdot 2^{PNa} \quad (3)$$

Furthermore, the image-signal processor 10 includes a plurality of registers 30 to 33 and a coefficient memory 34. The register 30 stores operation-specifying information for specifying an operation of a line-sequential converter circuit 28 described later. The line-sequential converter circuit 28 needs to switch its operation between a case where a 525p signal is to be output as a converted HD signal and a case where a 1050i signal is to be output as a converted HD signal. Thus, the line-sequential converter circuit 28 operates according to the operation-specifying information fed from the register 30.

The register 31 stores tap-position information of prediction taps that are selected by the first tap selecting circuit 20. The tap-position information is represented by, for example, numbers respectively assigned to a plurality of SD pixels that can be selected. This applies to all tap-position information described hereinafter. The first tap selecting circuit 20 selects, as prediction taps, SD pixels corresponding to numbers that are included in the tap-position information fed from the register 31.

The register 32 stores tap-position information of spatial-class taps that are selected by the second tap selecting circuit 21. The second tap selecting circuit 21 selects, as spatial-class taps, SD pixels corresponding to numbers that are included in the tap-position information fed from the register 32.

The register 32 stores two types of tap-position information; namely, tap-position information A for cases where motion is relatively small and tap-position information B for cases where motion is relatively large. The tap-position information A or the tap-position information B is selected according to class information representing a motion class, fed from the motion-class detecting circuit 24, and the selected tap-position information is fed to the second tap selecting circuit 21.

More specifically, when motion is absent or small so that the value of the class information MV is 0 or 1, the tap-position information A is fed from the register 32 to the second tap selecting circuit 21. In this case, spatial-class taps selected by the second tap selecting circuit 21 are included in multiple fields as shown in FIGS. 8A to 9B.

On the other hand, when motion is relatively large so that the value of the class information MV is 2 or 3, the tap-position information B is fed from the register 32 to the second tap selecting circuit 21. In this case, although not shown, spatial-class taps selected by the second tap selecting circuit 21 are SD pixels only in the same field as the converted pixels.

In the register 31, similarly to the register 32, two types of tap-position information, namely, tap-position information for cases where motion is relatively small and tap-position information for cases where motion is relatively large, may be stored so that tap-position information fed to the first tap selecting circuit 20 is selected according to motion-class information MV fed from the motion-class detecting circuit 24.

The register 33 stores tap-position information of motion-class taps that are selected by the third tap selecting circuit 22. The third tap selecting circuit 22 selects, as motion-class taps, SD pixels corresponding to numbers that are included in the tap-position information fed from the register 33.

The coefficient memory 34 stores coefficient data for each class, used in a predetermined estimating equation by a predictive-value calculating circuit 26 described later. The coefficient data is used to convert an SD signal (525$i$ signal) into an HD signal (525$p$ signal or 1050$i$ signal).

Upon receiving a class code CL as read-address information from the class combining circuit 25, under the control of the system controller 2, coefficient data associated with the class code CL is from the coefficient memory 34 and fed to the predictive-value calculating circuit 26.

Furthermore, the image-signal processor 10 includes an information memory bank 35 having stored in advance operation-specifying information that is to be stored in the register 30 and tap-position information that is to be stored in the registers 31 to 33. The information memory bank 35 sends various information associated with the registers 30 to 33 under the control of the system controller 2.

As the operation-specifying information that is to be stored in the register 30, the information memory bank 35 stores in advance first operation-specifying information that causes the line-sequential converter circuit 28 to output an HD signal (525$p$ signal) and second operation-specifying information that causes the line-sequential converter circuit 28 to output an HD signal (1050$i$ signal).

When a user selects, using the remote-control transmitter 4, a first conversion method that is used for up-converting an SD signal (525$i$ signal) into an HD signal (525$p$ signal) or a second conversion method that is used for up-converting an SD signal (525$i$ signal) into an HD signal (1050$i$ signal), the result of selection is reported to the information memory bank 35 via the system controller 2. Then, the system controller 2 reads the first or second operation-specifying information corresponding to the first or second conversion method selected by the user, and sends the operation-specifying information to the register 30.

As tap-position information of prediction taps that is to be stored in the register 31, the information memory bank 35 stores in advance first tap-position information associated with the first conversion method (525$p$ signal) and second tap-position information associated with the second conversion method (1050$i$ signal). The system controller 2 reads the first or second tap-position information in accordance with the first or second conversion method selected by the user from the information memory bank 35, and sends the tap-position information to the register 31.

Furthermore, as tap-position information of spatial-class taps that is to be stored in the register 32, the information memory bank 35 stores in advance first tap-position information associated with the first conversion method (525$p$ signal) and second tap-position information associated with the second conversion method (1050$i$ signal).

Each of the first tap-position information and the second tap-position information includes two types of tap-position information; namely, tap-position information A for cases where motion is relatively small and tap-position information B for cases where motion is relatively large. The system controller 2 reads the first or second tap-position information in accordance with the first or second conversion method selected by the user from the information memory bank 35, and sends the tap-position information to the second tap selecting circuit 21.

Furthermore, as tap-position information of motion-class taps that is to be stored in the register 33, the information memory bank 35 stores in advance first tap-position information associated with the first conversion method (525$p$ signal) and second tap-position information associated with the second conversion method (1050$i$ signal). The system controller 2 reads the first or second tap-position information in accordance with the first or second conversion method selected by the user, and sends the tap-position information to the third tap selecting circuit 22.

Furthermore, the information memory bank 35 stores in advance coefficient-seed data associated with each class, for each of the first and second conversion methods. The coefficient-seed data is coefficient data used in generating equations for generating coefficient data that is to be stored in the coefficient memory 34.

The predictive-value calculating circuit 26 described later calculates converted HD pixel data based on prediction-tap data (SD pixel data) xi and coefficient data Wi read from the coefficient memory 34, according to an estimating equation expressed in equation (4) below:

$$y = \sum_{i=1}^{n} W_i \cdot x_i \qquad (4)$$

When the number of prediction taps selected by the first tap selecting circuit 20 is 10 as shown in FIGS. 4 and 6B, the value of n in equation (4) is 10. The coefficient data Wi (i=1 to n) in this estimating equation can be expressed using parameters h and v by generating equations expressed in equations (5) below:

$$\begin{aligned}
W_1 &= w_{10} + w_{11}v + w_{12}h + w_{13}v^2 + \\
&\quad w_{14}vh + w_{15}h^2 + w_{16}v^3 + w_{17}v^2h + w_{18}vh^2 + w_{19}h^3 \\
W_2 &= w_{20} + w_{21}v + w_{22}h + w_{23}v^2 + w_{24}vh + \\
&\quad w_{25}h^2 + w_{26}v^3 + w_{27}v^2h + w_{28}vh^2 + w_{29}h^3 \\
&\vdots \\
W_i &= w_{i0} + w_{i1}v + w_{i2}h + w_{i3}v^2 + \\
&\quad w_{i4}vh + w_{i5}h^2 + w_{i6}v^3 + w_{i7}v^2h + w_{i8}vh^2 + w_{i9}h^3 \\
&\vdots \\
W_n &= w_{n0} + w_{n1}v + w_{n2}h + w_{n3}v^2 + \\
&\quad w_{n4}vh + w_{n5}h^2 + w_{n6}v^3 + w_{n7}v^2h + w_{n8}h^2 + w_{n9}h^3
\end{aligned} \qquad (5)$$

Furthermore, the information memory bank 35 stores coefficient-seed data $w_{10}$ to $w_{n9}$ used as coefficient data in the generating equations, for each class and for each conversion method. A method for generating the coefficient-seed data will be described later.

The system controller 2 reads coefficient-seed data for each class, associated with the first or second conversion method selected by the user, from the information memory bank 35, and sends the coefficient-seed data to a coefficient generating circuit 36. Furthermore, the system controller 2 sends the parameters h and v to the coefficient generating circuit 36.

The coefficient generating circuit 36, using the coefficient-seed data and the values of the parameters h and v fed thereto, generates coefficient data Wi (i=1 to n) in accordance with the values of the parameters h and v for each class for the estimating equation according to the generating equations expressed in equations (5).

At that time, for example, by generating the coefficient data Wi for each class in vertical blanking periods, even if the values of the parameters h and v are changed by the user, the coefficient generating circuit 36 can immediately change the coefficient data Wi for each class stored in the coefficient memory 34 in accordance with the values of the parameters h and v. Thus, the user is allowed to adjust resolution smoothly.

As described above, the coefficient generating circuit 36 stores the coefficient data Wi (i=1 to n) for each class in the coefficient memory 34 under the control of the system controller 2.

A normalization coefficient generating circuit 37 calculates a normalization coefficient S associated with the coefficient data Wi (i=1 to n) for each class, generated by the coefficient generating circuit 36, according to equation (6) below:

$$S = \sum_{i=1}^{n} W_i \qquad (6)$$

The normalization-coefficient generating circuit 37 sends the normalization coefficient S for each class to a normalization-coefficient memory 38 so that the normalization coefficient S is stored in the normalization-coefficient memory 38. The normalization-coefficient memory 38 stores a class code CL received from the class combining circuit 25 as read-address information. The system controller 2 reads the normalization coefficient S associated with the class code CL, and sends the normalization coefficient S to a normalizing circuit 27.

The predictive-value calculating circuit 26 calculates data of a subject pixel of an HD signal from the prediction-tap data (SD pixel data) xi selectively extracted by the first tap selecting circuit 20 and coefficient data Wi read from the coefficient memory 34.

When an SD signal (525$i$ signal) is up-converted into an HD signal (525$p$ signal), in the odd-numbered field (o) and the even-numbered field (e), the predictive-value calculating circuit 26 generates line data L1 of pixels located on the same lines as the lines of the SD signal (525$i$ signal) and line data L2 of pixels located on lines between the lines of the SD signal (525$i$ signal), the number of pixels on each line of the line data L1 and L2 being twice as large as the number of pixels on each line of the SD signal (525$i$ signal), as shown in FIG. 4.

When an SD signal (525$i$ signal) is up-converted into an HD signal (1050$i$ signal), in the odd-numbered field (o) and the even-numbered field (e), the predictive-value calculating circuit 26 generates line data L1 and L1' of pixels located on lines that are close to the lines of the SD signal (525$i$ signal) and line data L2 and L2' of pixels located on lines that are remote from the lines of the SD signal (525$i$ signal), the number of pixels on each line of the line data L1, L1', L2, and L2' being twice as large as the number of pixels on each line of the SD signal (525$i$ signal).

Thus, the predictive-value calculating circuit 26 simultaneously generates data of four pixels of the HD signal (525$p$ signal or 1050$i$ signal). At that time, the predictive-value calculating circuit 26 calculates HD pixel data y according to the estimating equation expressed in equation (4), based on the respective values of the coefficient data Wi read from the coefficient memory 34 and the prediction-tap data (SD pixel data) xi.

Then, the normalizing circuit 27 normalizes the HD pixel data y of the line data L1 and L2 (L1' and L2') fed from the predictive-value calculating circuit 26 by dividing it by normalization coefficients S associated with the respective values of coefficient data Wi (i=1 to n) read from the normalization-coefficient memory 38.

The coefficient data Wi (i=1 to n) includes rounding errors, so that it is not guaranteed that the coefficient data Wi (i=1 to n) sum up to 1.0. Thus, in the predictive-value calculating circuit 26, variation in the levels of the resulting HD pixel data could occur due to the rounding errors. The normalizing circuit 27 can remove the variation in the levels by normalizing the HD pixel data y as described above.

Then, the line-sequential converter circuit 28 converts the line data L1 and L2 (L1' and L2') fed from the predictive-value calculating circuit 26 via the normalizing circuit 27 into line-sequential data by executing a line-rate doubling process so that the horizontal period is reduced to half.

Figure 11:
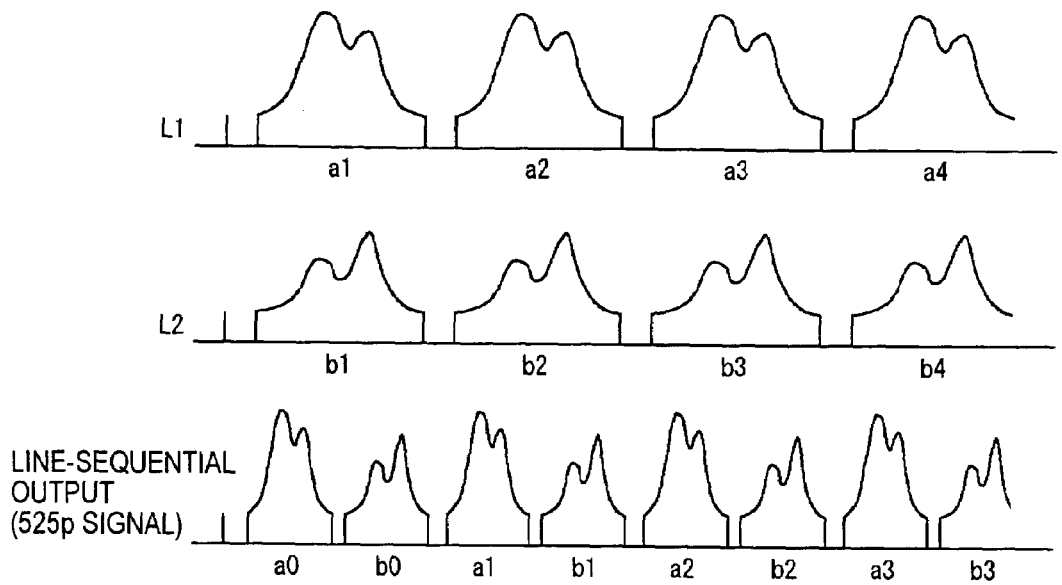
FIG. 11 is a graph for explaining processing for doubling line rate when an HD signal (525*p* signal) is output.

FIG. 11 shows analog waveforms relating to the line-rate doubling process for up-converting an SD signal (525$i$ signal) into an HD signal (525$p$ signal). The line data L1 generated by the predictive-value calculating circuit 26 includes data of lines a1, a2, a3, ..., and the line data L2 includes data of lines b1, b2, b3, ....

The line-sequential converter circuit 28 compresses each of the line data L1 and L2 to half with respect to the temporal axis, and alternately selects the pieces of compressed data, generating line-sequential outputs a0, b0, a1, b1, ....

When an SD signal (525$i$ signal) is up-converted into an HD signal (1050$i$ signal), the line-sequential converter circuit 28 generates line-sequential outputs so that the odd-numbered field (o) and the even-numbered field (e) are interlaced. Thus, the line-sequential converter circuit 28 needs to switch its operation between cases where an SD signal (525$i$ signal) is up-converted into an HD signal (525$p$ signal) and cases where an SD signal (525$i$ signal) is up-converted into an HD signal (1050$i$ signal), according to operation-specifying information fed from the register 30.

As described above, the image-signal processor 10 calculates HD pixel data y according to the estimating equation using coefficient data Wi (i=1 to n) in accordance with adjusted values of the parameters h and v. Thus, the user is allowed to adjust the image quality of the HD signal flexibly and smoothly with respect to each of the horizontal resolution axis and the vertical resolution axis by adjusting the values of the parameters h and v.

In the image-signal processor 10, since the coefficient generating circuit 36 generates coefficient data for each class in accordance with the values of the parameters h and v each time the user adjusts the values, advantageously, a memory for storing an excessive amount of data in advance is not needed.

As described earlier, the information memory bank 35 stores a plurality of pieces of coefficient-seed data generated in advance by performing learning, for each conversion method and for each class. An example of method for generating coefficient-seed data $w_{10}$ to $w_{n9}$ used in the generating equations expressed in equations (5) will be described below.

For the following description, let ti (i=0 to 9) be defined as in equations (7) below:

$$t_0=1, t_1=v, t_2=h, t_3=v^2, t_4=vh, t_5=h^2, t_6=v^3, t_7=v^2h, t_8=vh^2, t_9=h^3 \qquad (7)$$

Using equations (7) above, equations (5) can be rewritten as equation (8) below:

$$W_j = \sum_{i=0}^{g} W_{ji} t_i \qquad (8)$$

Finally, unknown coefficients $w_{xy}$ are determined by performing learning. More specifically, for each conversion method and for each class, coefficients that minimize the sum of square errors are determined by the least square method using a plurality of pieces of SD pixel data and HD pixel data.

Letting the number of pieces of learning data be denoted by m, a residual error in the k-th ($1 \leq k \leq m$) learning data by ek, and the sum of square errors by E, using equations (4) and (5), the sum E of square errors can be expressed by equation (9) below:

$$E = \sum_{k=1}^{m} e \qquad (9)$$

$$= \sum_{k=1}^{m} [y_k - (W_1 x_{1K} + W_2 x_{2K} + \ldots + W_n x_{nK})]^2$$

$$= \sum_{k=1}^{m} [y_k - [(t_0 w_{10} + t_1 w_{11} + \ldots + t_9 w_{19}) x_{1k} + \ldots +$$

$$(t_0 w_{n0} + t_1 w_{n1} + \ldots + t_9 w_{n9}) x_{nk}]]^2$$

$$= \sum_{k=1}^{m} [y_k - [(w_{10} + w_{11} v + \ldots + w_{19} h^3) x_{1k} + \ldots +$$

$$(w_{n0} + w_{n1} v + \ldots + w_{n9} h^3) x_{nk}]]^2$$

where $x_{ik}$ denotes the k-th piece of pixel data at the i-th prediction-tap position of the SD image, and $y_k$ denotes the corresponding k-th piece of pixel data of the HD image.

In the least square method, $w_{xy}$ with which partial differentiation of equation (9) with respect to $w_{xy}$ yields 0 is obtained as in equation (10) below:

$$\frac{\partial E}{\partial w_{ij}} = \sum_{k=1}^{m} 2\left(\frac{\partial e_k}{\partial w_{ij}}\right) e_k = -\sum_{k=1}^{m} 2 t_j x_{ik} e_k = 0 \qquad (10)$$

Let $X_{ipjq}$ and $Y_{ip}$ be defined as in equations (11) and (12) below:

$$X_{ipjq} = \sum_{k=1}^{m} x_{ik} t_p x_{jk} t_q \qquad (11)$$

$$Y_{ip} = \sum_{k=1}^{m} x_{ik} t_p y_k \qquad (12)$$

Then, equation (10) can be rewritten as a matrix expressed in equation (13) below:

$$\begin{pmatrix} x_{1010} & x_{1011} & x_{1012} & \cdots & x_{1019} & x_{1020} & \cdots & x_{10n9} \\ x_{1110} & x_{1111} & x_{1112} & \cdots & x_{1119} & x_{1120} & \cdots & x_{11n9} \\ x_{1210} & x_{1211} & x_{1212} & \cdots & x_{1219} & x_{1220} & \cdots & x_{12n9} \\ \vdots & \vdots & \vdots & \ddots & \vdots & \vdots & \ddots & \vdots \\ x_{1910} & x_{1911} & x_{1912} & \cdots & x_{1919} & x_{1920} & \cdots & x_{19n9} \\ x_{2010} & x_{2011} & x_{2012} & \cdots & x_{2019} & x_{2020} & \cdots & x_{20n9} \\ \vdots & \vdots & \vdots & \ddots & \vdots & \vdots & \ddots & \vdots \\ x_{n910} & x_{n911} & x_{n912} & \cdots & x_{n919} & x_{n920} & \cdots & x_{n9n9} \end{pmatrix} \begin{pmatrix} w_{10} \\ w_{11} \\ w_{12} \\ \vdots \\ w_{19} \\ w_{20} \\ \vdots \\ w_{n9} \end{pmatrix} = \begin{pmatrix} Y_{10} \\ Y_{11} \\ Y_{12} \\ \vdots \\ Y_{19} \\ Y_{20} \\ \vdots \\ Y_{n9} \end{pmatrix} \qquad (13)$$

This equation is generally referred to as a normal equation. The normal equation is solved for $w_{xy}$ using, for example, the sweep-out method (Gauss-Jordan elimination), to calculate coefficient-seed data.

Figure 12:
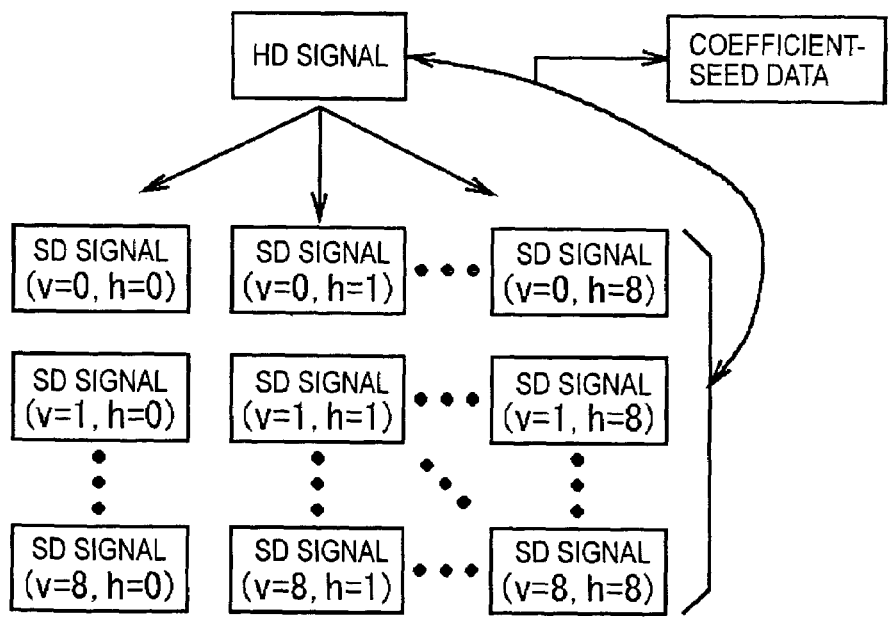
FIG. 12 is a schematic diagram for explaining a method for generating coefficient-seed data.

FIG. 12 shows the scheme of the method for generating coefficient-seed data described above. A plurality of SD signals is generated from an HD signal. For example, the parameters h and v defining the horizontal bandwidth and the vertical bandwidth of a filter used to generate SD signals from an HD signal are each varied to take on nine values, generating 81 SD signals in total. Coefficient-seed data is generated by performing learning based on the HD signal and the plurality of SD signals generated as described above.

(1-2) Construction of Coefficient-Seed-Data Generating Apparatus

Figure 13:
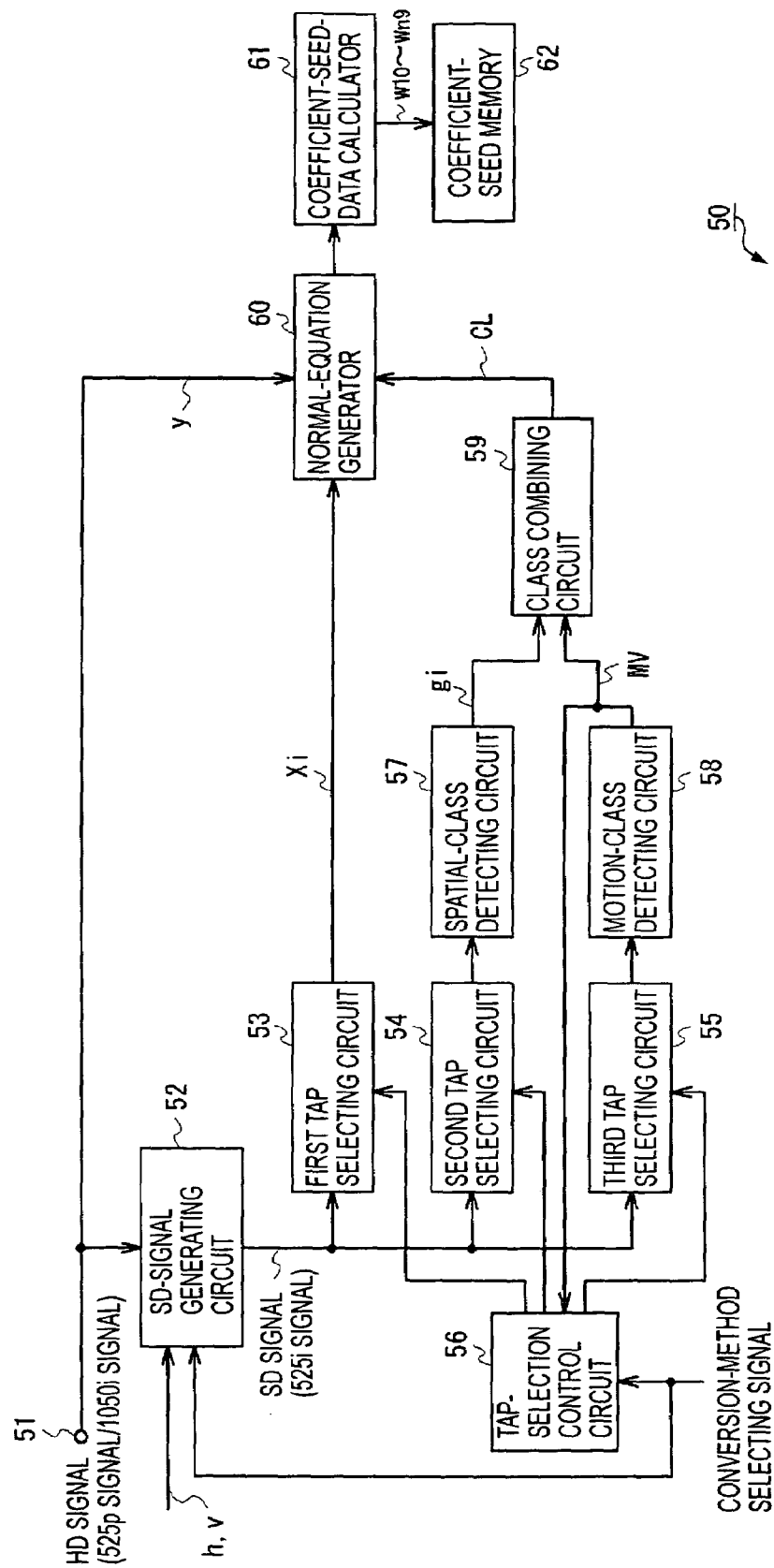
FIG. 13 is a block diagram showing a coefficient-seed data generating apparatus according to the embodiment.

FIG. 13 shows the construction of a coefficient-seed-data generating apparatus 50 that generates coefficient-seed data according to the scheme described above.

In the coefficient-seed-data generating apparatus 50, when an HD signal (525p signal or 1050i signal) as a teacher signal is input via an input terminal 51, an SD-signal generating circuit 52 generates an SD signal by horizontally and vertically decimating the HD signal.

The SD-signal generating circuit 52 selects the first conversion method (up-conversion from a 525i signal to a 525p signal) or the second conversion method (up-conversion from a 525i signal to a 1050i signal), and generates an SD signal by the conversion method selected.

That is, when the first conversion method is selected, the SD-signal generating circuit 52 generates an SD signal (525i signal) by decimating an HD signal (525p signal) (refer to FIG. 4). On the other hand, when the second conversion method is selected, the SD-signal generating circuit 52 generates an SD signal (525i signal) by decimating an HD signal (1050i signal) (refer to FIG. 5).

The SD-signal generating circuit 52, upon receiving the parameters h and v as control signals, changes the horizontal bandwidth and vertical bandwidth of the filter that is used to generate SD signals from an HD signals in accordance with the parameters h and v.

Figure 14:
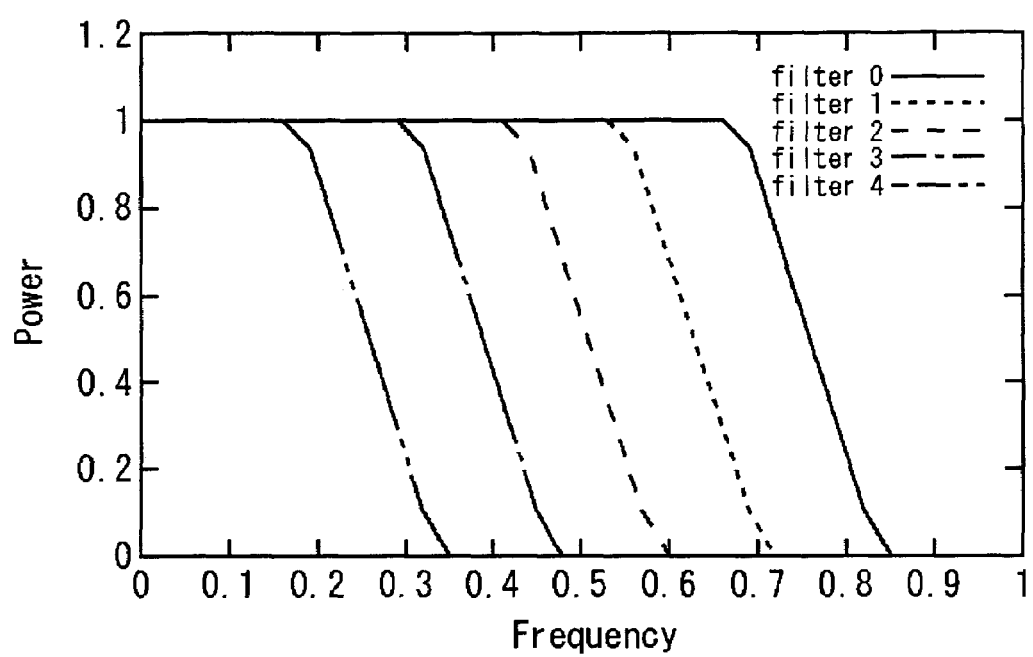
FIG. 14 is a graph for explaining frequency characteristics of a band filter.

Now, specific examples of the filter will be described. As a first example, when a bandwidth filter composed of a bandwidth filter that limits the horizontal bandwidth and a bandwidth filter that limits the vertical bandwidth is used, as shown in FIG. 14, frequency characteristics in accordance with stepwise values of the parameter h or v are designed, and inverse Fourier transform is performed, thereby forming a first-order filter having frequency characteristics in accordance with the stepwise values of the parameter h or v.

As a second example, when a filter composed of a first-order Gaussian filter that limits the horizontal bandwidth and a first-order Gaussian filter that limits the vertical bandwidth is used, the first-order Gaussian filter can be expressed by equation (14) below:

$$\text{Out} = \frac{1.0}{\sigma\sqrt{2.0\pi}} e^{\frac{-(4.0x-37)^2}{2.0\sigma^2}} \quad (14)$$

Thus, by changing the value of standard deviation σ in accordance with the stepwise values of the parameter h or v, a first-order Gaussian filter having frequency characteristics in accordance with the stepwise values of the parameter h or v can be formed.

As a third example, when a filter composed of a second-order filter F(h, v) whose horizontal and vertical frequency characteristics are determined by both the parameters h and v is used, similarly to the first-order filter described above, second-order frequency characteristics in accordance with stepwise values of the parameters h and v are designed, and second-order inverse Fourier transform is performed, forming a second-order filter having second-order frequency characteristics in accordance with the stepwise values of the parameters h and v.

Furthermore, the coefficient-seed-data generating apparatus 50 includes first to third tap selecting circuits 53 to 55 connected in parallel at the output stage of the SD-signal generating circuit 52. The tap selecting circuits 53 to 55 selectively extract a plurality of pieces of SD pixel data of pixels located in the proximity of a subject pixel of an HD signal (1050$i$ signal or 525$p$ signal) from an SD signal (525$i$ signal) fed from the SD-signal generating circuit 52.

The first to third tap selecting circuits 53 to 55 are constructed similarly to the first to third tap selecting circuits 20 to 22 of the image-signal processor 10 shown in FIG. 1. The first to third tap selecting circuits 53 to 55 select taps according to tap-position information fed from a tap-selection control circuit 56.

The tap-selection control circuit 56, based on a control signal fed from the outside, sends tap-position information to the first to third tap selecting circuits 53 to 55 according to which of the first and second conversion methods is selected.

The tap-selection control circuit 56 selects tap-position information for cases where motion is relatively small or tap-position information for cases where motion is relatively large according to motion-class information MV fed from a motion-class detecting circuit 58, and sends the tap-position information to the second tap selecting circuit 54.

The second tap selecting circuit 54 selectively extracts spatial-class-tap data (SD pixel data) for classification, associated with the pattern of distribution of the levels of SD pixel data, and sends the spatial-class-tap data to a spatial-class detecting circuit 57.

The spatial-class detecting circuit 57 detects a pattern of distribution of the levels of spatial-class-tap data (SD pixel data) selectively extracted by the second tap selecting circuit 54, and detects a spatial class based on the pattern of distribution of the levels, sending corresponding class information to a class combining circuit 59.

The spatial-class detecting circuit 57 is constructed similarly to the spatial-class detecting circuit 23 of the image-signal processor 10. The spatial-class detecting circuit 57 sends a re-quantization code qi for each piece of SD pixel data as spatial-class-tap data to the class combining circuit 59 as spatial-class information.

The third tap selecting circuit 55 selectively extracts motion-class-tap (SD pixel) data used for classification based on motion, and sends the motion-class-tap data to a motion-class detecting circuit 58.

The motion-class detecting circuit 58 detects a motion class mainly representing a degree of motion from the motion-class-tap data (SD pixel data) selectively extracted by the third tap selecting circuit 55, and sends corresponding class information MV to the class combining circuit 59.

The motion-class detecting circuit 58 is constructed similarly to the motion-class detecting circuit 24 of the image-signal processor 10. The motion-class detecting circuit 58 calculates inter-frame differences from the motion-class-tap data (SD pixel data), and applies a threshold processing on the average of the absolute values of the differences, thereby detecting a motion class representing a degree of motion.

The class combining circuit 59 generates a class code CL representing a class to which a subject pixel of the HD signal (525$p$ signal or 1050$i$ signal) belongs, based on the re-quantization code qi as spatial-class information fed from the spatial-class detecting circuit 57 and the motion-class information MV fed from the motion-class detecting circuit 58. The class combining circuit 59 is constructed similarly to the class combining circuit 25 of the image-signal processor 10.

A normal-equation generator 60 generates a normal equation (refer to equation (13) for calculating coefficient-seed data $w_{10}$ to $w_{n9}$ for each class, based on the HD pixel data y as subject pixel data obtained from the HD signal fed via the input terminal 51, prediction-tap data (SD pixel data) xi selectively extracted by the first tap selecting circuit 53 in association with each of the pieces of the HD pixel data y, and the class code CL fed from the class combining circuit 59 in association with each of the pieces of the HD pixel data y.

At this time, since the SD-signal generating circuit 52 sequentially outputs a plurality of SD signals that are generated while changing the horizontal and vertical bandwidths of the filter in a stepwise manner in accordance with the parameters h and v, the normal-equation generator 60 generates a plurality of pieces of learning data based on combinations of a single piece of HD pixel data y and n pieces of prediction-tap pixel data associated with the piece of HD pixel data y, generating normal equations in which the plurality of pieces of learning data is registered.

Although not shown, a delaying circuit may be provided at a previous stage of the first tap selecting circuit 53 to adjust timing of feeding SD pixel data xi from the first tap selecting circuit 53 to the normal-equation generator 60.

A coefficient-seed-data calculator 61, upon receiving normal-equation data for each class from the normal-equation generator 60, solves the normal equation for each class, for example, by the sweep-out method, to calculate coefficient-seed data $w_{10}$ to $w_{n9}$ for each class, storing the coefficient-seed data $w_{10}$ to $w_{n9}$ in a coefficient-seed memory 62.

Coefficient-seed data calculated by performing learning based on an HD signal and SD signals generated from the HD signal using a filter having a relatively narrow bandwidth yields an HD signal having a relatively high resolution. On the other hand, coefficient-seed data calculated by performing learning based on an HD signal and SD signals generated from the HD signal using a filter having a relatively wide bandwidth yields an HD signal having a relatively low resolution.

As described above, the coefficient-seed-data generating apparatus 50 sequentially generates a plurality of SD signals based on an HD signal fed thereto, and generates coefficient-seed data $w_{10}$ to $w_{n9}$ for each class that is to be stored in the information memory bank 35 of the image-signal processor 10 shown in FIG. 1, by the first or second conversion method associated with each of the SD signals.

(1-3) Adjustment of Resolution according to First Embodiment

In the television receiver 1 shown in FIG. 1, when an image-quality adjusting mode is selected, in cases where image quality is adjusted based on mutually independent parameters while maintaining correlation, as in the case of adjusting resolution or the degree of suppressing noise, as opposed to cases where image quality is adjusted based on a single parameter, as in the case of adjusting contrast or sharpness, results of a plurality of types of adjustment can be simultaneously displayed as still images on the display screen 12A of the display 12, so that the user is allowed to adjust image quality by directly viewing and comparing the still images.

A case where the user specifies adjustment of resolution for adjustment of image quality will be described below. First, with a video image displayed on the display screen 12A of the display 12, when the user selects image-quality adjusting mode by operating the remote-control transmitter 4, the system controller 2 starts a resolution adjusting routine RT1 shown in FIG. 15 from step SP0. Then, in step SP1, the system controller 2 superposes a menu screen (not shown) for the image-quality adjusting mode on the display screen 12A.

The menu screen shows a menu for a plurality of types of adjustment of image quality (e.g., contrast, sharpness, resolution, and noise removal). In step SP2, the system controller 2 waits for the user to specify adjustment of resolution. Then, in step SP3, the system controller 2 stops the image currently displayed on the display screen 12A of the display 12 to obtain one frame of still image, and simultaneously displays a plurality of images corresponding to a specific range of the still image in divided regions of a single frame.

Figure 16:
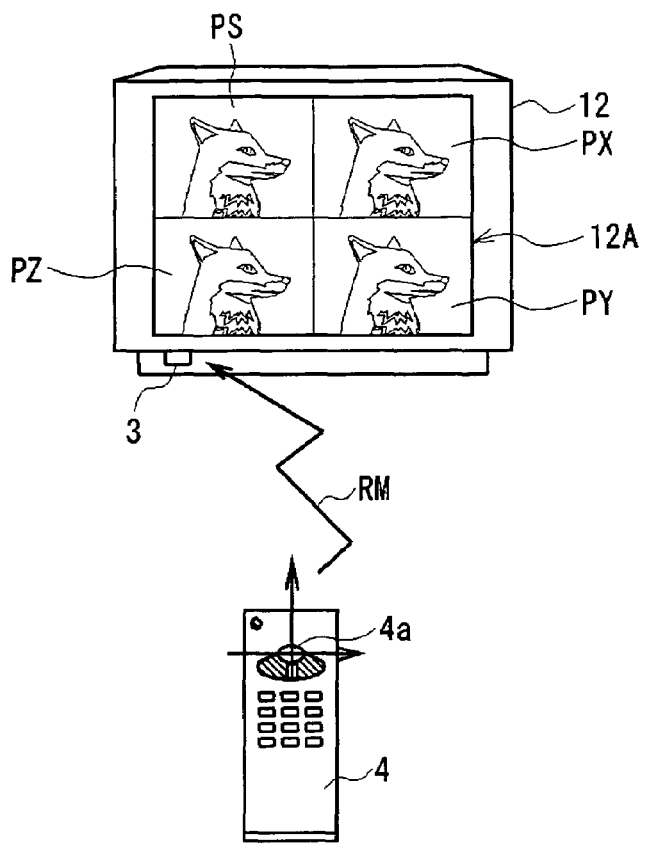
FIG. 16 is a schematic diagram for explaining a user interface according to the embodiment.

For example, when the number of the corresponding images is four, as shown in FIG. 16, an original image PS is displayed as it is without adjusting parameters in the upper left area of the display screen 12A of the display 12 (this image will hereinafter be referred to as a reference original image), and three images for adjusting parameters (hereinafter referred to as adjusting images) PX to PZ are displayed in the upper right, lower left, and lower right areas of the display screen 12A.

Figure 17A:
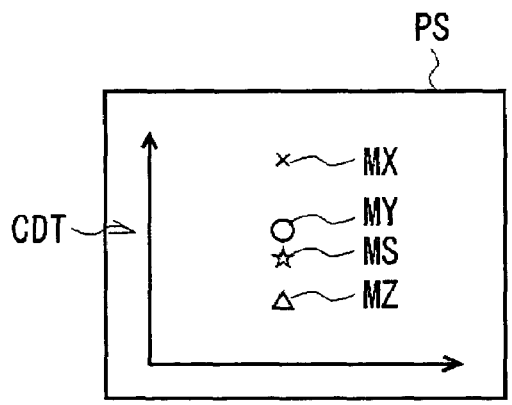
FIGS. 17A and 17B are schematic plan views for explaining display status of a reference original image and a plurality of adjusting images shown in FIG. 16.

Furthermore, as shown in FIG. 17A, in the reference original image PS, a two-dimensional coordinate system CDT defined by parameter axes on the vertical and horizontal axes for defining horizontal resolution and vertical resolution is superposed. Furthermore, for the reference original image PS and the adjusting images PX to PZ, positions corresponding to the current horizontal and vertical resolutions in the two-dimensional coordinate system CDT are indicated by superposing icons MS and MZ to MZ representing star, cross, circle, and triangle marks.

Figure 17B:
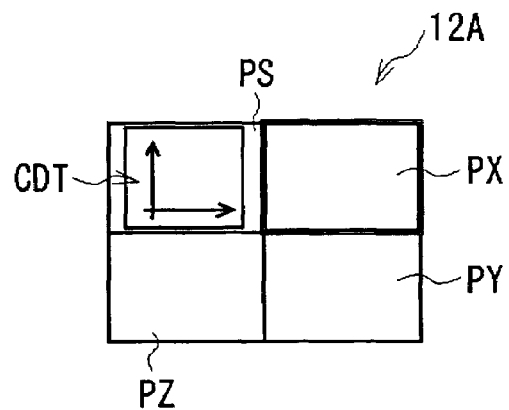

With the reference original image PS and the adjusting images PX to PZ simultaneously displayed, in step SP4, the system controller 2 waits for one of the adjusting images PX, PY, and PZ to be specified by a user's operation of the remote-control transmitter 4. Then, in step SP5, with reference to the current parameters defining the horizontal and vertical resolutions of the specified adjusting image PX, PY, or PZ, the system controller 2 sets different values to the parameters associated with the adjusting images PX to PZ, as shown in FIG. 17B.

At this time, the system controller 2 waits for one of the adjusting images PX, PY, and PZ to be specified according to a user's operation of the remote-control transmitter 4, and allows adjustment of the parameters based on the specified adjusting image PX, PY, or PZ by an operation of the remote-control transmitter 4.

In this state, when the user operates a joystick, cross-shaped button, or the like of the remote-control transmitter 4 in a certain direction, the system controller 2, in accordance with the operation, moves the icon MX, MY or MZ associated with the specified adjusting image PX, PY, or PZ among the icons MX to MZ displayed in the reference original image PS, and adjusts the resolutions of the other adjusting images so that the resolutions are approximated with reference to the resolution of the specified adjusting image PX, PY, or PZ.

Then, in step SP6, the system controller 2 determines whether the resolution has been fixed by a user's operation of the remote-control transmitter 4. When step SP6 turns out negative, returning to step SP4, the system controller 2 waits for one of the adjusting images PX, PY, and PZ having a resolution desired by the user to be specified, and repeats the steps described above.

On the other hand, when step SP6 turns out positive, it is indicated that the resolution of the adjusting image PX, PY, or PZ specified by the user has been fixed as the result of adjustment. Then, in step SP7, the system controller 2 determines whether to exit the image-quality adjusting mode.

When step SP7 turns out negative, returning to step SP1, the system controller 2 displays the menu screen (not shown) for the image-quality adjusting mode, and repeats the steps described above. On the other hand, when step SP7 turns out positive, proceeding to step SP8, the system controller 2 exits the resolution adjusting routine RT1.

As described above, in the television receiver 1, when image quality is adjusted based on mutually independent parameters while maintaining correlation, as in the case of adjusting resolution, adjusting images PX to PZ having different image qualities are simultaneously displayed in the display screen 12A of the display 12. Accordingly, the user is allowed to readily specify the adjusting image PX, PY, or PZ as desired by directly comparing it with the other adjusting images.

At this time, in the television receiver 1, when the adjusting image PX, PY, or PZ having a desired resolution is specified from among the plurality of adjusting images PX, PY, and PZ displayed on the display screen 12A of the display 12, the resolutions of the other adjusting images are approximated with reference to the specified adjusting image PX, PY, or PZ. Thus, the other adjusting images are displayed as candidates of a resolution desired by the user.

Each time the adjusting image PX, PY, or PZ having a desired resolution is specified from the adjusting images PX to PZ, the values of the parameters defining the resolutions of the adjusting images other than the specified adjusting image PX, PY, or PZ are caused to converge in proportion to the number of iterations of the specification so that a resolution desired by the user is finally achieved.

Figure 15:
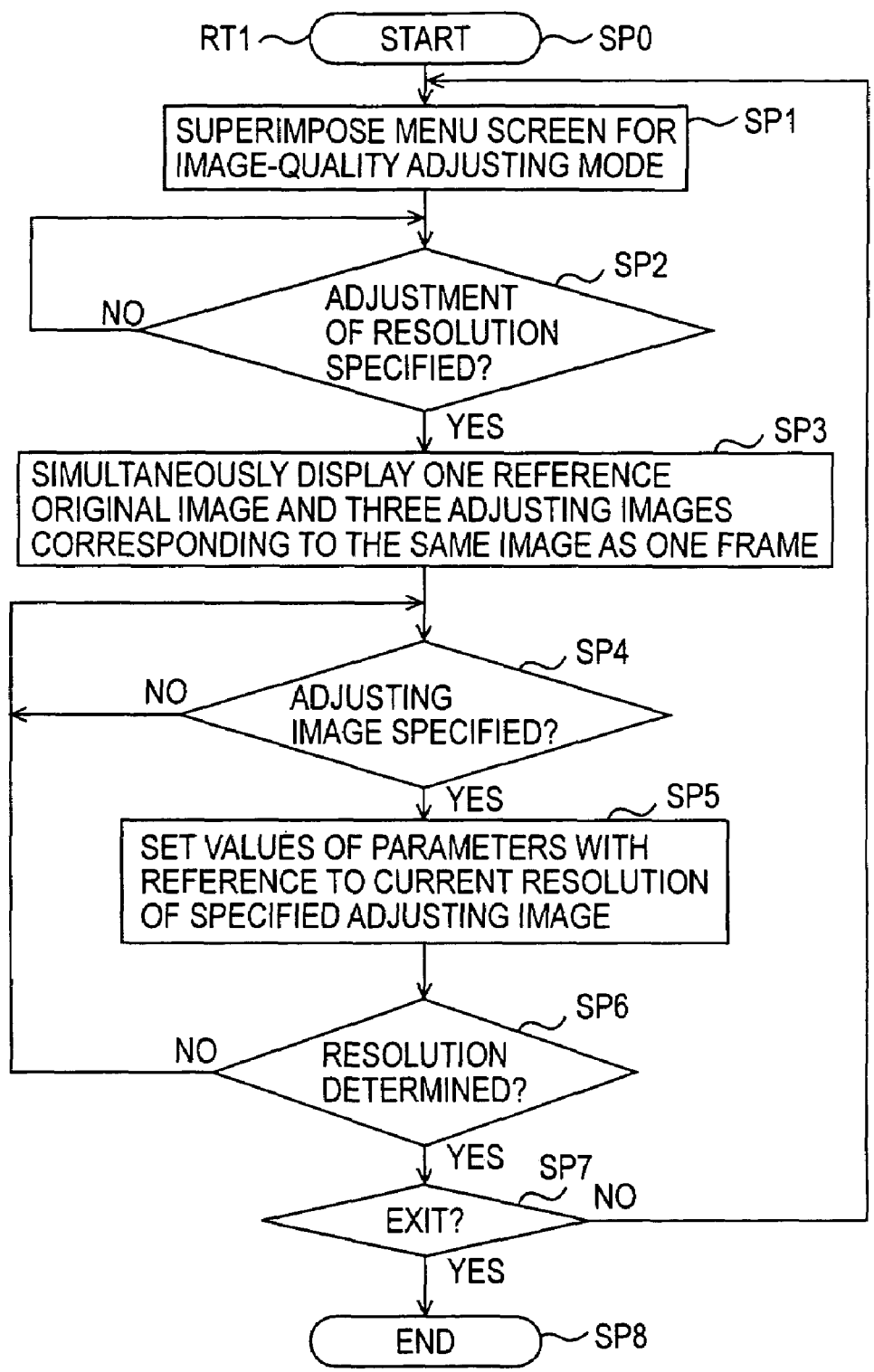
FIG. 15 is a flowchart of a resolution adjusting routine according to the embodiment.
Figure 18:
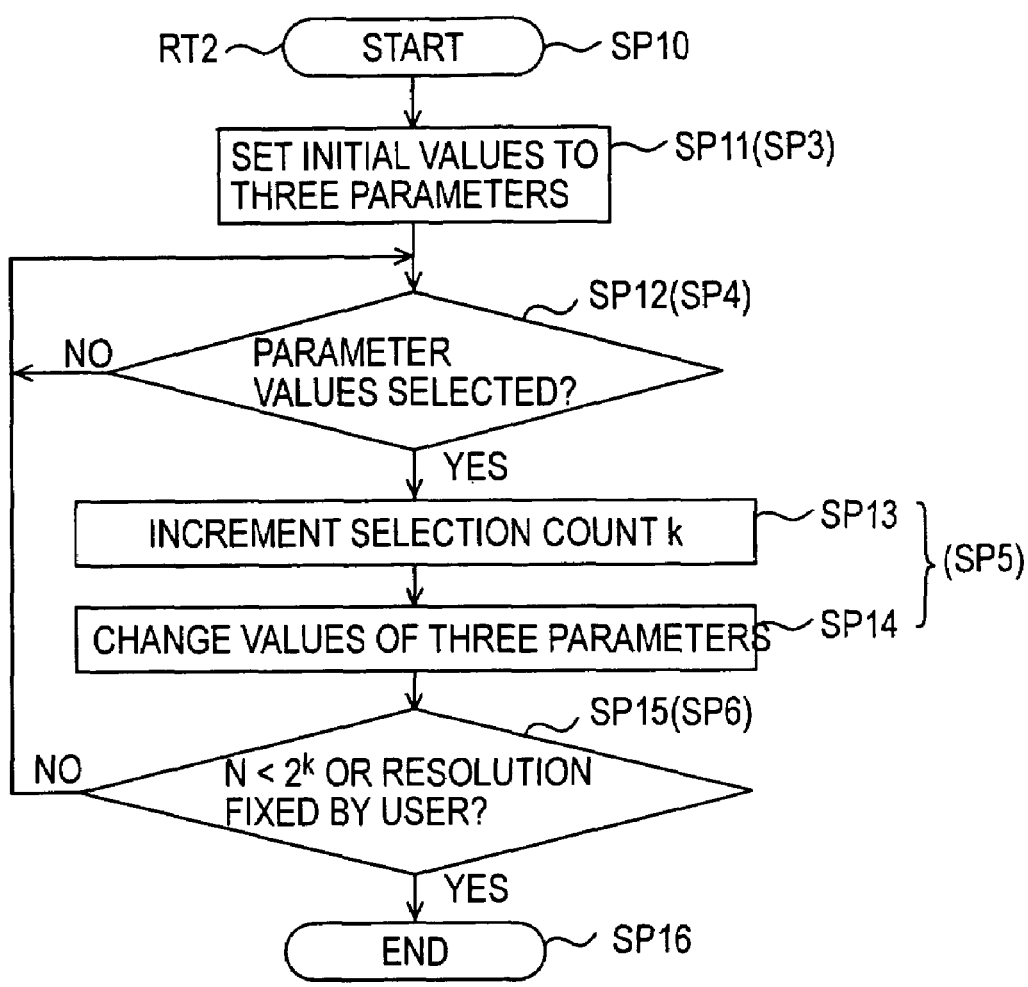
FIG. 18 is a flowchart of a parameter setting routine according to the embodiment.

More specifically, in the resolution adjusting routine RT1 shown in FIG. 15, when adjustment of resolution is selected in the menu screen for the image-quality adjusting mode (step SP2), the system controller 2 starts a parameter setting routine RT2 shown in FIG. 18 from step SP10. Then, in step SP11, the system controller 2 displays one reference original image PS and three adjusting images PX to PZ simultaneously as one frame in divided regions of the display screen 12A of the display 12 (step SP3), and sets initial values to the parameters for the adjusting images PX to PZ.

More specifically, letting the parameters for the adjusting images PX to PZ be denoted by Px, Py, and Pz, respectively, 0 is set to the parameter Px, N/2+1 is set to the parameter Py, and N is set to the parameter Pz, where N is a predetermined natural number.

These parameters Px, Py, and Pz are each composed of a parameter h defining horizontal resolution and a parameter v defining vertical resolution as described earlier, and respectively denoted as (hx, vx), (hy, vy), and (hz, vz).

Then, in step SP12, the system controller 2 determines whether the value of the parameter Px, Py, or Pz based on the adjusting image PX, PY, or PZ has been selected by specifying the adjusting image PX, PY, or PZ (step SP4).

When step SP12 turns out positive, it is indicated that the user has specified the adjusting image PX, PY, or PZ having a desired resolution among the adjusting images PX to PZ. Then, in step SP13, the system controller 2 increments the selection count k (initial value is 0) by 1. Then, in step SP14, the system controller 2 changes the values of the three parameters Px to Pz (step SP5).

Figure 19:
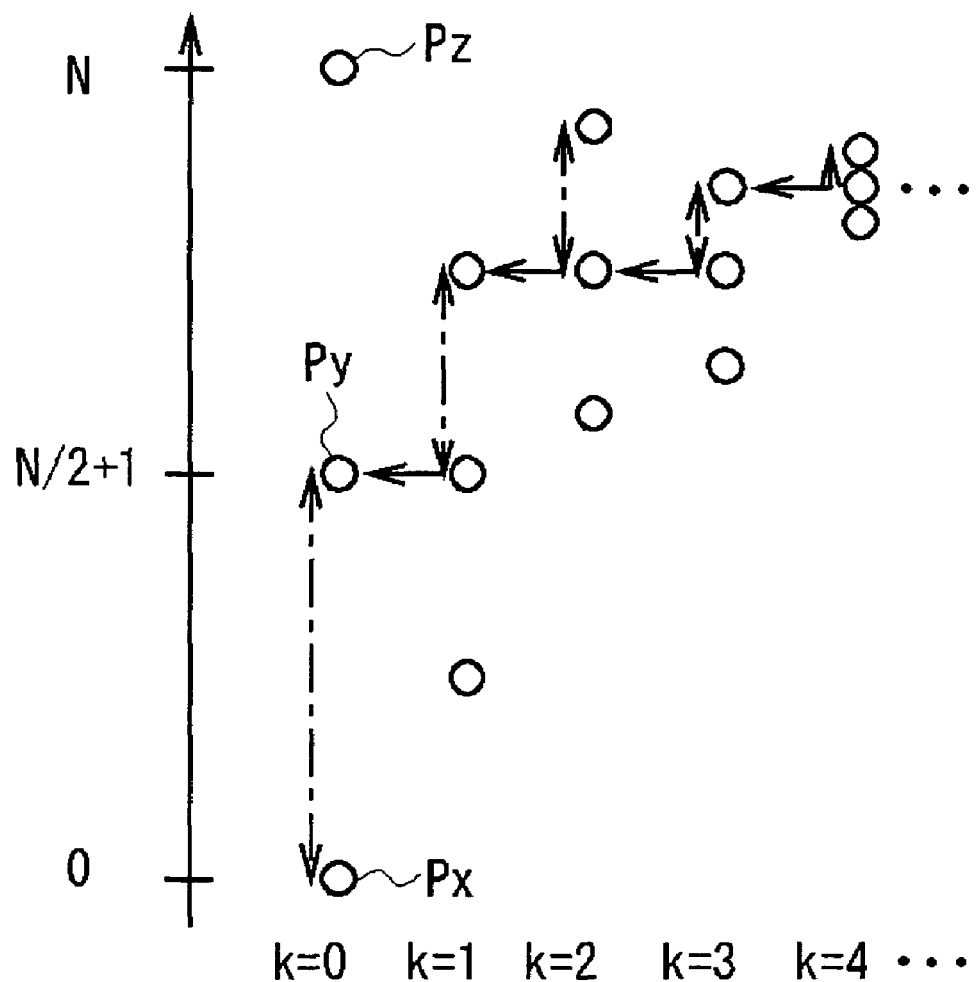
FIG. 19 is a schematic diagram for explaining convergence of parameter values in the parameter setting routine shown in FIG. 18.

In step SP14, the system controller 2, with reference to the value of the parameter Px, Py, or Pz associated with the specified adjusting image PX, PY, or PZ (Px=N, Py=N/2+1, and Pz=0 when k=0), sets new values of the other parameters by adding $\pm N/2^k$ (k denotes the selection count) to the values of the other parameters (FIG. 19). When the new values of the parameters do not fall in the range of 0 to N, the values are modified so as to fall within the range of 0 to N. That is, 0 is set when the value of the parameter Px, Py, or Pz is less than or equal to 0, while N is set when the value of the parameter Px, Py, or Pz is greater than or equal to N.

Then, in step SP15, the system controller 2 determines whether the upper limit N of the value of the parameter Px, Py, or Pz has become less than $2^k$ or the user has fixed the resolution (step SP6). When step SP15 turns out positive, in step SP16, the system controller 2 exits the parameter setting routine RT2.

On the other hand, when step SP15 turns out negative, it is indicated that it is not possible to adjust resolution or the user has quit adjustment of resolution. Then, returning to step SP12, the system controller 2 waits for a next value of the parameter Px, Py, or Pz to be selected, and repeats the steps described above.

As described above, in the television receiver 1, each time the user specifies the adjusting image PX, PZ, or PZ having a desired resolution, the values of the parameters Px to Pz for the respective adjusting images PX to PZ are modified so that the resolutions of the other adjusting images are progressively approximated to the resolution of the specified adjusting image PX, PY, or PZ. Thus, the user is allowed to achieve convergence to a desired resolution by simply specifying the adjusting image PX, PY, or PZ a number of times.

In the television receiver 1, when the resolution is adjusted as described above, the system controller 2 reads a frame image based on an SD signal (525$i$ signal) stored in the first frame memory 9, and adjusts parameters for quarter-sized images corresponding to the frame image, and stores in the second frame memory 11 one reference original image PS and three adjusting images PX, PY, and PZ based on the resulting HD signal (525$p$ or 1050$i$ signal).

Then, the system controller 2 sends the reference original image PS and the adjusting images PX, PY, and PZ stored in the second frame memory 11 to the combiner 14 at specific timing so that these images form one frame in the display screen 12A of the display 12.

Furthermore, the system controller 2 sends reading instructions for adjusting parameters for the adjusting images PX, PY, or PZ in accordance with a user's operation to the OSD circuit 13. Then, the OSD circuit 13 sends display patterns for adjusting parameters in accordance with the reading instructions (the two-dimensional coordinate system CDT and the icons MS and MX to MZ representing star, cross, circle, and triangle marks in FIG. 17) to the combiner 14.

Then, the system controller 2 combines the reference original image PS and the adjusting images PX to PZ fed to the combiner 14 from the image-signal processor 10 via the second frame memory 11 with the display patterns fed from the OSD circuit 13, and displays a frame image based on the resulting image signal on the display screen 12A of the display 12.

The OSD circuit 13 sends to the system controller 2 display position signals SDP representing the positions where the display patterns are displayed in the display screen 12A of the display 12. Thus, the system controller 2 is constantly allowed to find where the display patterns based on the display position signals SD are currently displayed in the display screen 12A of the display 12.

(1-4) Operation and Advantage of the First Embodiment

In the television receiver 1 constructed as described above, when image-quality is adjusted based on mutually independent parameters while maintaining correlation, as in the case of adjusting resolution, images corresponding to a specific range of a still image taken from a video image displayed on the display screen 12A of the display 12 are displayed in divided regions to form one frame.

The corresponding images are used as one reference original image PS and a plurality of adjusting images PX to PZ. On the reference original image PS, a two-dimensional coordinate system CDT and icons MS and MX to MZ representing the current resolutions of the respective adjusting images PX to PZ are superposed, and initial values are set for the adjusting images PX to PZ so that these images have different resolutions.

When the user specifies using the remote-control transmitter 4 the adjusting image PX, PY, or PZ having a desired resolution from among the adjusting images PX to PZ displayed in the display screen 12A of the display 12, with reference to the specified adjusting image PX, PY, or PZ, the values of the parameters defining horizontal resolutions and vertical resolutions of the other adjusting images are modified.

At this time, in the display screen 12A of the display 12, the reference original image PS having the original resolution, the specified adjusting image PX, PY, or PZ having a current desired resolution, and the other adjusting images having resolutions approximated with reference to the resolution of the specified adjusting image PX, PY, or PZ are shown. Thus, the user is allowed to specify an adjusting image having a desired resolution by directly comparing the adjusting images PX to PY with each other.

Furthermore, when the user specifies the adjusting image PX, PY, or PZ having a desired resolution from among the adjusting images PX to PZ displayed in the display screen 12A of the display 12, the resolutions of the other adjusting images are approximated with reference to the specified adjusting image so that the other adjusting images are displayed as candidates of a resolution desired by the user.

Each time the user specifies the adjusting image PX, PY, or PZ from among the adjusting images PX to PZ displayed, the values of the parameters for the adjusting images other than the specified adjusting image PX, PY, or PZ are caused to converge in proportion to the number of iterations of the specification. Thus, finally, an adjusting image having a resolution desired by the user can be displayed.

Thus, when the user adjusts resolution, convergence to a desired resolution can be achieved simply by specifying a desired resolution a number of times by viewing adjusting images that are displayed. Accordingly, even when image quality is adjusted by adjusting parameters independently while maintaining correlation, as in the case of adjusting resolution, it is readily possible to visually check image quality before adjustment and image quality after adjustment. Furthermore, it is possible to readily adjust image quality without the laboriousness of simultaneously adjusting a plurality of parameters.

According to what has been described above, in the television receiver 1, when resolution is adjusted, adjusting images PX to PZ corresponding to the same still image are simultaneously displayed in the display screen 12A of the display 12, and with reference to the adjusting image PX, PY, or PZ specified by the user, the resolutions of the other adjusting images are approximated, and the resulting images are displayed as candidates of a resolution desired by the user. Furthermore, each time the user specifies the adjusting image PX, PY, or PZ having a desired resolution, the values of the parameters defining the resolutions of the adjusting images other than the specified adjusting image PX, PY, or PZ are caused to converge in proportion to the number of iterations of the specification, so that an adjusting image having a resolution desired by the user can be finally displayed. Accordingly, the user is allowed to achieve a desired resolution simply by specifying a desired resolution a number of times by viewing adjusting images that are displayed. Thus, the television receiver 1 allows image quality to be adjusted with improved ease.

(2) Second Embodiment (2-1) Method of Generating Coefficient-seed Data According to Second Embodiment Next, a method of generating coefficient-seed data according to a second embodiment of the present invention will be described. The second embodiment will also be described in the context of an example where coefficient-seed data $w_{10}$ to $w_{n9}$ used as coefficient data in the generating equations expressed in equation (5) is calculated.

Figure 20:
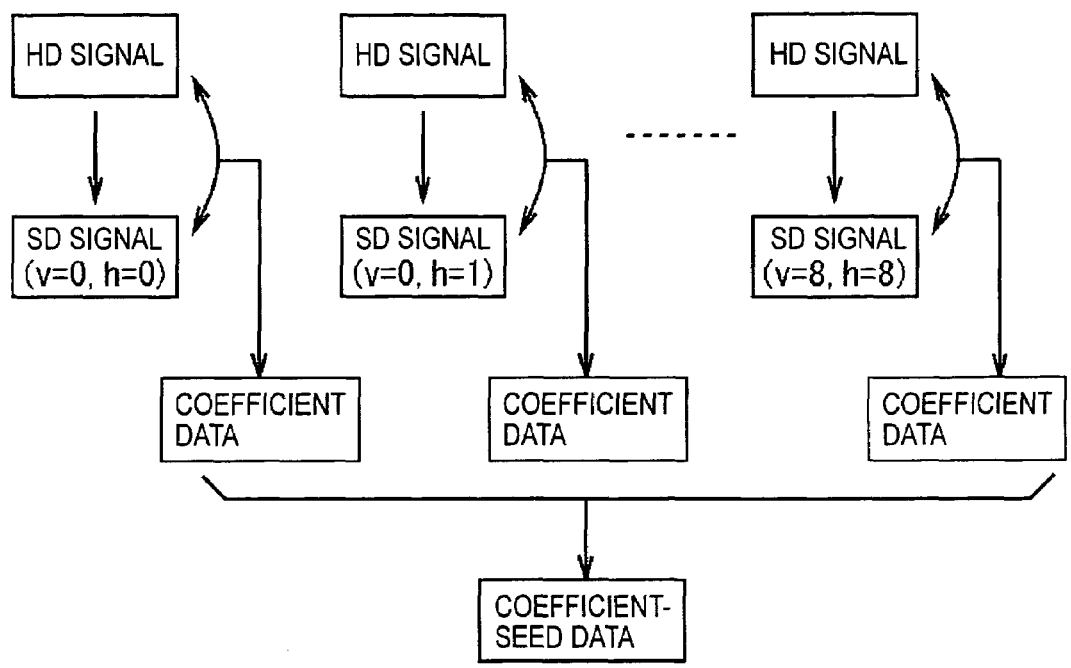
FIG. 20 is a schematic diagram for explaining a method of generating coefficient-seed data.

FIG. 20 shows the scheme of the method for generating coefficient-seed data. First, a plurality of SD signals is generated from an HD signal. For example, for each HD signal, each of the parameters h and v for changing the horizontal bandwidth and vertical bandwidth of the filter is varied to take on nine values, generating 81 SD signals in total. Coefficient data Wi used in the estimating equation expressed in equation (4) is generated for each of the SD signals generated as described above, by performing learning based on the SD signals and HD signal by a method described below. Then, coefficient-seed data $w_{10}$ to $w_{n9}$ is generated using the coefficient data Wi (i=1 to n).

First, the coefficient data Wi for the estimating equation expressed in equation (4) is calculated by the least square method. As a generalized example, letting input data be denoted by X, coefficient data by W, and predictive values by Y, observation equations expressed in equations (15) below will be considered:

$$XW = YX = \begin{pmatrix} x_{11} & x_{12} & \dots & x_{1n} \\ x_{21} & x_{22} & \dots & x_{2n} \\ \dots & \dots & \dots & \dots \\ x_{m1} & x_{m2} & \dots & x_{mn} \end{pmatrix}, W = \begin{pmatrix} W_1 \\ W_2 \\ \dots \\ W_n \end{pmatrix}, Y = \begin{pmatrix} y_1 \\ y_2 \\ \dots \\ y_m \end{pmatrix} \quad (15)$$

In equations (15), m denotes the number of pieces of learning data, and n denotes the number of prediction taps.

The least square method is applied to data collected according to the observation equations expressed in equations (15). Based on the observation equations expressed in equations (15), residual equations expressed in equations (16) below will be considered:

$$XW = Y + E, E = \begin{pmatrix} e_1 \\ e_2 \\ \dots \\ e_m \end{pmatrix} \quad (16)$$

According to the residual equations expressed in equations (16), the most probable value of each piece of coefficient data Wi is presumed to be a value that minimizes $e^2$ in equation (17) below:

$$e^2 = \sum_{i=1}^{m} e_i^2 \quad (17)$$

That is, values of W1, W2, ..., Wn that satisfy equation (18) below with n conditions based on i are calculated as coefficient data:

$$e_1 \frac{\partial e_1}{\partial w_i} + e_2 \frac{\partial e_2}{\partial w_i} + \dots + e_m \frac{\partial e_m}{\partial w_i} = 0 \ (i = 1, 2, \dots, n) \quad (18)$$

Thus, from the residual equations expressed in equations (16), equation (19) below is yielded:

$$\frac{\partial e_i}{\partial w_1} = x_{i1}, \frac{\partial e_i}{\partial w_2} = x_{i2}, \dots, \frac{\partial e_i}{\partial w_n} = x_{in} \ (i = 1, 2, \dots, m) \quad (19)$$

Furthermore, from equation (19) and equations (15) given earlier, equations (20) below are yielded:

$$\sum_{i=1}^{m} e_i x_{i1} = 0, \sum_{i=1}^{m} e_i x_{i2} = 0, \dots, \sum_{i=1}^{m} e_i x_{in} = 0 \quad (20)$$

From equations (20) and (16), normal equations expressed in equations (21) below are yielded:

$$\begin{cases} \left(\sum_{j=1}^{m} x_{j1}x_{j1}\right)W_1 + \left(\sum_{j=1}^{m} x_{j1}x_{j2}\right)W_2 + \ldots + \left(\sum_{j=1}^{m} x_{j1}x_{jn}\right)W_n = \left(\sum_{j=1}^{m} x_{j1}y_j\right) \\ \left(\sum_{j=1}^{m} x_{j2}x_{j1}\right)W_1 + \left(\sum_{j=1}^{m} x_{j2}x_{j2}\right)W_2 + \ldots + \left(\sum_{j=1}^{m} x_{j2}x_{jn}\right)W_n = \left(\sum_{j=1}^{m} x_{j2}y_i\right) \\ \ldots \\ \left(\sum_{j=1}^{m} x_{jn}x_{j1}\right)W_1 + \left(\sum_{j=1}^{m} x_{jn}x_{j2}\right)W_2 + \ldots + \left(\sum_{j=1}^{m} x_{jn}x_{jn}\right)W_n = \left(\sum_{j=1}^{m} x_{jn}y_j\right) \end{cases} \quad (21)$$

Since the same number of normal equations expressed in equations (21) as the number n of unknown numbers can be yielded, the most probable value of each piece of coefficient data Wi can be calculated. In this case, the simultaneous equations are solved using, for example, the sweep-out method (Gauss-Jordan elimination).

Then, using the coefficient data Wi (i=1 to n) generated for each SD signal, coefficient-seed data $w_{10}$ to $w_{n9}$ is calculated. First, by performing learning using SD signals associated with the parameters h and v, when coefficient data $k_{vhi}$ (i denotes the index of prediction tap) for a class is obtained, coefficient-seed data for the class is calculated from the coefficient data $k_{vhi}$.

The pieces of coefficient data Wi can be represented by equations (5) using the coefficient-seed data $w_{10}$ to $w_{n9}$. When the least square method is applied to the coefficient data Wi, using ti in equations (7), a residual $e_{vhi}$ can be expressed by equation (22) below:

$$e_{vhi} = k_{vhi} - (w_{i0} + w_{i1}v + v_{i2}h + w_{i3}v^2 + w_{i4}vh + w_{i5}h^2 + w_{i6}v^3 + \quad (22)$$
$$w_{i7}v^2h + w_{i8}vh^2 + w_{i9}h^3)$$
$$= k_{vhi} - \sum_{j=0}^{9} w_{ij}t_j$$

Applying the least square method to equation (22) yields equation (23) below:

$$\frac{\partial}{\partial w_{ij}} = \sum_y \sum_h (e_{vhi})^2 = \sum_y \sum_h 2\left(\frac{\partial e_{vhi}}{\partial w_{ij}}\right)e_{vhi} \quad (23)$$
$$= -\sum_y \sum_h 2t_j e_{vhi}$$
$$= 0$$

Let $X_{jk}$ and $Y_j$ be defined as in equations (24) and (25) below:

$$X_{jk} = \sum_v \sum_h t_j t_k \quad (24)$$

$$Y_j = \sum_v \sum_h t_j k_{vhi} \quad (25)$$

Then, equation (23) can be rewritten as equation (26) below:

$$\begin{pmatrix} x_{00} & x_{01} & \ldots & x_{09} \\ x_{10} & x_{11} & \ldots & x_{19} \\ \ldots & \ldots & \ddots & \ldots \\ x_{90} & x_{91} & \ldots & x_{99} \end{pmatrix} \begin{pmatrix} w_{i0} \\ w_{i1} \\ \vdots \\ w_{i9} \end{pmatrix} = \begin{pmatrix} Y_0 \\ Y_1 \\ \vdots \\ Y_9 \end{pmatrix} \quad (26)$$

Equation (26) is also a normal equation. Coefficient-seed data $w_{10}$ to $w_{n9}$ can be calculated by solving equation (26) by a general solving method such as the sweep-out method.

Figure 21:
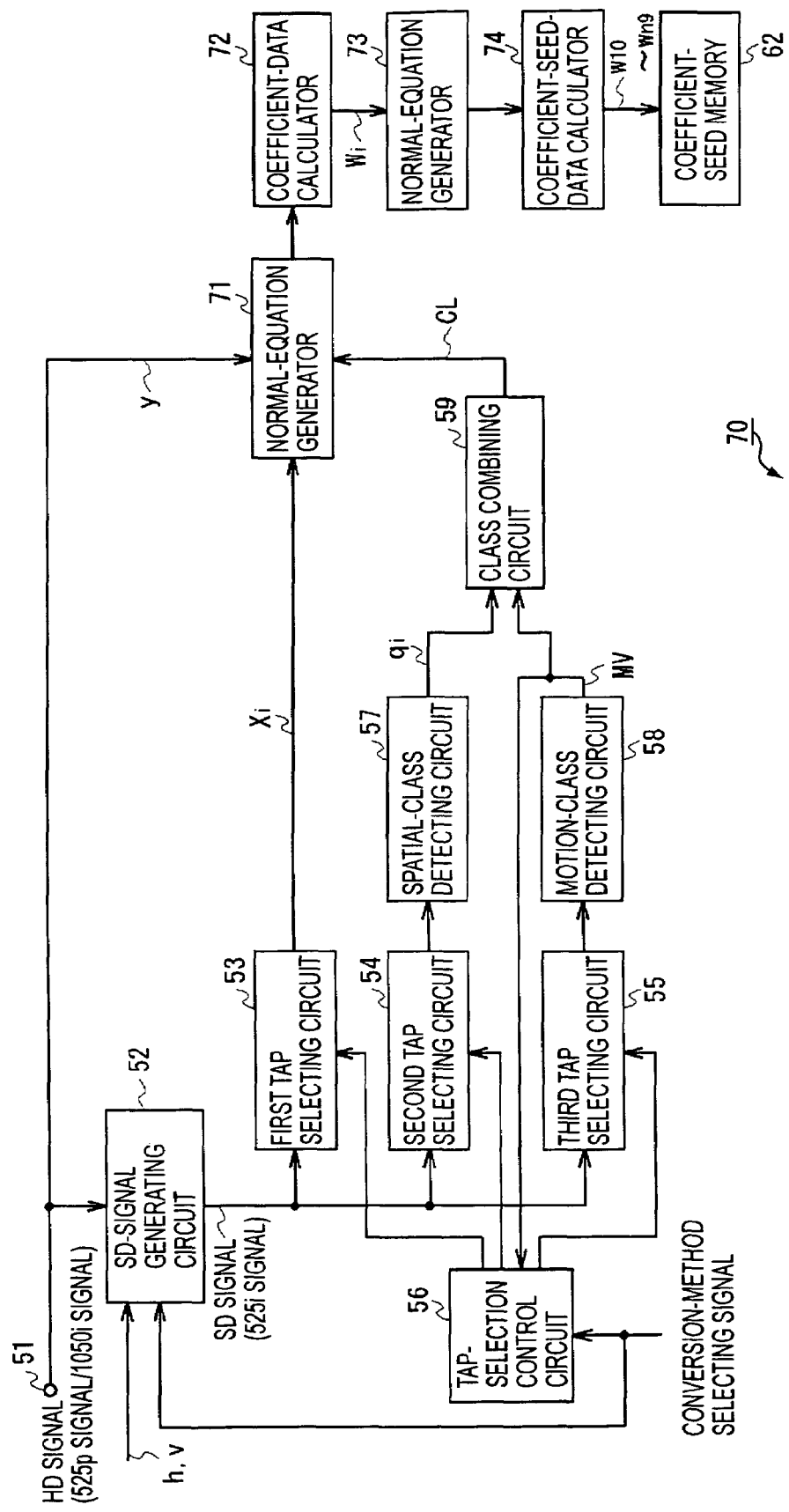
FIG. 21 is a block diagram showing the construction of a coefficient-seed-data generating apparatus according to a second embodiment of the present invention.

FIG. 21 shows the construction of a coefficient-seed data generating apparatus 70 according to the second embodiment. In FIG. 21, parts corresponding to those of the coefficient-seed-data generating apparatus 50 shown in FIG. 13 will be designated by the same numerals, and detailed descriptions thereof will be omitted.

In the coefficient-seed-data generating apparatus 70 shown in FIG. 21, a normal-equation generator 71 calculates normal equations (refer to equations (21)) for obtaining coefficient data Wi (i=1 to n) for each class, based on each piece of HD pixel data y as subject pixel data obtained from an HD signal (525p signal or 1050i signal) fed via an input terminal, prediction-tap data (SD pixel data) xi selectively extracted by the first tap selecting circuit 53 in association with each of HD pixel data y, and a class code CL fed from the class combining circuit 59 in association with each piece of HD pixel data y.

At this time, since a plurality of SD signals is sequentially generated by the SD-signal generating circuit 52 while changing the horizontal and vertical bandwidths of the filter in a stepwise manner in accordance with the parameters h and v, the normal-equation generator 60 generates a plurality of pieces of learning data based on combinations of one piece of HD pixel data y and n pieces of prediction-tap data associated with the piece of HD pixel data y, generating normal equations in which the plurality of pieces of learning data is registered.

A coefficient-data calculator 72, upon receiving data of the normal equations generated by the normal-equation generator 71, solves the normal equations to calculate coefficient data Wi for each class, associated with the SD signals.

Then, a normal-equation generator 73 generates normal equations (refer to equation (26)) for calculating coefficient-seed data $w_{10}$ to $w_{n9}$ for each class, using the coefficient data Wi for each class associated with the SD signals.

A coefficient-seed-data calculator 74, upon receiving data of the normal equations generated by the normal-equation generator 73, solves the normal equations to calculate coefficient-seed data $w_{10}$ to $w_{n9}$, and stores the coefficient-seed data $w_{10}$ to $w_{n9}$ in a coefficient-seed memory 62 whose address space is divided on a class basis.

As described above, also in the coefficient-seed-data generating apparatus 70 shown in FIG. 21, a plurality of SD signals is sequentially generated based on an HD signal fed thereto, and coefficient-seed data $w_{10}$ to $w_{n9}$ for each class, which is to be stored in the information memory bank 35 of the image-signal processor 10 shown in FIG. 1, can be generated based on the first or second conversion method in accordance with each of the SD signals.

In the image-signal processor 10 shown in FIG. 1, the generating equations expressed in equations (5) are used to generate coefficient data Wi (i=1 to n). Alternatively, for example, equations (27) or equations (28) below may be used:

$$W_1 = w_{10} + w_{11}v + w_{12}h + w_{13}v^2 + w_{14}h^2 + w_{15}v^3 + w_{16}h^3$$
$$W_2 = w_{20} + w_{21}v + w_{22}h + w_{23}v^2 + w_{24}h^2 + w_{25}v^3 + w_{26}h^3$$
$$\vdots$$
$$W_i = w_{i0} + w_{i1}v + w_{i2}h + w_{i3}v^2 + w_{i4}h^2 + w_{i5}v^3 + w_{i6}h^3$$
$$\vdots$$
$$W_n = w_{n0} + w_{n1}v + w_{n2}h + w_{n3}v^2 + w_{n4}h^2 + w_{n5}v^3 + w_{n6}h^3 \quad (27)$$

$$W_1 = w_{10} + w_{11}v + w_{12}h + w_{13}v^2 + w_{14}vh + w_{15}h^2$$
$$W_2 = w_{20} + w_{21}v + w_{22}h + w_{23}v^2 + w_{24}vh + w_{25}h^2$$
$$\vdots$$
$$W_i = w_{i0} + w_{i1}v + w_{i2}h + w_{i3}v^2 + w_{i4}vh + w_{i5}h^2$$
$$\vdots$$
$$W_n = w_{n0} + w_{n1}v + w_{n2}h + w_{n3}v^2 + w_{n4}vh + w_{n5}h^2 \quad (28)$$

Yet alternatively, polynomials of different orders or equations expressed by other functions may be used.

The image-signal processor 10 shown in FIG. 1 has been described in the context of an example where the horizontal resolution and vertical resolution of an image are adjusted by adjusting the values of parameters h and v defining the horizontal and vertical resolutions. Alternatively, for example, a parameter z defining the degree of removing (suppressing) noise may be used so that the degree of removing noise in an image can be adjusted by adjusting the value of the parameter z.

When the degree of removing noise is adjusted, as generating equations for generating coefficient data Wi (i=1 to n), for example, equations (29) or equations (30) given below may be used:

$$W_1 = w_{10} + w_{11}z + w_{12}z^2 + w_{13}z^3$$
$$W_2 = w_{20} + w_{21}z + w_{22}z^2 + w_{23}z^3$$
$$\vdots$$
$$W_i = w_{i0} + w_{i1}z + w_{i2}z^2 + w_{i3}z^3$$
$$\vdots$$
$$W_n = w_{n0} + w_{n1}z + w_{n2}z^2 + w_{n3}z^3 \quad (29)$$

$$W_1 = w_{10} + w_{11}z + w_{12}z^2$$
$$W_2 = w_{20} + w_{21}z + w_{22}z^2$$
$$\vdots$$
$$W_i = w_{i0} + w_{i1}z + w_{i2}z^2$$
$$\vdots$$
$$W_n = w_{n0} + w_{n1}z + w_{n2}z^2 \quad (30)$$

Yet alternatively, polynomials of different orders or equations expressed by other functions may be used.

Furthermore, similarly to the case of generating coefficient-seed data $w_{10}$ to $w_{n9}$ that is used as coefficient data for the generating equations including the parameters h and v, the coefficient-seed data that is used as coefficient data for generating equations including the parameter z can be generated by the coefficient-seed-data generating apparatus 50 shown in FIG. 13 or the coefficient-seed-data generating apparatus 70 shown in FIG. 21.

In that case, in the coefficient-seed-data generating apparatus 50 or 70, the parameter z is fed from the outside as a control signal to the SD-signal generating circuit 52, and when SD signals are generated from an HD signal, the degree of adding noise to the SD signals is varied in a stepwise manner. By registering learning data in which the degree of adding noise to the SD signals is varied in a stepwise manner, coefficient-seed data for achieving continuous degrees of removing noise can be generated.

Figure 22A:
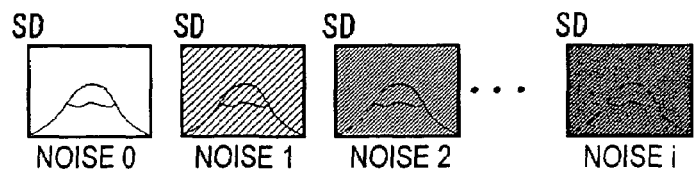
FIGS. 22A to 22C are schematic plan views for explaining methods for adding noise.

Now, first to third specific examples of methods of adding noise in accordance with the value of the parameter z will be described. In the first example, as shown in FIG. 22A, noise signals whose amplitude levels vary in a stepwise manner are added to SD signals to generate SD signals whose noise levels vary in a stepwise manner.

Figure 22B:
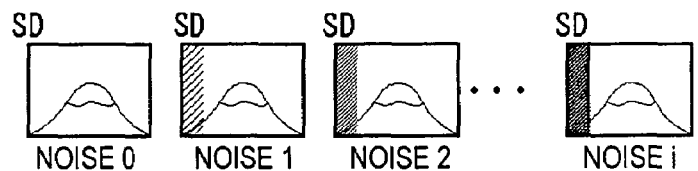
Figure 22C:
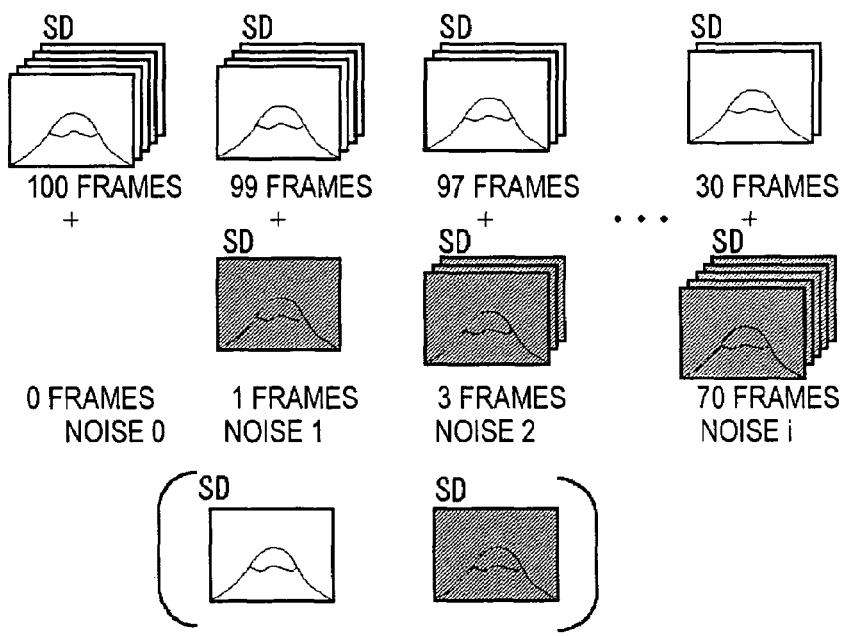

In the second example, as shown in FIG. 22B, noise signals of a constant amplitude level are added to SD signals, but the screen area to which the noise signals are added vary in a stepwise manner. In the third example, as shown in FIG. 22C, SD signals for one screen including noise and SD signals for one screen not including noise are prepared, and when normal equations are generated, learning is performed a plurality of times on each of these SD signals.

For example, in the case of "noise 0", learning is performed once for SD signals not including noise, in the case of "noise i (i is an integer not less than 0)", learning is performed thirty times for SD signals not including noise and learning is performed seventy times for SD signals including noise.

In this case, the learning system associated with "noise i" yields coefficient-seed data with a higher degree of removing noise. By performing learning while changing the number of times of learning for the SD signals not including noise and the SD signals including noise as described above, coefficient-seed data for achieving continuous degrees of removing noise can be obtained.

This method can be implemented based on summation of normal equations. First, learning is performed to calculate coefficient data for the equation for the cases of "noise 0" and "noise i". Normal equations in this case can be expressed as equations (21) given earlier.

Now, let the i-th learning value of SD pixel data at the j-th prediction-tap position be denoted by $x_{ij}$, the i-th learning value of HD pixel data by $y_i$, the associated coefficient by Wi, and $P_{ij}$ and $Q_j$ as in equations (31) and (32) below:

$$P_{ij} = \sum_P x_{pi} x_{pj} \quad (31)$$

$$Q_j = \sum_P x_{pj} y_p \quad (32)$$

Then, equation (21) can be rewritten as equation (33) below:

$$\begin{pmatrix} P_{11} & P_{12} & \cdots & P_{1n} \\ P_{21} & P_{22} & \cdots & P_{2n} \\ \cdots & \cdots & \ddots & \cdots \\ P_{n1} & P_{n2} & \cdots & P_{nn} \end{pmatrix} \begin{pmatrix} w_1 \\ w_2 \\ \vdots \\ w_n \end{pmatrix} = \begin{pmatrix} Q_1 \\ Q_2 \\ \vdots \\ Q_n \end{pmatrix} \quad (33)$$

Let the left-hand side and right-hand side of equation (33) in a case where learning of the SD signals not including noise is performed as described above be denoted by $[P1_{ij}]$ and $[Q1_i]$. Similarly, let the left-hand side and right-hand side of equation (33) in a case where learning of the SD signals including noise is performed as described above be denoted by $[P2_{ij}]$ and $[Q2_i]$. Furthermore, let $[Pa_{ij}]$ and $[Qa_i]$ be defined as in equations (34) and (35) below:

$$[P_{aij}] = (1-a)[P1_{ij}] + a[P2_{ij}] \quad (34)$$

$$[Q_{ai}] = (1-a)[Q1_i] + a[P2_i] \quad (35)$$

where $0 \leq a \leq 1$.

The normal equations in the case of a=0 can be expressed by equation (36) below:

$$[P_{aij}][W_i] = [Q_{ai}] \quad (36)$$

This is equivalent to normal equations for the case of "noise 0" shown in FIG. 22C, and is equivalent to normal equations for the case of "noise i" when a=0.7.

By generating normal equations for each noise level while changing the value of a in a stepwise manner, desired coefficient-seed data can be obtained. In this case, similarly to the case of the coefficient-seed-data generating apparatus 70 shown in FIG. 21, coefficient data Wi can be calculated from the normal equations for each noise level, and coefficient-seed data can be calculated using the coefficient data.

Alternatively, by combining normal equations for each noise level, normal equations for obtaining coefficient-seed data, such as equation (13), may be generated. This method will be described below in detail in the context of an example where normal equations for generating coefficient-seed data are generated using equations (30).

SD signals with noise levels in accordance with several values of the parameter z are generated in advance, and learning is performed. Let [P] and [Q] in equations (34) and (35) be denoted by $[Pn_{ij}]$ and $[Qn_i]$. Then, equations (7) given earlier can be rewritten as equations (37) below:

$$t_0=1, t_1=Z, t_2=z^2 \quad (37)$$

In this case, equations (24) and (25) given earlier can be respectively rewritten as equations (38) and (39) below:

$$X_{ipjq} = \sum_Z t_p t_q P_{sij} \quad (38)$$

$$Y_{ip} = \sum_Z t_p Q_{zi} \quad (39)$$

Rewriting the variable representing the total number of prediction taps in these equations as m yields equation (40) below:

$$\begin{pmatrix} x_{1010} & x_{1011} & x_{1012} & x_{1020} & \cdots & x_{10m2} \\ x_{1110} & x_{1111} & x_{1112} & x_{1120} & \cdots & x_{11m2} \\ x_{1210} & x_{1211} & x_{1212} & x_{1220} & \cdots & x_{12m2} \\ x_{2010} & x_{2011} & x_{2012} & x_{2020} & \cdots & x_{20m2} \\ \vdots & \vdots & \vdots & \vdots & \ddots & \vdots \\ x_{m210} & x_{m211} & x_{m212} & x_{m220} & \cdots & x_{m2m2} \end{pmatrix} \begin{pmatrix} w_{10} \\ w_{11} \\ w_{12} \\ w_{20} \\ \vdots \\ w_{m2} \end{pmatrix} = \begin{pmatrix} Y_{10} \\ Y_{11} \\ Y_{12} \\ Y_{20} \\ \vdots \\ Y_{m2} \end{pmatrix} \quad (40)$$

Coefficient-seed data $w_{ij}$ can be calculated by solving equation (40).

The image-signal processor 10 shown in FIG. 1 has been described in the context of an example where the horizontal and vertical resolutions of an image are adjusted by adjusting the values of the parameters h and v defining the horizontal and vertical resolutions. Alternatively, for example, the horizontal and vertical resolutions may be adjusted using a single parameter.

In this case, a single parameter r is interpreted, for example, in the following manner: r=1 represents (h, v)=(1, 1), r=2 represents (h, v)=(2, 2), ... or r=1 represents (h, v)=(1, 2), r=2 represents (h, v)=(2, 3), .... In this case, for example, a polynomial of r is used as a generating equation for generating coefficient data Wi (i=1 to n).

The image-signal processor 10 shown in FIG. 1 has been described in the context of an example where the horizontal resolution and vertical resolution of an image are adjusted by adjusting the values of parameters h and v defining the horizontal and vertical resolutions. Alternatively, for example, a parameter r for defining the horizontal and vertical resolution and a parameter z defining the degree of removing (suppressing) noise may be used so that the horizontal and vertical resolutions and the degree of removing noise in an image can be adjusted by adjusting the values of the parameters r and z.

In this case, as generating equations for generating coefficient data Wi (i=1 to n), for example, equations (41) given below can be used:

$$W_1 = w_{10} + w_{11}r + w_{12}z + w_{13}r^2 + \quad (41)$$
$$w_{14}rz + w_{15}z^2 + w_{16}r^3 + w_{17}r^2z + w_{18}rz^2 + w_{19}z^3$$
$$W_2 = w_{20} + w_{21}r + w_{22}z + w_{23}r^2 + w_{24}rz +$$
$$w_{25}z^2 + w_{26}r^3 + w_{27}r^2z + w_{28}rz^2 + w_{29}z^3$$
$$\vdots$$
$$W_i = w_{i0} + w_{i1}r + w_{i2}z + w_{i3}r^2 +$$
$$w_{i4}rz + w_{i5}z^2 + w_{i6}r^3 + w_{i7}r^2z + w_{i8}rz^2 + w_{i9}z^3$$
$$\vdots$$
$$W_n = w_{n0} + w_{n1}r + w_{n2}z + w_{n3}r^2 +$$
$$w_{n4}rz + w_{n5}z^2 + w_{n6}r^3 + w_{n7}r^2z + w_{n8}rz^2 + w_{n9}z^3$$

Alternatively, polynomials of different orders or equations expressed by other functions may be used.

Figure 23:
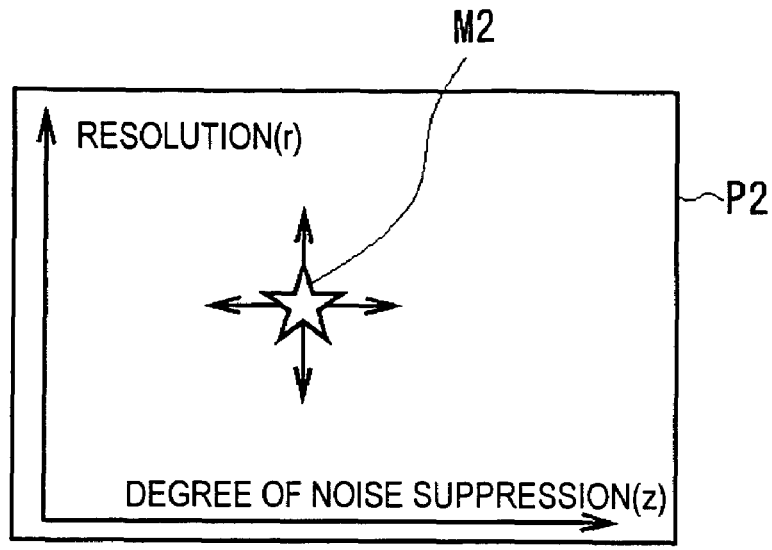
FIG. 23 is a schematic diagram showing display status of a screen for adjusting parameters r and z.

A user interface for adjusting the plurality of parameters r and z can be configured similarly to that shown in FIG. 2. More specifically, referring to FIG. 23, in which parts corresponding to those in FIGS. 2 and 3 are designated by the same numerals, an adjusting screen P2 in which the adjustment position of the parameters r and z are indicated by a star-shaped icon M2 is shown is OSD-displayed.

The user is allowed to move the icon M2 freely in a desired direction in the adjusting screen by horizontally or vertically moving the joystick 4a on the remote-control transmitter 4. Thus, the user is allowed to adjust the value of the parameter r defining resolution and the value of the parameter z defining the degree of removing (suppressing) noise as desired in accordance with the position of the icon M2. Alternatively, the values of the parameters r and z adjusted by the user may be displayed on the screen in the form of numeric values.

Coefficient-seed data used as coefficient data of a generating equation including the parameters r and z can be generated by the coefficient-seed-data generating apparatus 50 shown in FIG. 13 or the coefficient-seed-data generating apparatus 70 shown in FIG. 21, similarly to the case of generating coefficient-seed data w10 to wn9 used as coefficient data Wi for the generating equation including the parameters h and v.

In this case, in the coefficient-seed-data generating apparatus 50 or 70, the parameters r and z are fed from the outside as control signals to the SD-signal generating circuit 52. When SD signals are generated from an HD signal in accordance with the values of the parameters r and z, the horizontal and vertical bandwidths and the degree of adding noise are varied in a stepwise manner. By registering learning data while changing the horizontal and vertical bandwidths and the degree of adding noise in a stepwise manner, coefficient-seed data for achieving continuous degrees of removing noise can be generated.

Figure 24:
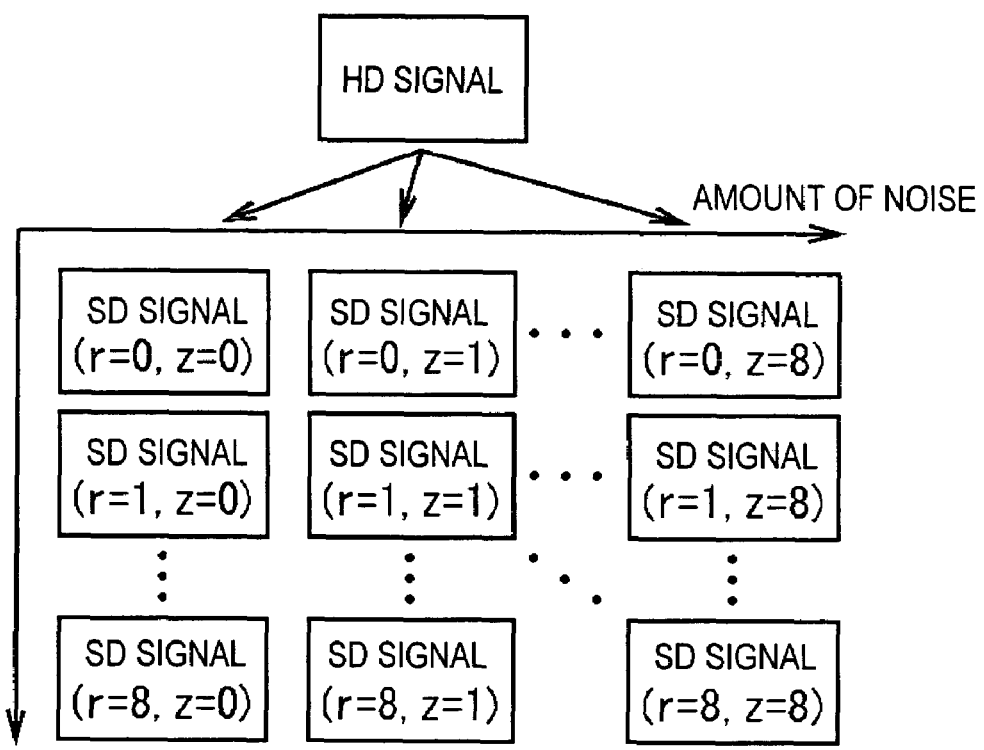
FIG. 24 is a schematic diagram for explaining an example of generating an SD signal based on parameters r and z.

FIG. 24 shows the scheme of the method of generating coefficient-seed data. A plurality of SD signals is generated from an HD signal. For example, each of the values of the parameters r and z of the filter that is used to generate SD signals from an HD signal are each varied to take on nine values to generate a total of 81 SD signals. Coefficient-seed data is generated by performing learning between the HD signal and the plurality of SD signals generated. The values of the parameters r and z may be varied to take on more than nine values. In that case, however, although the accuracy of coefficient-seed data is improved, the amount of computation increases.

The image-signal processor 10 shown in FIG. 1 has been described in the context of an example where the horizontal resolution and vertical resolution of an image are adjusted by adjusting the values of parameters h and v defining the horizontal and vertical resolutions. In addition to the parameters h and v, for example, a parameter z defining the degree of removing (suppressing) noise may be used so that the horizontal and vertical resolutions and the degree of removing noise in an image can be adjusted by adjusting the values of the parameter h, v, and z.

In this case, as generating equations for generating coefficient data Wi (i=1 to n), for example, equations (42) given below can be used:

$$W_1 = w_{1\_0} + w_{1\_1}v + w_{1\_2}h + w_{1\_3}z + w_{1\_4}v^2 + w_{1\_5}h^2 + w_{1\_6}z^2 +$$
$$w_{1\_7}vh + w_{1\_8}hz + w_{1\_9}zv + w_{1\_10}v^3 + w_{1\_11}h^3 + w_{1\_12}z^3 +$$
$$w_{1\_13}v^2h + w_{1\_14}vh^2 + w_{1\_15}vhz + w_{1\_16}vz^2 + w_{1\_17}h^2z +$$
$$w_{1\_18}hz^2 + w_{1\_19}z^3$$
$$W_2 = w_{2\_0} + w_{2\_1}v + w_{2\_2}h + w_{2\_3}z + w_{2\_4}v^2 + w_{2\_5}h^2 + w_{2\_6}z^2 +$$
$$w_{2\_7}vh + w_{2\_8}hz + w_{2\_9}zv + w_{2\_10}v^3 + w_{2\_11}h^3 + w_{2\_12}z^3 +$$
$$w_{2\_13}v^2h + w_{2\_14}vh^2 + w_{2\_15}vhz + w_{2\_16}vz^2 + w_{2\_17}h^2z +$$
$$w_{2\_18}hz^2 + w_{2\_19}z^3$$

(42)

-continued $$\vdots$$
$$W_i = w_{i\_0} + w_{i\_1}v + w_{i\_2}h + w_{i\_3}z + w_{i\_4}v^2 + w_{i\_5}h^2 + w_{i\_6}z^2 +$$
$$w_{i\_7}vh + w_{i\_8}hz + w_{i\_9}zv + w_{i\_10}v^3 + w_{i\_11}h^3 + w_{i\_12}z^3 +$$
$$w_{i\_13}v^2h + w_{i\_14}vh^2 + w_{i\_15}vhz + w_{i\_16}vz^2 + w_{i\_17}h^2z +$$
$$w_{i\_18}hz^2 + w_{i\_19}z^3$$
$$\vdots$$
$$W_n = w_{n\_0} + w_{n\_1}v + w_{n\_2}h + w_{n\_3}z + w_{n\_4}v^2 + w_{n\_5}h^2 + w_{n\_6}z^2 +$$
$$w_{n\_7}vh + w_{n\_8}hz + w_{n\_9}zv + w_{n\_10}v^3 + w_{n\_11}h^3 + w_{n\_12}z^3 +$$
$$w_{n\_13}v^2h + w_{n\_14}vh^2 + w_{n\_15}vhz + w_{n\_16}vz^2 + w_{n\_17}h^2z +$$
$$w_{n\_18}hz^2 + w_{n\_19}z^3$$

Alternatively, polynomials of different orders or equations expressed by other functions may be used.

Figure 25:
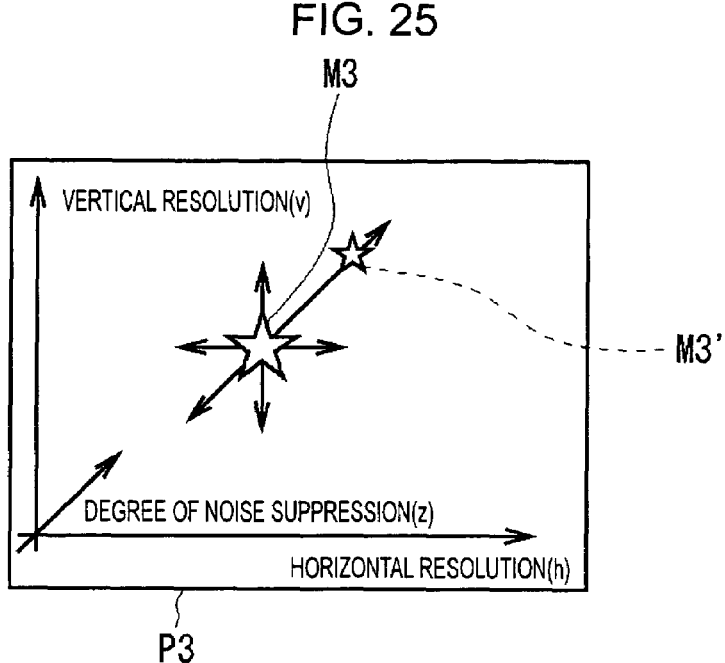
FIG. 25 is a schematic diagram showing display status of a screen for adjusting parameters h, v, and z.

A user interface for adjusting the plurality of parameters h, v, and z can be configured similarly to that shown in FIG. 2. More specifically, referring to FIG. 25, in which parts corresponding to those in FIGS. 2 and 3 are designated by the same numerals, an adjusting screen P3 in which the adjustment position of the parameters h, v, and z are indicated by a star-shaped icon M3 is shown is OSD-displayed.

The user is allowed to move the icon M3 freely in a desired direction in the adjusting screen by horizontally or vertically moving the joystick 4a on the remote-control transmitter 4. Thus, the user is allowed to adjust the value of the parameters h and v defining horizontal and vertical resolutions and the value of the parameter z defining the degree of removing (suppressing) noise as desired in accordance with the position of the icon M3.

The value of the parameter h defining horizontal resolution is adjusted by horizontally moving the icon M3, the value of the parameter v defining vertical resolution is adjusted by vertically moving the icon M3, and the value of the parameter z defining degree of removing noise is adjusted by moving the icon M3 in the depth direction. The icon can be moved in the depth direction by, for example, operating the joystick 4a diagonally.

In this case, the depth direction may be represented by changing the size, color density, color tone, or the like of the icon M3. An icon M3' indicated by a broken line in FIG. 25 indicates a state where the icon M3 indicated by a solid line has been moved in the depth direction by changing the size thereof. The values of the parameters h, v, and z adjusted by the user may be displayed on the adjusting screen P3 in the form of numeric values.

Coefficient-seed data used as coefficient data of a generating equation including the parameters h, v, and z can be generated by the coefficient-seed-data generating apparatus 50 shown in FIG. 13 or the coefficient-seed-data generating apparatus 70 shown in FIG. 21, similarly to the case of generating coefficient-seed data w10 to wn9 used as coefficient data Wi for the generating equation including the parameters h and v.

In this case, in the coefficient-seed-data generating apparatus 50 or 70, the parameters h, v, and z are fed from the outside as control signals to the SD-signal generating circuit 52. When SD signals are generated from an HD signal in accordance with the values of the parameters h, V, and z, the horizontal and vertical bandwidths and the degree of adding noise are varied in a stepwise manner. By registering learning data while varying the horizontal and vertical bandwidths and the degree of adding noise in a stepwise manner, coefficient-seed data for achieving continuous degrees of removing noise can be generated.

Figure 26:
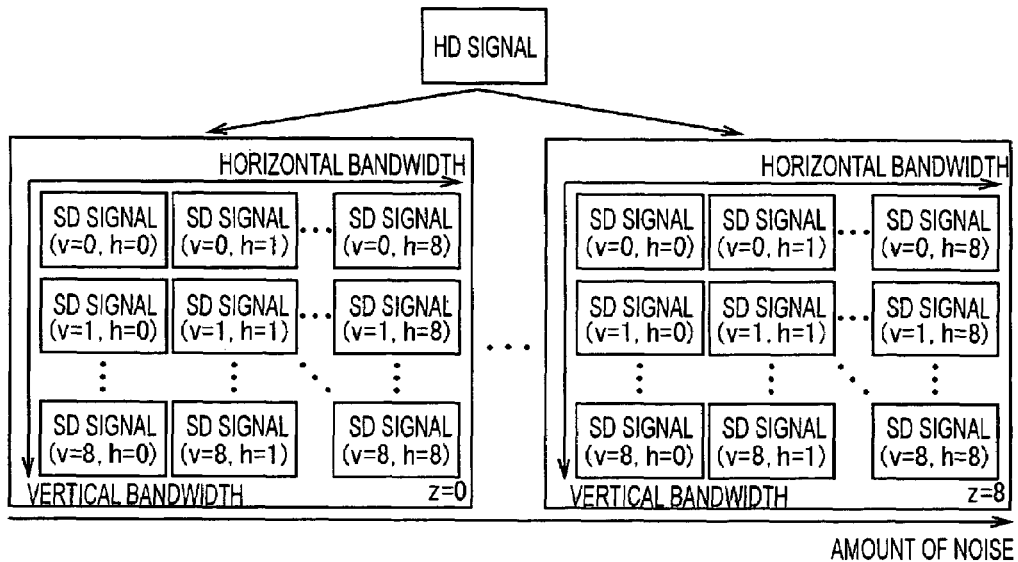
FIG. 26 is a schematic diagram for explaining an example of generating an SD signal based on parameters h, v, and z.

FIG. 26 shows the scheme of the method of generating coefficient-seed data. A plurality of SD signals is generated from an HD signal. For example, each of the values of the parameters h, v, and z of the filter that is used to generate SD signals from an HD signal are each varied to take on nine values to generate a total of 729 SD signals. Coefficient-seed data is generated by performing learning between the HD signal and the plurality of SD signals generated. The values of the parameters h, v, and z may be varied to take on more than nine values. In that case, however, although the accuracy of coefficient-seed data is improved, the amount of computation increases.

(2-2) Construction of Image Processor According to the Second Embodiment

Figure 27:
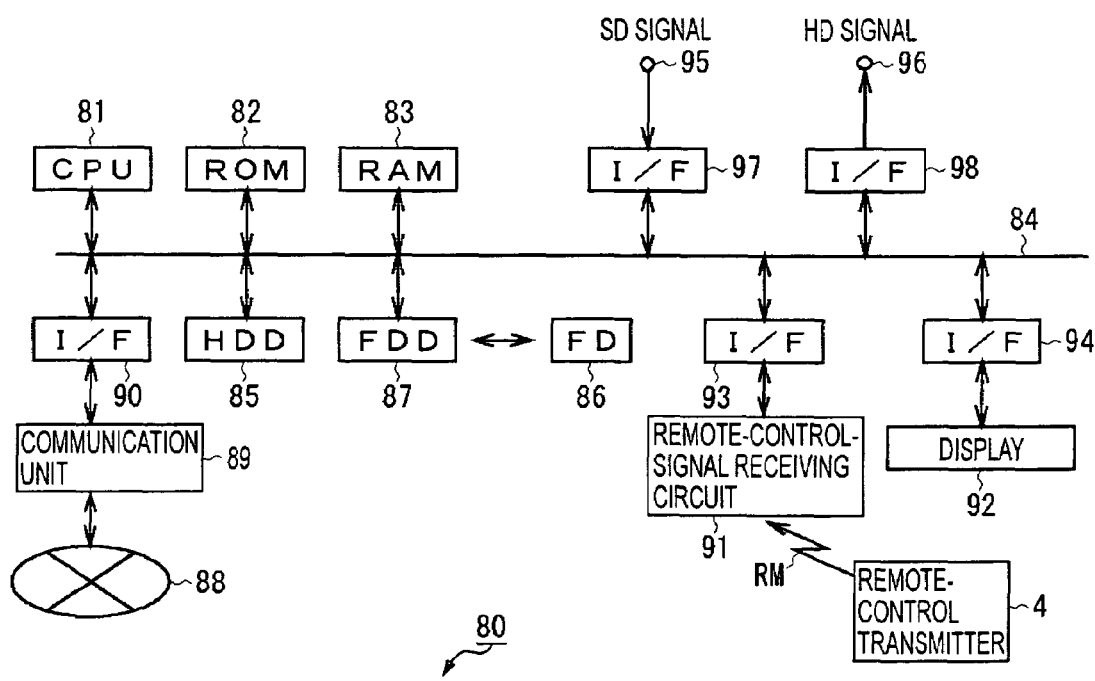
FIG. 27 is block diagram showing the construction of an image-signal processor according to the second embodiment.

Processing that is executed by the image-signal processor 10 shown in FIG. 1 may be implemented in software, for example, using an image-signal processor shown in FIG. 27.

The image-signal processor 80 shown in FIG. 27 includes a CPU 81 that controls the overall operation of the apparatus, a read-only memory (ROM) storing an operation program for the CPU 81, coefficient-seed data, and the like, and a random access memory (RAM) 83 that serves as a work area for the CPU 81, these components being connected to each other via a bus 84.

Furthermore, the image-signal processor 80 includes a hard disk drive (HDD) 85 as an external storage device, and a floppy disk drive (FDD) 87 for driving a floppy disk 86, these components being connected to each other via the bus 84.

Furthermore, the image-signal processor 80 includes a communication unit 89 for connecting to a communication network 88, such as the Internet, by wire or by wireless. The communication unit 89 is connected to the bus 84 via an interface 90.

Furthermore, the image-signal processor 80 includes a user-interface unit. The user-interface unit includes a remote-control-signal receiving circuit 91 for receiving a remote-control signal RM transmitted from the remote-control transmitter 4, and a display 92 implemented, for example, by a liquid crystal display (LCD). The remote-control-signal receiving circuit 91 and the display 92 are connected to the bus 84 via interfaces 93 and 94, respectively.

Furthermore, the image-signal processor 80 has an input terminal 95 for inputting an SD signal, and an output terminal 96 for outputting HD signals, connected to the bus 84 via interfaces 97 and 98, respectively.

Instead of storing processing programs, coefficient-seed data, or the like in the ROM 82 in advance, these items may be downloaded from the communication network 88 such as the Internet via the communication unit 89 and stored in the hard disk 85 or the RAM 83. Alternatively, processing programs, coefficient-seed data, or the like may be provided using the floppy disk 86.

Furthermore, instead of inputting an SD signal to be processed from the input terminal 95, the SD signal may be recorded in advance in the hard disk 85, or downloaded from the communication network 88 such as the Internet via the communication unit 89. Furthermore, instead of or in addition to outputting HD signals to the output terminal 96, the HD signals may be fed to a display to display a corresponding image, stored in the hard disk 85, or sent to the communication network 89 such as the Internet via the communication unit 89.

Figure 28:
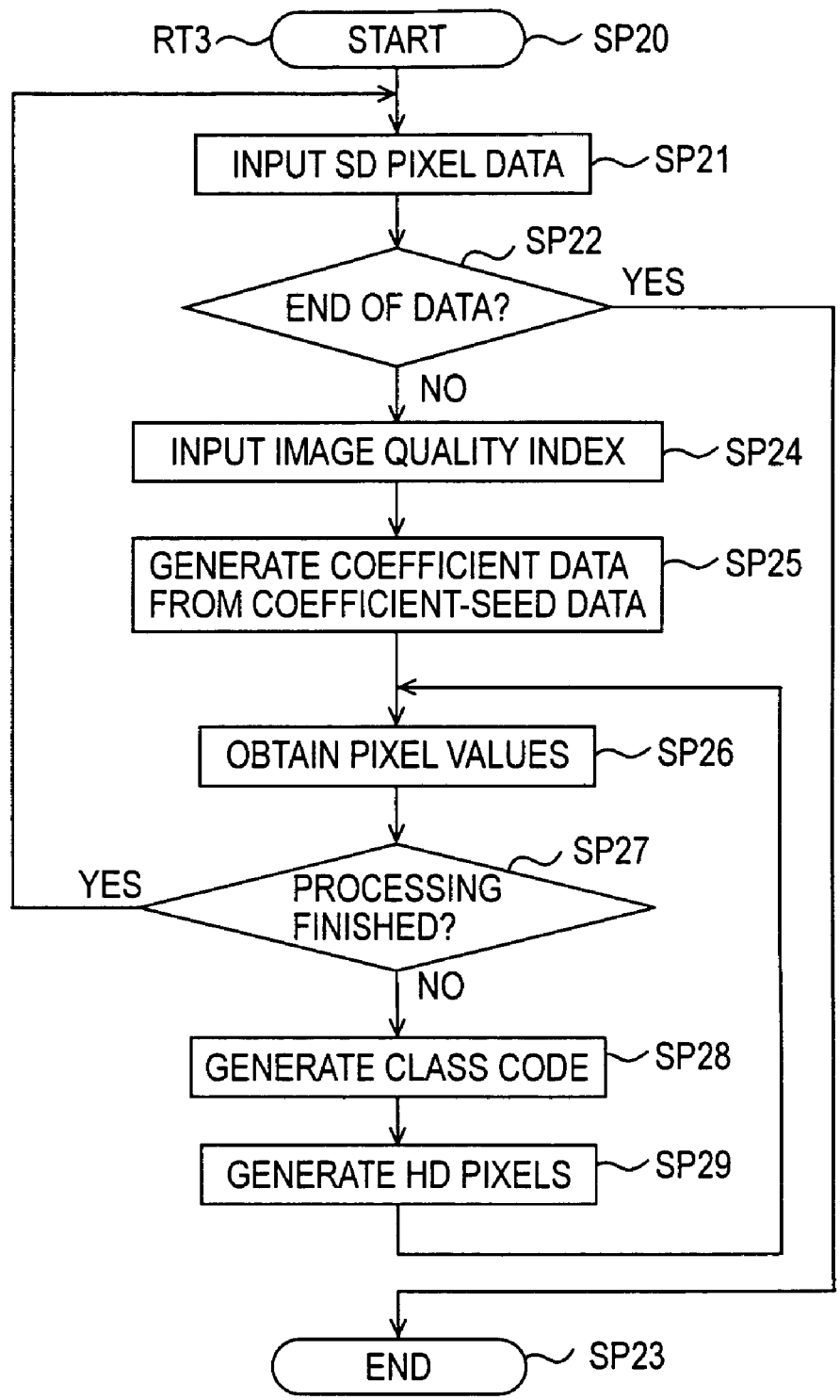
FIG. 28 is a flowchart of an up-conversion routine.

In the image-signal processor 80 shown in FIG. 27, the CPU 81 executes an up-conversion routine RT3 shown in FIG. 28 to up-convert an SD signal (525*i* signal) to an HD signal (525*p* signal or 1050*i* signal).

The CPU 81 starts the up-conversion routine RT3 in step SP20. Then, in step SP21, the CPU 81 inputs SD pixel data on a frame basis or on a field basis. When the SD pixel data is input from the outside via the input terminal 95, the CPU 81 temporarily stores the data in the RAM 83. When the SD pixel data is read from the hard disk 85, the CPU 81 temporarily stores the data in the RAM 83.

Then, in step SP22, the CPU 81 determines whether processing for all the frames or all the fields of SD pixel data has already been finished. When step SP22 turns out positive, the CPU 81 determines that processing has been finished. Then, in step SP23, the CPU 81 exits the up-conversion routine RT3.

On the other hand, when step SP22 turns out negative, in step SP24, the CPU 81 reads values specifying image quality (e.g., the values of the parameters h and v), input by the user using the remote-control transmitter 4, from the RAM 83.

Then, in step SP25, the CPU 81 generates coefficient data Wi for the estimating equation (refer to equation (4)) for each class according to the generating equation (e.g., equations (5)), using the image-quality parameter values read from the RAM 83 and coefficient-seed data for each class.

Then, in step SP26, the CPU 81 obtains pixel data of class taps and prediction taps associated with each piece of HD pixel data from input SD pixel data.

Then, in step SP27, the CPU 81 determines whether processing for obtaining HD pixel data has been finished for the entire region of the input SD pixel data. When step S27 turns out positive, returning to step SP21, the CPU 81 enters processing for inputting SD pixel data of a next frame or field.

On the other hand, when step SP27 turns out negative, the CPU 81 determines that processing has not been finished. Then, in step SP28, the CPU 81 generates a class code CL from SD pixel data of class taps obtained.

Then, in step SP29, the CPU 81 generates HD pixel data according to the estimating equation given earlier, using coefficient data associated with the class code CL generated and the SD pixel data of prediction taps. Then, returning to step SP26, the CPU 81 repeats the steps described above.

By executing the up-conversion routine shown in FIG. 28, it is possible to obtain HD pixel data constituting an HD signal from input SD pixel data constituting an SD signal.

In the image-signal processor 80 described above, HD signals obtained by the processing described above are output via the output terminal, fed to the display 92 to display a corresponding image on the screen, or fed to the hard disk drive 85 and recorded on the hard disk.

The processing executed by the coefficient-seed-data generating apparatus 50 shown in FIG. 13 may be implemented in software. Although the construction of a processing apparatus for that purpose is not shown, similarly to the case described above, coefficient-seed data can be generated by the CPU 81 of the apparatus executing a coefficient-seed-data generating routine shown in FIG. 24.

The CPU 81 starts the coefficient-seed-data generating routine RT4 from step SP30. Then, in step SP31, the CPU 81 selects image-quality patterns (e.g., defined by the parameters h and v) used for learning. Then, in step SP32, the CPU 81 determines whether learning has been finished for all the image-quality patterns.

When step SP32 turns out negative, it is indicated that learning has not been finished for all the image-quality patterns. Then, in step SP33, the CPU 81 inputs known HD pixel data on a frame basis or on a field basis.

Then, in step SP34, the CPU 81 determines whether processing has been finished for all the frames or all the fields of HD pixel data. When step SP34 turns out positive, returning to step SP31, the CPU 81 repeats the steps described above.

When step SP34 turns out negative, in step SP35, the CPU 81 generates SD pixel data based on the HD pixel data input in step SP33, based on the image-quality patterns selected in step SP31.

Then, in step SP36, the CPU 81, based on the SD pixel data, obtains pixel data of class taps and prediction taps associated with each piece of HD pixel data input in step SP35.

Then, in step SP37, the CPU 81 determines whether learning has been finished for the entire region of SD pixel data generated. When step SP37 turns out positive, returning to step SP33, the CPU 81 enters processing for inputting HD pixel data of a next frame or field, and repeats the steps described above.

On the other hand, when step SP37 turns out negative, in step SP38, the CPU 81 generates a class code CL from the SD pixel data of class taps obtained. Then, in step SP39, the CPU 81 generates normal equations (refer to equation (13)). Then, returning to step SP36, the CPU 81 repeats the steps described above.

When step SP32 turns out positive, the CPU 81 determines that learning has been finished for all the image-quality patterns. Then, in step SP40, the CPU 81 solves the normal equations, for example, by the sweep-out method, to calculate coefficient-seed data for each class. Then, in step SP41, the CPU 81 stores the coefficient-seed data in a memory. Then, in step SP42, the CPU 81 exits the coefficient-seed-data generating routine RT4.

Figure 29:
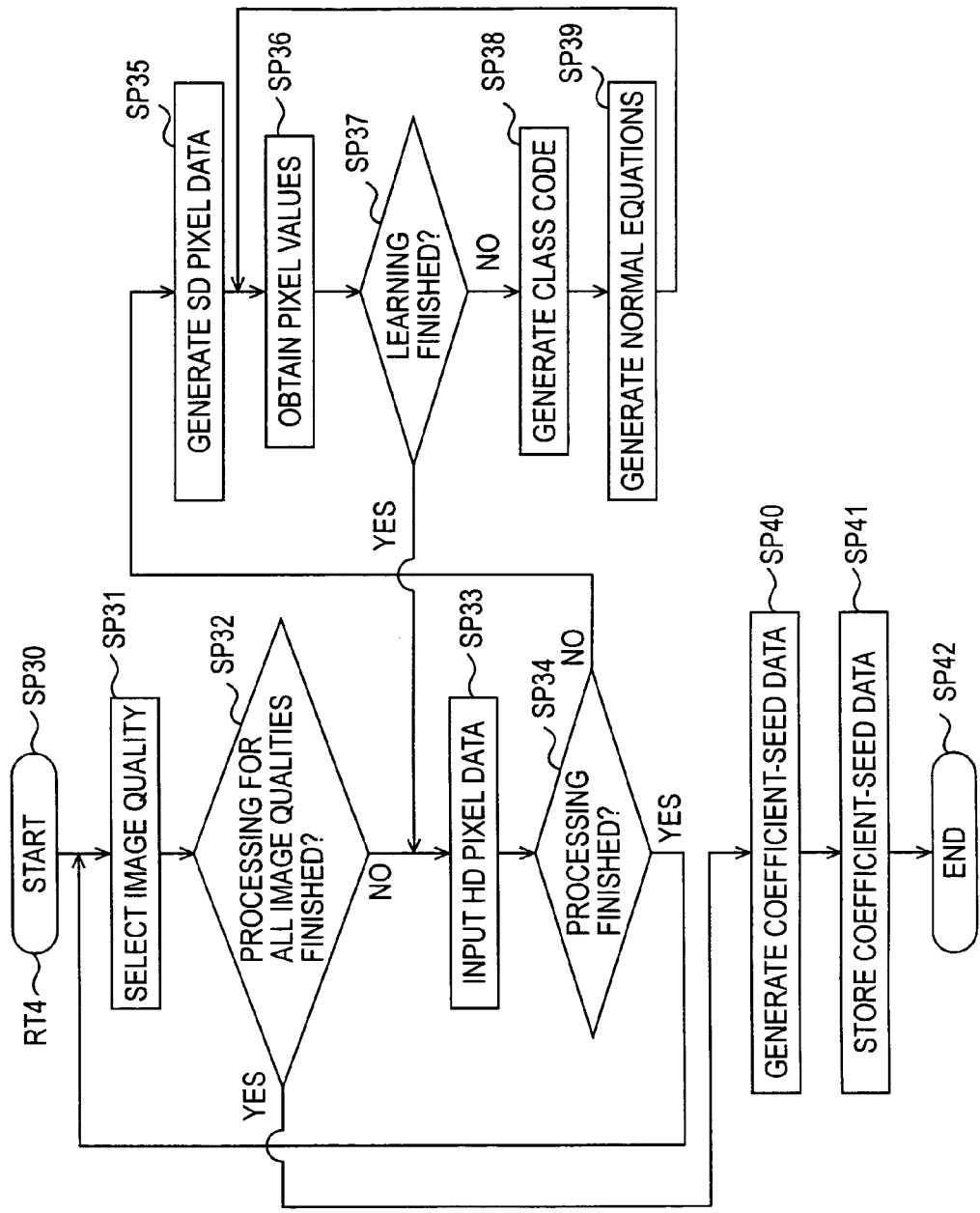
FIG. 29 is a flowchart of a coefficient-seed-data generating routine.

By executing the coefficient-seed-data generating routine RT4 shown in FIG. 29, coefficient-seed data for each class can be obtained by the same method as that used by the coefficient-seed-data generating apparatus 50 shown in FIG. 13.

Although the construction of a processing apparatus is not shown, the processing executed by the coefficient-seed-data generating apparatus 70 shown in FIG. 21 can also be implemented in software. That is, coefficient-seed data can be generated by a CPU (not shown) executing a coefficient-seed-data generating routine RT5 shown in FIG. 30.

The CPU starts the coefficient-seed-data generating routine RT5 from step SP50. Then, in step SP51, the CPU selects an image-quality pattern (e.g., defined by the parameters h and v) used for learning. Then, in step SP52, the CPU determines whether coefficient data has been calculated for all the image-quality patterns.

When step SP52 turns out negative, it is indicated that coefficient data has not been calculated for all the image-quality patterns. Then, in step SP53, the CPU inputs known HD pixel data on a frame basis or on a field basis.

Then, in step SP54, the CPU determines whether processing for all the frames or fields of HD pixel data has been finished. When step SP54 turns out negative, in step SP55, the CPU generates SD pixel data from the HD pixel data input in step SP53, based on the image-quality pattern selected in step SP51.

Then, in step SP56, the CPU, based on the SD pixel data, obtains pixel data of class taps and prediction taps associated with each piece of HD pixel data input in step SP53.

Then, in step SP7, the CPU determines whether learning has been finished for the entire region of the SD pixel data generated. When step SP57 turns out positive, returning to step SP53, the CPU enters processing for inputting HD pixel data of a next frame or field, and repeats the steps described above.

On the other hand, when step SP57 turns out negative, in step SP58, the CPU generates a class code CL from the SD pixel data of class taps obtained. Then, in step SP59, the CPU generates normal equations (refer to equations (21)) for obtaining coefficient data. Then, returning to step SP56, the CPU repeats the steps described above.

When step SP54 turns out positive, in step SP60, the CPU solves the normal equations generated in step SP59, for example, by the sweep-out method, to calculate coefficient data for each class. Then, returning to step SP51, the CPU repeats the steps described above.

When step SP52 turns out positive, the CPU determines that learning has been finished for all the image-quality patterns. Then, in step SP61, the CPU generates normal equations (refer to equation (26)) for obtaining coefficient-seed data from the coefficient data for all the image-quality patterns.

Then, in step SP62, the CPU solves the normal equations, for example, by the sweep-out method, to calculate coefficient-seed data for each class. Then, in step SP63, the CPU stores the data in the memory. Then, in step SP64, the CPU exits the coefficient-seed-data generating routine RT5.

Figure 30:
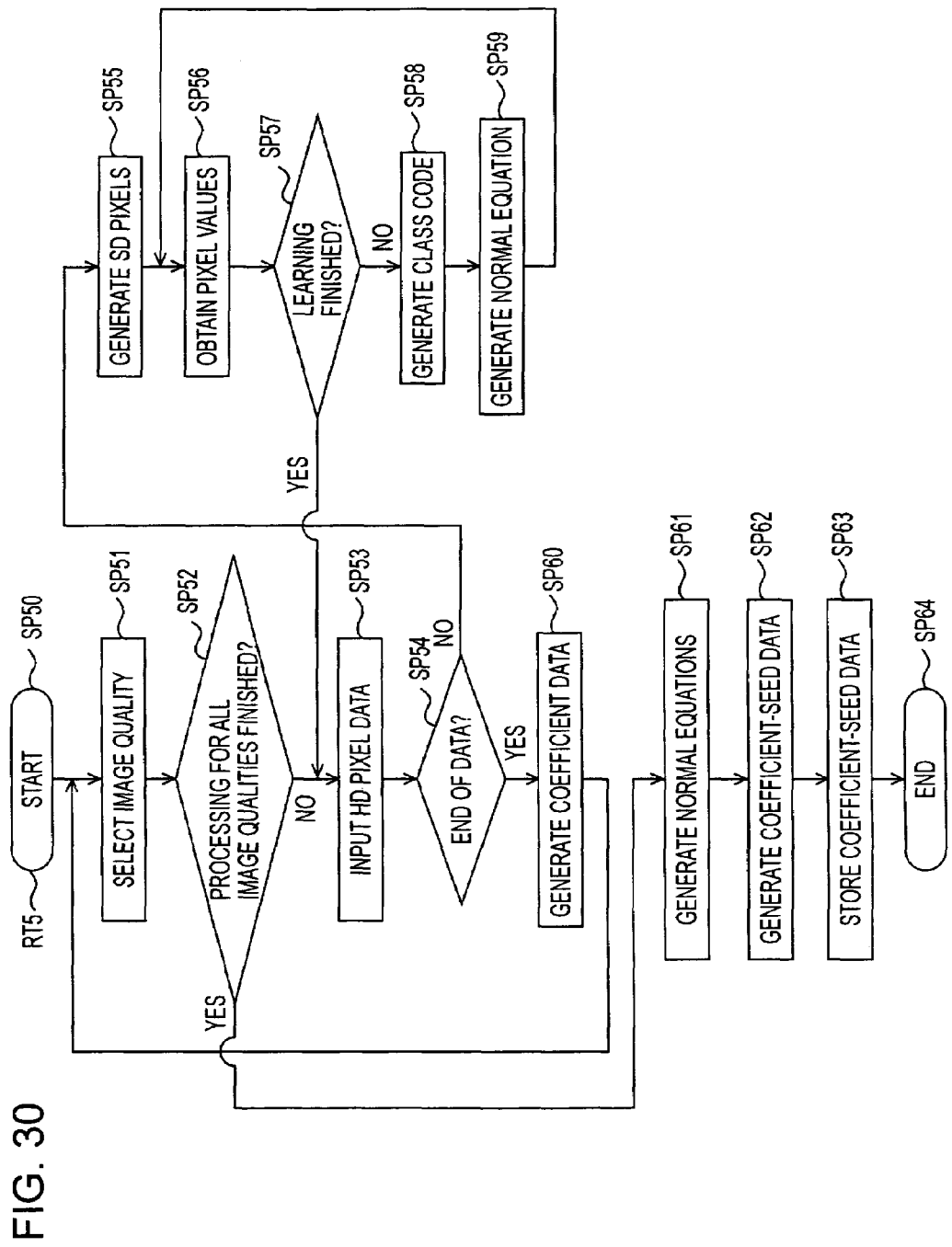
FIG. 30 is a flowchart of a coefficient-seed-data generating routine.

By executing the coefficient-seed-data generating routine RT5 shown in FIG. 30, coefficient-seed data for each class can be obtained by the same method as that used by the coefficient-seed-data generating apparatus 70 shown in FIG. 21.

(2-3) Construction of Television Receiver According to Second Embodiment

Figure 31:
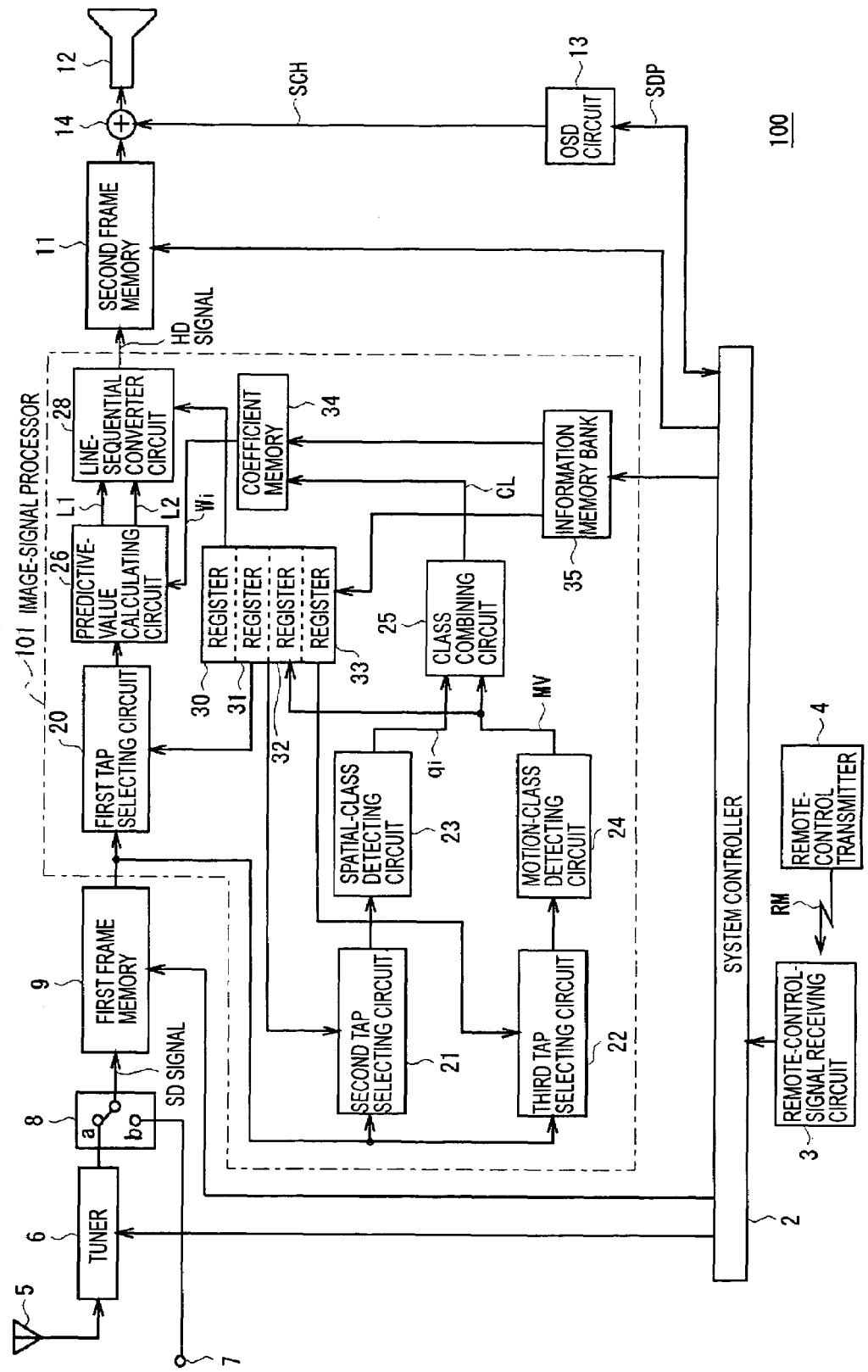
FIG. 31 is a block diagram showing the construction of a television receiver according to the second embodiment.

FIG. 31 shows the construction of a television receiver 100 according to the second embodiment, in which parts corresponding to those in FIG. 1 are designated by the same numerals. The television receiver 100 obtains an SD signal (525*i* signal) from a broadcasting signal, and up-converts the SD signal into an HD signal (525*p* signal or 1050*i* signal).

The television receiver 100 shown in FIG. 31 is constructed similarly to the television receiver 1. However, the television receiver 100 does not include the normalizing circuit 27, the normalization-coefficient memory 38, the normalization-coefficient generating circuit 37, and the coefficient generating circuit 36 included in the image-signal processor 10 of the television receiver 1 shown in FIG. 1. Furthermore, information stored in the information memory bank 35 of the image-signal processor 10 differs.

More specifically, similarly to the information memory bank 35 of the image-signal processor 10 shown in FIG. 1, the information memory bank 35 stores operation specifying information that is to be stored in the register 30, and tap position information that is to be stored in the registers 31 to 33. Furthermore, the information memory bank 35 stores coefficient data for each combination of class and values of the parameters h and v, associated with each of the first conversion method (up-conversion to 525*p* signal) and the second conversion method (up-conversion to 1050*i* signal).

Furthermore, the information memory bank 35 stores coefficient-seed data for each class, associated with each of the first and second conversion methods. The coefficient-seed data is used as coefficient data of the generating equation for generating coefficient data that is to be stored in the coefficient memory 34.

In an image-signal processor 101 of the image-signal processor 100, coefficient data for each class, associated with the values of the parameters h and v adjusted by the user and the conversion method, is read from the information memory bank 35 under the control of the system controller 2, for example, in a vertical blanking period, and stored in the coefficient memory 34. The coefficient data is information that is used for up-converting an SD signal (525$i$ signal) into an HD signal (525$p$ signal or 1050$i$ signal).

When coefficient data associated with the values of the parameters h and v adjusted is not stored in advance in the information memory bank 35, the system controller 2 reads coefficient data associated with neighboring values of the parameters h and v adjusted from the information memory bank 35, and performs interpolation to obtain coefficient data associated with the values of the parameters h and v adjusted.

Then, upon receiving a class code CL from the class combining circuit 25 as read-address information, under the control of the system controller 2, coefficient data associated with the class code CL is read from the coefficient memory 34, and transferred to the predictive-value calculating circuit 26.

The predictive-value calculating circuit 26 calculates data of a subject pixel of HD signal that is to be generated, based on the prediction-tap data (SD pixel data) xi selectively extracted by the first tap selecting circuit 20 and the coefficient data Wi read from the coefficient memory 34.

In the case of up-conversion to an HD signal (525$p$ signal), the predictive-value calculating circuit 26 as described with reference to FIG. 4, in the odd-numbered field and the even-numbered field, line data L1 composed of pixels located on the same lines as the lines of the SD signal (525$i$ signal) and line data L2 composed of pixels located on lines between the lines of the SD signals (525$i$ signal) are generated, doubling the number of pixels on each line of the line data L1 and L2.

When up-converting an SD signal (525$i$ signal) into an HD signal (1050$i$ signal), in the odd-numbered field and the even-numbered field, as shown in FIG. 5, the predictive-value calculating circuit 26 generates line data L1 and L1' composed of pixels located on lines that are close to the lines of the SD signal (525$i$ signal) and line data L2 and L2' composed of pixels located on lines that are remote from the lines of the SD signal (525$i$ signal), doubling the number of pixels on each line of the line data L1, L1', L2, and L2'.

Thus, the predictive-value calculating circuit 26 simultaneously generates data of four pixels constituting the HD signal (525$p$ signal or 1050$i$ signal). At this time, the predictive-value calculating circuit 26 calculates HD pixel data y according to the estimating equation expressed in equation (4), based on pieces of coefficient data Wi read from the coefficient memory 34, having different values, and prediction-tap data (SD pixel data) xi.

When the first conversion method that outputs a 525$p$ signal is selected, in the odd-numbered field and the even-numbered field, line data L1 of lines located on lines corresponding to the lines of the 525$i$ signal, and line data L2 of pixels located on lines between the lines of the 525$i$ signal are generated (refer to FIG. 4). When the second conversion method that outputs a 1050$i$ signal is selected, in the odd-numbered field and the even-numbered field, line data L1 and L1' composed of pixels located on lines that are close to the lines of the 525$i$ signal and line data L2 and L2' of pixels located on lines that are remote from the lines of the 525$i$ signal are generated (refer to FIG. 5).

The line data L1 and L2 (L1' and L2') generated by the predictive-value calculating circuit 26 is sequentially fed to the line-sequential converter circuit 28. The line-sequential converter circuit 28 converts the line data L1 and L2 (L1' and L2') fed thereto into line-sequential data by doubling the line rate to reduce the horizontal period to half.

The line-sequential converter circuit 28 switches its operation between cases where 525$p$ signals are output as HD signals and cases where 1050$i$ signals are output as HD signals, in accordance with operation specifying information fed from the register 30.

As described above, in the image-signal processor, HD pixel data y can be calculated using coefficient data Wi (i=1 to n) for the estimating equation in accordance with the values of the parameters h and v adjusted. Thus, the user is allowed to adjust image quality of an HD signal freely and smoothly with respect to each of the horizontal and vertical resolutions.

As described above, in the information memory bank 35 of the image-signal processor 101, coefficient data for each combination of class and the values of the parameters h and v, associated with each of the first and second conversion methods, generated by learning, is stored in advance.

As described above, in the image-signal processor 10 shown in FIG. 1, coefficient-seed data is generated by performing learning to generate coefficient data for each class for each SD signal obtained by changing the values of the parameters h and v in a stepwise manner, and then calculating coefficient-seed data for each class using the coefficient data for each class for each SD signal. However, in the image-signal processor 101 shown in FIG. 31, coefficient data for each combination of class and the values of the parameters h and v, stored in advance in the information memory bank 35, may be generated by the method described above.

Figure 32:
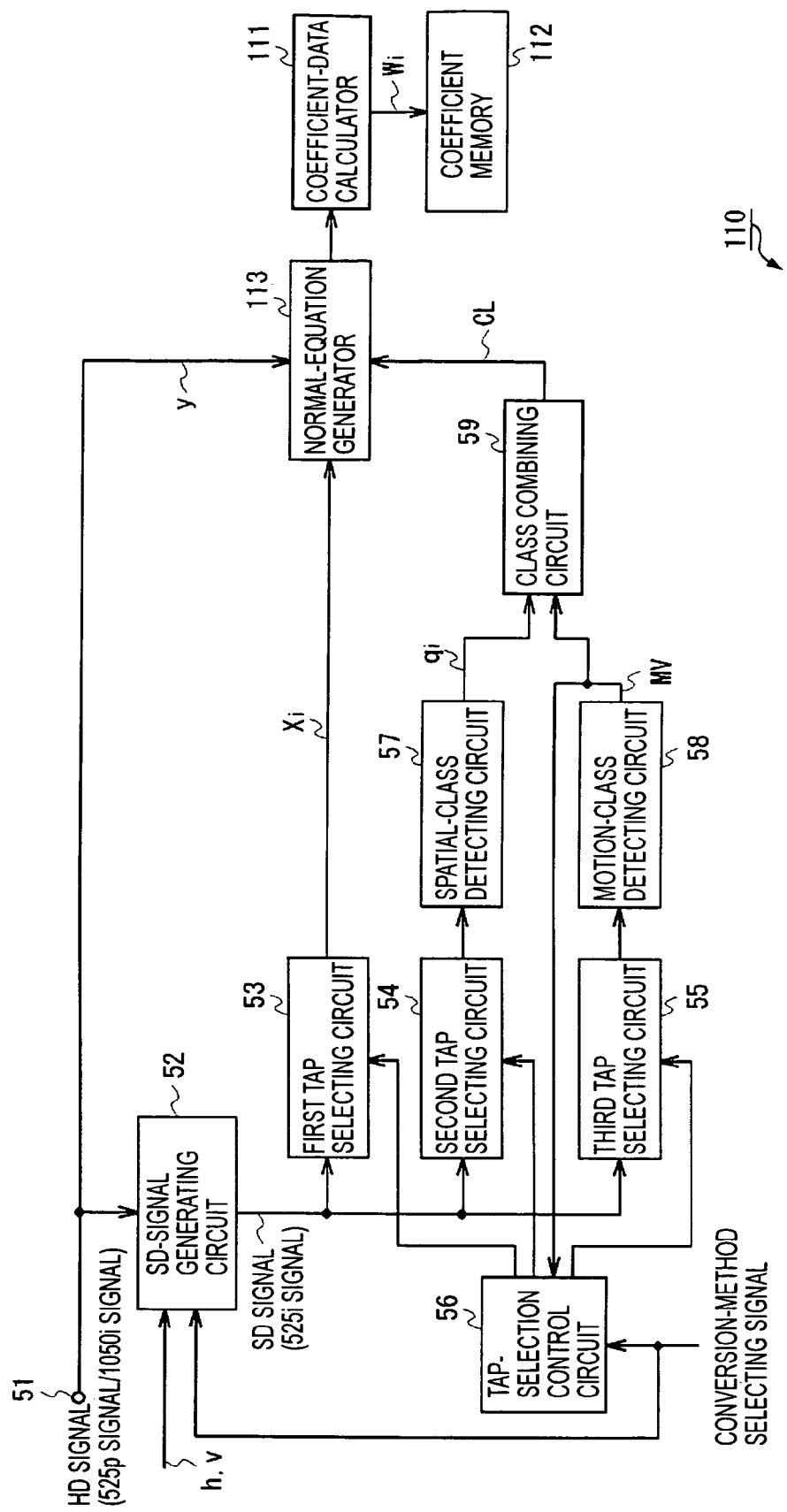
FIG. 32 is a block diagram showing the construction of a coefficient-data generating apparatus according to the second embodiment.

(2-4) Construction of Coefficient-Data Generating Apparatus According to Second Embodiment FIG. 32 shows the construction of a coefficient-data generating apparatus 110 according to the second embodiment, in which parts corresponding to those in FIG. 13 are designated by the same numerals. The coefficient-data generating apparatus 110 shown in FIG. 32 differs from the coefficient-seed-data generating apparatus 50 shown in FIG. 13 in that a coefficient-data calculator 111 and a coefficient memory 112 are provided instead of the coefficient-seed-data calculator 61 and the coefficient-seed memory 62 and in the construction of a normal-equation generator 113. The coefficient-data generating apparatus 110 is constructed otherwise the same as the coefficient-seed-data generating apparatus 50.

When an HD signal (525$p$ signal or 1050$i$ signal) as a teacher signal is input to the coefficient-data generating apparatus 110 via the input terminal 51, the SD-signal generating circuit 52 generates SD signals as input signals by horizontally and vertically decimating the HD signal.

The normal-equation generator 113 generates normal equations (refer to equation (21)) for obtaining coefficient data Wi (i=1 to n) for each class, based on each piece of HD pixel data y as subject pixel data obtained from the HD signal fed via the input terminal 51, prediction-tap data (SD pixel data) xi selectively extracted by the first tap selecting circuit 53 in association with the piece of HD pixel data y, and a class code CL fed from the class combining circuit 59 in association with the piece of HD pixel data y.

The coefficient-data calculator 111, upon receiving data of the normal equations for each class fed from the normal-equation generator 113, solves the normal equations, for example, by the sweep-out method, to calculate coefficient data Wi for each class associated with each SD signal. Then, the coefficient-data calculator 111 stores the coefficient data Wi in a coefficient memory 112 whose address space is divided on the basis of combination of class and the values of the parameters h and v.

As described above, in the coefficient-data generating apparatus 110, a plurality of SD signals is sequentially generated based on an HD signal fed thereto, and coefficient data for each class that is to be stored in the information memory bank 35 of the image-signal processor 101 shown in FIG. 31 can be generated in accordance with the first or second conversion method associated with the SD signal.

The image-signal processor 101 shown in FIG. 31 has been described in the context of an example where the horizontal resolution and vertical resolution of an image are adjusted by adjusting the values of parameters h and v defining the horizontal and vertical resolutions.

Alternatively, for example, a parameter r for defining the horizontal and vertical resolution and a parameter z defining the degree of removing (suppressing) noise may be used so that the horizontal and vertical resolutions and the degree of removing noise in an image can be adjusted by adjusting the values of the parameters r and z. In this case, coefficient data for each combination of class and the values of the parameters r and z, associated with each of the first and second conversion methods, is stored in advance in the information memory bank of the image-signal processor.

Similarly to the case where coefficient data associated with the values of the parameters h and v is generated in the coefficient-seed-data generating apparatus 50 shown in FIG. 13, coefficient data can be generated by the coefficient-data generating apparatus 110 shown in FIG. 32. In this case, the parameter z is fed as a control signal to the SD-signal generating circuit 52 from the outside, and when generating an SD signal from the HD signal, the degree of adding noise to the SD signal is varied in a stepwise manner in accordance with the value of the parameter z. Coefficient data for achieving continuous degrees of removing noise can be generated by registering learning data obtained by varying the degree of adding noise to the SD signal in a stepwise manner.

The image-signal processor 101 shown in FIG. 31 has been described in the context of an example where the horizontal resolution and vertical resolution of an image are adjusted by adjusting the values of parameters h and v defining the horizontal and vertical resolutions. In addition to the parameters h and v, for example, a parameter z defining the degree of removing (suppressing) noise may be used so that the horizontal and vertical resolutions and the degree of removing noise in an image can be adjusted by adjusting the values of the parameters h, v, and z.

In this case, coefficient data for each combination of class and the values of the parameters h, v, and z, associated with each conversion method, is stored in advance in the information memory bank 35 of the image-signal processor 101.

Similarly to the case where coefficient data associated with the values of the parameters h and v is generated in the coefficient-seed-data generating apparatus 50 shown in FIG. 13, coefficient data can be generated by the coefficient-data generating apparatus 110 shown in FIG. 32. In this case, the parameters h, v, and z are fed as control signals to the SD-signal generating circuit 52 from the outside, and when generating an SD signal from the HD signal, the degree of adding noise to the SD signal is varied in a stepwise manner in accordance with the value of the parameters h, v, and z. Coefficient data for achieving continuous degrees of removing noise can be generated by registering learning data obtained by varying the degree of adding noise to the SD signal in a stepwise manner.

(2-5) Software Processing Executed by the Image-Signal Processor in the Second Embodiment The processing executed by the image-signal processor 101 shown in FIG. 31 may be implemented in software using the image-signal processor 80 shown in FIG. 27, similarly to processing executed by the image-signal processor 10 shown in FIG. 1. In that case, coefficient data is stored in advance in the ROM 82 or the like.

Figure 33:
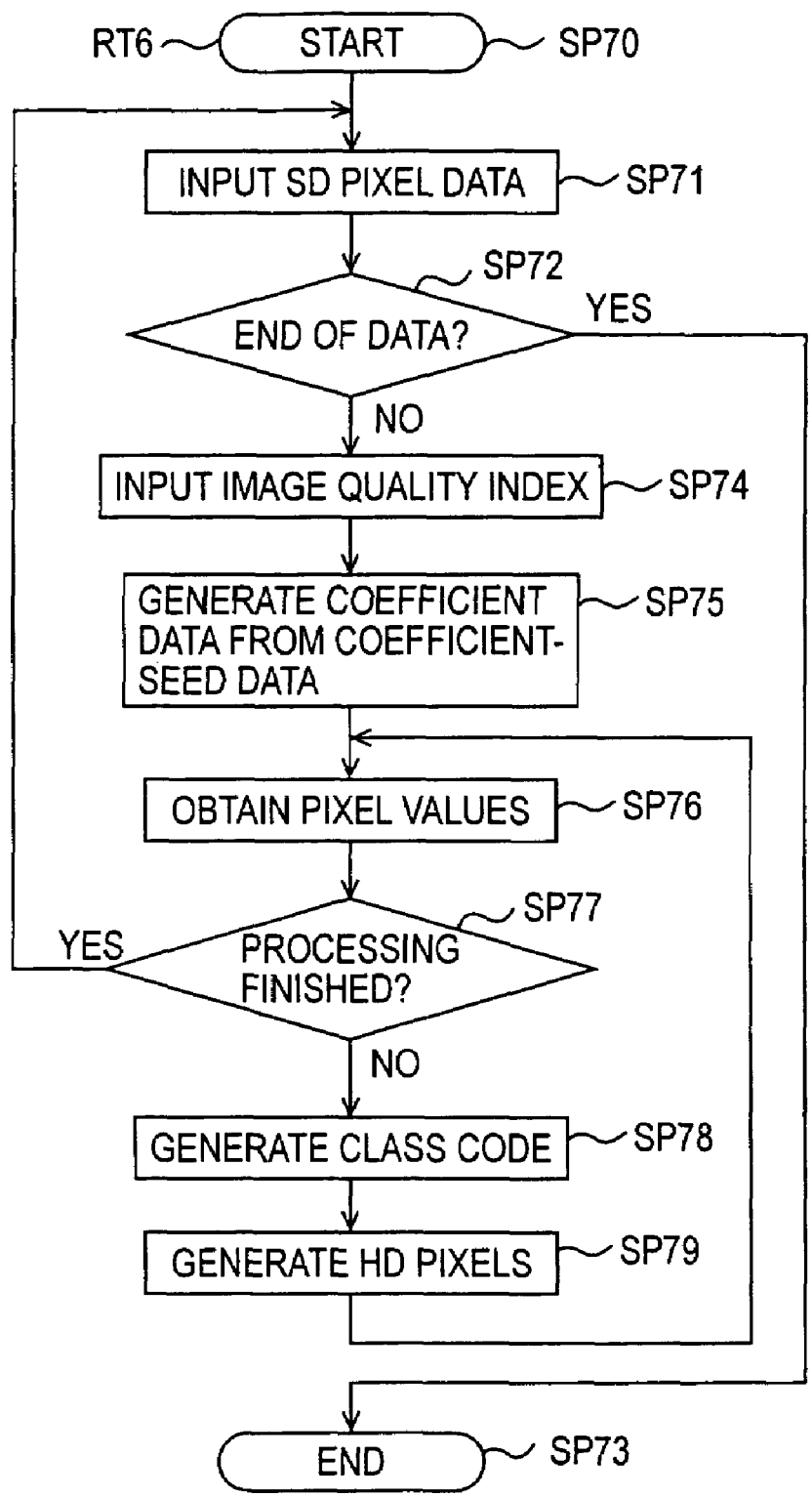
FIG. 33 is a flowchart of an up-conversion routine.

In the image-signal processor 80 shown in FIG. 27, the CPU 81 is allowed to up-convert an SD signal (525$i$ signal) into an HD signal (525$p$ signal or 1050$i$ signal) by executing an up-conversion routine RT6 shown in FIG. 33.

The CPU 81 starts the up-conversion routine RT6 in step SP70. Then, in step SP71, the CPU 81 inputs SD pixel data on a frame basis or field basis. When the SD pixel data is input from the outside via an input terminal 95, the CPU 81 temporarily stores the data in the RAM 83. Also, when the SD pixel data is read from the hard disk 85, the CPU 81 temporarily stores the data in the RAM 83.

Then, in step SP72, the CPU 81 determines whether processing has been finished for all the frames or fields of the input SD pixel data. When step SP72 turns out positive, the CPU 81 determines that processing has been finished. Then, in step SP73, the CPU 81 exits the up-conversion routine RT6.

On the other hand, when step SP72 turns out negative, in step SP74, the CPU 81 reads image quality specifying values (e.g., the values of the parameters h and v) input by the user using the remote-control transmitter 4.

Then, in step SP75, the CPU 81 reads coefficient data Wi for each class from the ROM 82 or the like, based on the image-quality specifying values read from the RAM 83, and temporarily stores the coefficient data Wi in the RAM 83.

Then, in step SP76, the CPU 81 obtains pixel data of class taps and prediction taps associated with each pixel of HD pixel data from the input SD pixel data.

Then, in step SP77, the CPU 81 determines whether processing for obtaining HD pixel data has been finished for the entire region of the input SD pixel data. When step SP77 turns out positive, returning to step SP71, the CPU 81 enters processing for inputting SD pixel data of a next frame or field.

On the other hand, when step SP77 turns out negative, the CPU 81 determines that processing has not been finished. Then, in step SP78, the CPU 81 generates a class code CL from the SD pixel data of class taps obtained.

Then, in step SP79, the CPU 81 generates HD pixel data according to the estimating equation given earlier, using coefficient data associated and SD pixel data of prediction taps associated with the class code CL generated. Then, returning to step SP76, the CPU 81 repeats the steps described above.

By executing the up-conversion routine RT6 shown in FIG. 33, HD pixel data constituting an HD signal can be obtained from SD pixel data constituting an input SD signal.

The image-signal processor 80 outputs the HD signal via an output terminal, fed to a display 92 to display a corresponding image on the screen, or fed to the hard disk drive 85 and recorded on the hard disk.

(2-6) Processing Executed by the Coefficient-Data Generating Apparatus According to Second Embodiment The processing executed by the coefficient-data generating apparatus 110 shown in FIG. 32 may be implemented in software, similarly to the processing executed by the coefficient-seed-data generating apparatus 50 shown in FIG. 13.

Although the construction is not shown, similarly to the case described earlier, coefficient data can be generated by a CPU in the processing apparatus executing a coefficient-data generating routine RT7.

The CPU starts the coefficient-data generating routine RT7 from step SP80. Then, in step SP81, the CPU selects an image-quality pattern (e.g., defined by the parameters h and v) used for learning. Then, in step SP82, the CPU determines whether processing for calculating coefficient data has been finished for all the image-quality patterns.

When step SP82 turns out negative, it is indicated that processing has not been finished for all the image-quality patterns. Then, in step SP83, the CPU inputs known HD pixel data on a frame basis or on a field basis.

Then, in step SP84, the CPU determines whether processing for all the frames or fields of HD pixel data has been finished. When step SP84 turns out negative, in step SP85, the CPU generates SD pixel data from the HD pixel data input in step SP83, based on the image-quality pattern selected in step SP81.

Then, in step SP86, the CPU obtains pixel data of class taps and prediction taps associated with each piece of HD pixel data input in step SP83, based on the SD pixel data generated.

Then, in step SP87, the CPU determines whether learning has been finished for the entire region of the SD pixel data generated. When step SP87 turns out positive, returning to step SP83, the CPU enters processing for inputting HD pixel data of a next frame or field, and repeats the steps described above.

On the other hand, when step SP87 turns out negative, in step SP88, the CPU generates class code CL from the SD pixel data of class taps obtained. Then, in step SP89, the CPU generates normal equations (refer to equation (21)). Then, returning to step SP86, the CPU repeats the steps described above.

When step SP84 turns out positive, the CPU determines that processing for all the frames or all the fields of HD pixel data has been finished. Then, in step SP90, the CPU solves the normal equations generated in step SP89, for example, by the sweep-out method, to calculate coefficient data for each class. Then, returning to step SP81, the CPU repeats the steps described above.

When step SP82 turns out positive, the CPU determines that the processing for calculating coefficient data has been finished for all the image-quality patterns. Then, in step SP91, the CPU stores coefficient data for each class for all the image-quality patterns in the memory. Then, in step SP92, the CPU exits the coefficient-data generating routine RT7.

Figure 34:
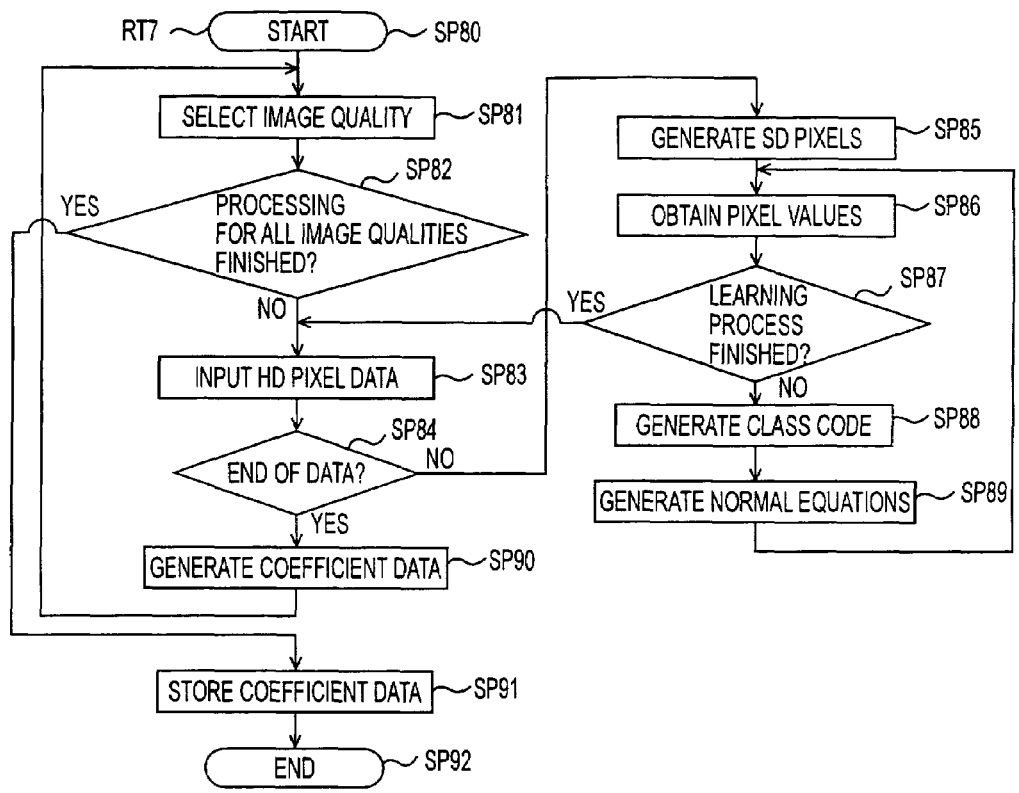
FIG. 34 is a flowchart of a coefficient-data generating routine.

By executing the coefficient-data generating routine RT7 shown in FIG. 34, coefficient data for each class for all the image-quality patterns can be obtained by the same method as that used by the coefficient-data generating apparatus 110.

Although a linear equation is used as an estimating equation for generating HD signals, without limitation thereto, an equation of a higher degree may be used as an estimating equation.

Although the embodiment has been described in the context of a case where an SD signal (525*i* signal) is up-converted into an HD signal (525*p* signal or 1050*i* signal), without limitation thereto, various processing for image conversion may be executed using an estimating equation.

Furthermore, although the embodiment has been described in the context of a case where the function of increasing resolution or noise suppression (noise removal) is continuously switched by changing the value of a parameter input, without limitation thereto, the function of decoding or conversion of signal format may also be switched.

Figure 35:
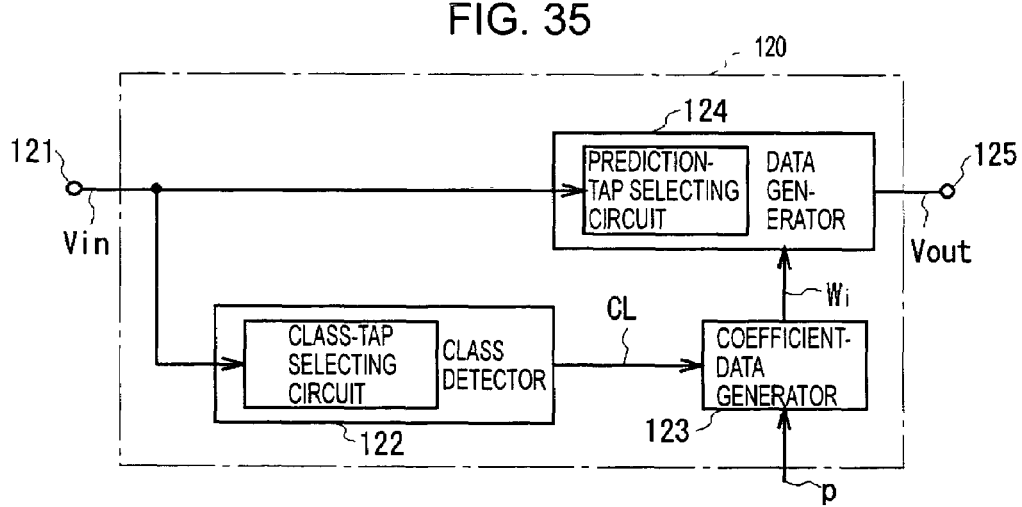
FIG. 35 is a block diagram showing the construction of an image-signal processor according to the second embodiment.

FIG. 35 shows an image-signal processor 120 that allows switching of these functions. In the image-signal processor 120, switching of increasing resolution, noise suppression, MPEG decoding, JPEG decoding, conversion of a composite signal into a component signal, or the like, is allowed.

The image-signal processor 120 includes a class detector 122, a coefficient-data generator 123, and a data generator 124. The class detector 122 extracts class-tap data from a video signal $V_{in}$ fed via an input terminal 121, and detects a class CL from the data. The coefficient-data generator 123 generates coefficient data Wi for an estimating equation, associated with the class CL detected and a parameter P input from the outside. The data generator 124 generates a video signal Vout based on the coefficient data Wi generated and the prediction-tap data extracted from the video signal $V_{in}$, and outputs the video signal $V_{out}$ via an output terminal 125.

Figures 36, 37:
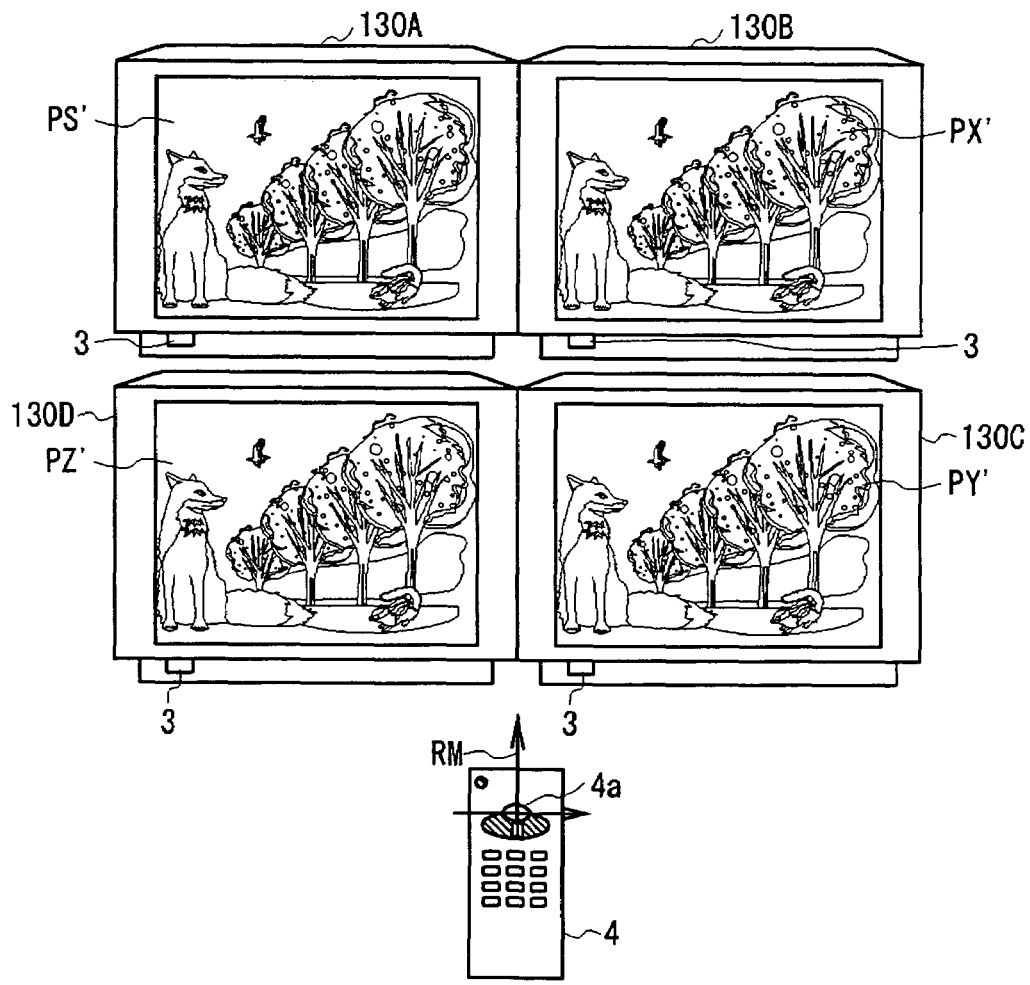
FIG. 36 is a table showing association between values of a parameter V and functions.
FIG. 37 is a schematic diagram showing display status of processing results based on different parameter values on displays.

The parameter P fed to the coefficient-data generator 123 is used to select one of the functions described above. For example, as shown in FIG. 36, the function of increasing resolution is selected when the value of the parameter P is $P_1$, the function of noise suppression is selected when the value of the parameter P is $P_2$, the function of MPEG decoding (rate a) is selected when the value of the parameter P is $P_3$, the function of MPEG decoding (rate b) is selected when the value of the parameter P is $P_4$, the function of conversion of a composite signal into component signals is selected when the value of the parameter P is $P_5$, and the function of JPEG decoding is selected when the value of the parameter P is $P_6$.

The coefficient-data generator 123 includes a memory (not shown) storing coefficient data Wi for each class associated with each of the values of the parameter P ($P_1$ to $P_6$). Coefficient data Wi associated with the class CL detected by the class detector 122 and the value of the parameter P is read from the memory and is output.

The coefficient-data generator 123 generates coefficient data Wi for an estimating equation, associated with the value of the parameter P, for example, according to equation (43) below:

$$Wi = w_0 + w_1 P + w_2 P^2 + \ldots + W_n P^n \tag{43}$$

The coefficient-data generator 123 may store coefficient-seed data $W_0$ to $w_n$ for each class, which is coefficient data obtained according to equation (43), in the memory, and calculate coefficient data Wi associated with the class CL detected by the class detector 122 and the value of the parameter P.

As described above, in the image-signal processor 120, processing can be selectively executed using a function corresponding to the value of the parameter P fed from the outside. By changing the value of the parameter P according to a user's operation, a function corresponding to the operation can be executed. Thus, various functions such as increasing resolution, noise suppression, MPEG decoding, JPEG decoding, and conversion of a composite signal into component signals can be implemented by the single image-signal processor 120.

Although an example of increasing spatial resolution has been described, alternatively, for example, temporal resolution may be adjusted. Furthermore, switching of functions such as one-dimensional Y/C separation, two-dimensional Y/C separation, and three-dimensional Y/C separation may be allowed.

Furthermore, in the image-signal processor 120, the value of the parameter may be changed according to an input by the user. Alternatively, the value of the parameter P may be automatically chosen in accordance with the characteristics of the video signal $V_{in}$. Furthermore, the class-tap selecting circuit in the class detector 122 or the prediction-tap selecting circuit in the data generator 124 may select taps in accordance with the value of the parameter P fed thereto.

Although the image-signal processor 120 has been described in the context of a case where the parameter P takes on discrete values, the parameter P may take on continuous values. In that case, coefficient data Wi associated with the parameter P can be obtained by linear interpolation using discrete coefficient data. When coefficient-seed data is used, coefficient-seed data can be obtained by assigning the value of the parameter P. When the parameter P takes on continuous values, even when MPEG decoding at the rates a and b is allowed as shown in FIG. 36, MPEG decoding at an arbitrary rate between the rates a and b is allowed.

(2-7) Adjustment of Resolution According to Second Embodiment

Although the embodiment has been described in the context of the television receiver 1 shown in FIG. 1 as an application of an image processing apparatus according to the present invention, without limitation thereto, application to other various image processing apparatuses that perform predetermined image processing on an original image based on an image signal fed thereto is possible.

Although resolution is adjusted in the case described above, application to various types of image processing in which a plurality of parameters is adjusted independently of each other while maintaining correlation, such as noise removal.

Furthermore, although the image-signal processor 10 (mainly the system controller 2) is used as setting means for setting different values of a plurality of parameters defining degrees of image processing of respective adjusting images in the embodiment described above. However, without limitation thereto, application to various setting means is possible as long as when one of the adjusting images is specified by an external operation, it is possible to adjust the values of the parameters defining degrees of image processing of the other adjusting images to values approximate to the value for the specified adjusting image with reference to the degree of image processing of the adjusting image specified.

In the embodiment described above, the image-signal processor (setting means) 10, each time one of the adjusting images is specified using the remote-control transmitter (operating means) 4, causes convergence of the values of the parameters Px, Py, or Pz (initial values are Px=N, Py=N/2+1, and Pz=0 when k=0) defining the degrees of image processing of the adjusting images other than the specified adjusting image PX, PY, or PZ by adding $\pm N/2^k$ (where k denotes selection count) in accordance with the selection count (shown in FIG. 18). However, without limitation thereto, the rate of convergence or the like may be chosen flexibly as long as resolution converges in proportion to the selection count of the adjusting images.

Furthermore, although the display 12 of the television receiver 1 is used as display means for displaying adjusting images that correspond to the entirety or a part of an original image in the embodiment described above, without limitation thereto, various other display means may be used as log as it is possible to display adjusting images based on respective degrees of image processing as adjusted.

Furthermore, although the reference image original image PS composed of a part of the original image and a plurality of adjusting images PX to PZ corresponding to the part of the original image are displayed on divided region of the display screen of the single display 12 as one frame, without limitation thereto, a plurality of displays 130A to 130D constructed the same as the display 12 may be arranged adjacently as display means, allocating a reference image PS' composed of the entirety of the original image and a plurality of adjusting images PX' to PZ' to the respective displays 130A to 130D.

Furthermore, although the remote-control transmitter 4 linked by wireless to the television receiver 1 is used as operating means for specifying one of a plurality of adjusting images by an external operation in the embodiment described above, without limitation thereto, an operation panel or the like similar to the one provided on the remote-control transmitter 4 may be provided directly on the television receiver 1.

Furthermore, in the embodiment described above, the display 12 displays icons MS and MX to MZ on the two-dimensional coordinate system CDT, the icons MS and MX to MZ representing the degrees of image processing of the respective adjusting images set by the image-signal processor (setting means) 10, and when one of the adjusting images is specified using the remote-control transmitter (operating means) 4, the icons MS and MX to MZ associated with the adjusting images other than the specified adjusting image are moved in accordance with the respective degrees of image processing (FIG. 17A). However, without limitation thereto, as long as marks representing the degrees of image processing of the respective adjusting images, display modes other than the two-dimensional coordinate system, such as graphs or numeric representation, may be used.

Figure 38:
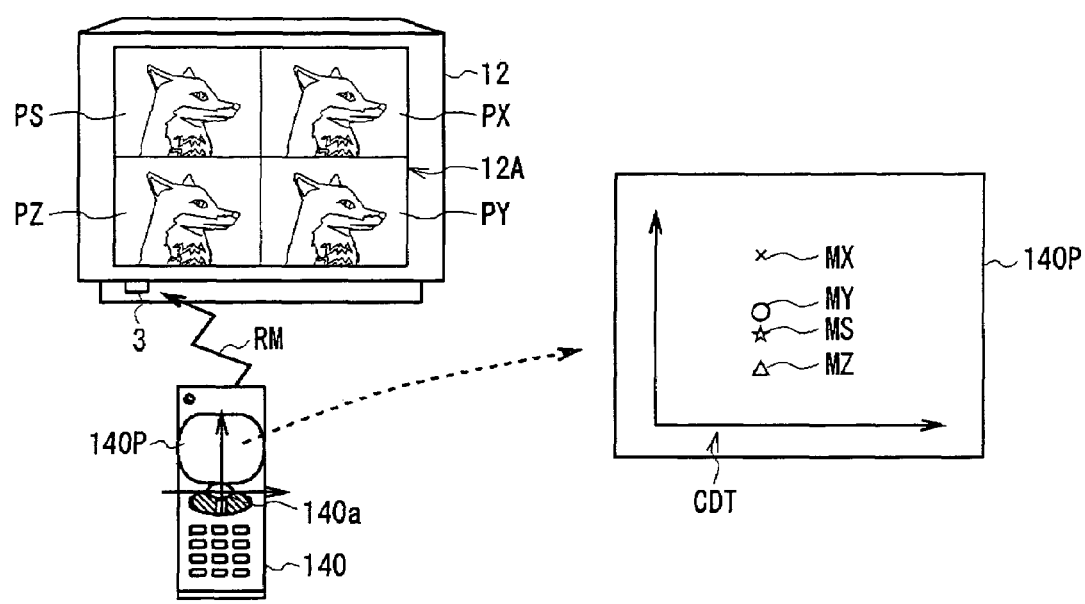
FIG. 38 is a schematic diagram for explaining a remote transmitter having a display for displaying a parameter position according to the second embodiment.

Alternatively, as shown in FIG. 38, a remote-control transmitter 140 may be provided as operating means. The remote-control transmitter 140 has a display 140P, on which icons representing the values of a plurality of parameters defining the degrees of image processing of the respective adjusting images, set by the image-signal processor (setting means) 10, are displayed. When one of the adjusting images is specified by an operation of a joystick 140a, icons associated with the adjusting images other than the specified adjusting image may be moved in accordance with the respective degrees of image processing.

With the remote-control transmitter 140 having the display 140P, the two-dimensional coordinate system CDT and the icons MS and MX to MZ are not superposed on the reference image PS, advantageously, the user is allowed to directly compare the reference original image PS and the adjusting images PX to PZ without any problem regarding image quality.

According to the embodiments described above, an image processing apparatus for executing predetermined image processing on an original image that is based on image signals supplied includes display means for displaying a plurality of adjusting images each corresponding to a part or the entirety of the original image; setting means for setting values of a plurality of parameters defining respective degrees of the image processing for the adjusting images such that the values differ among the plurality of adjusting images; and operating means for specifying one of the plurality of adjusting images by an external operation. When one of the plurality of adjusting images is specified using the operating means, the setting means, with reference to the degree of the image processing for the specified adjusting image, modifies the values of the plurality of parameters defining the respective degrees of the image processing for the other adjusting images so that the values for the other adjusting images are approximated to the values for the specified adjusting image. The display means displays the adjusting images according to the respective degrees of the image processing modified by the setting means. According to the image processing apparatus, a user can finally achieve a desired degree of image processing simply by specifying an adjusting image having a desired degree of image processing a number of times while viewing a plurality of adjusting images displayed on the display means. Thus, the image processing apparatus allows adjustment of the degree of image processing with considerably improved ease.

Furthermore, according to the embodiments described above, an image processing method for executing predetermined image processing on an original image that is based on image signals supplied includes the steps of displaying a plurality of adjusting images corresponding to a part or the entirety of the original image, and setting values of a plurality of parameters defining respective degrees of the image processing for the adjusting images such that the values differ among the plurality of adjusting images; when one of the plurality of adjusting images is specified by an external operation, modifying the values of the plurality of parameters defining the respective degrees of the image processing for the other adjusting images with reference to the degree of the image processing for the specified adjusting image so that the values for the other adjusting images are approximated to the values for the specified adjusting image; and displaying the adjusting images according to the respective modified degrees of the image processing. According to the image processing apparatus, a user can finally achieve a desired degree of image processing simply by specifying an adjusting image having a desired degree of image processing a number of times while viewing a plurality of adjusting images displayed on the display means. Thus, the image processing apparatus allows adjustment of the degree of image processing with considerably improved ease.

Next, another embodiment of the present invention will be described.

(3) Construction of Video Display According to Another Embodiment

Figure 39:
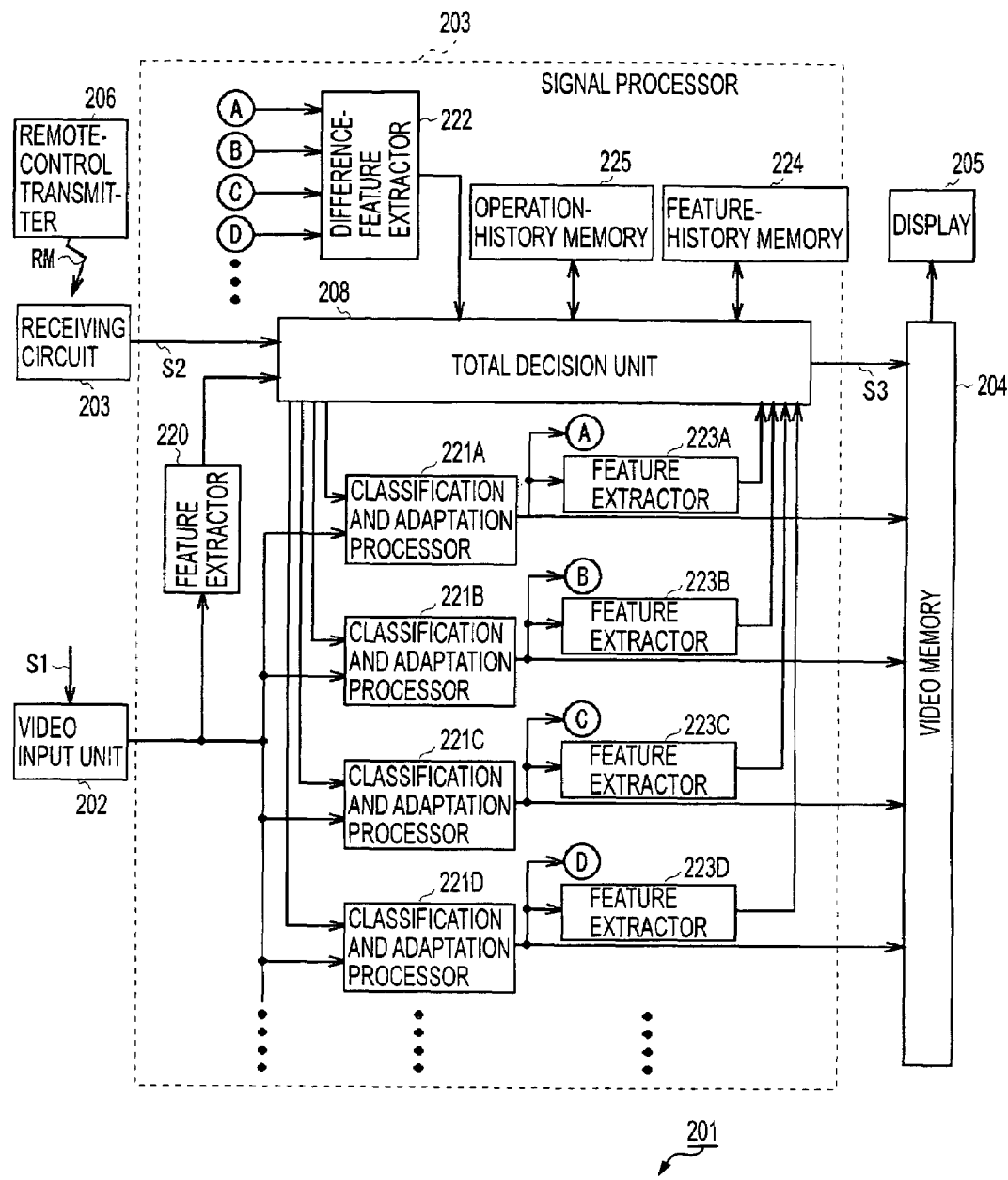
FIG. 39 is a block diagram showing the construction of a video display according to an embodiment.

Referring to FIG. 39, a video display 201 according to another embodiment sequentially performs various image conversions on a frame basis on a video signal S1, fed from the outside, by a plurality of lines of classification and adaptation processes, and combines the processed images as a frame image to display a video image.

The video display 201 includes a video input unit 202 for receiving input of a video signal S1 fed from the outside, a signal processor that performs a plurality of lines of image processing on the video signal S1 fed from the video input unit 202 on a frame basis, a video memory 204 that temporarily stores processing results fed from the signal processor 203 and combines the processing results as appropriate, and a display that display a combined image read from the video memory 204 on a screen.

The video display 201 includes a receiving circuit 207 that acts in cooperation with an external remote-control transmitter 206. The receiving circuit 207 receives a remote-control signal RM output in accordance with a user's operation (e.g., adjustment of resolution or noise suppression) of the remote-control transmitter 206, and sends an operation signal S2 corresponding to the remote-control signal RM to a total decision unit 208 provided in a signal processor 203.

Figure 40:
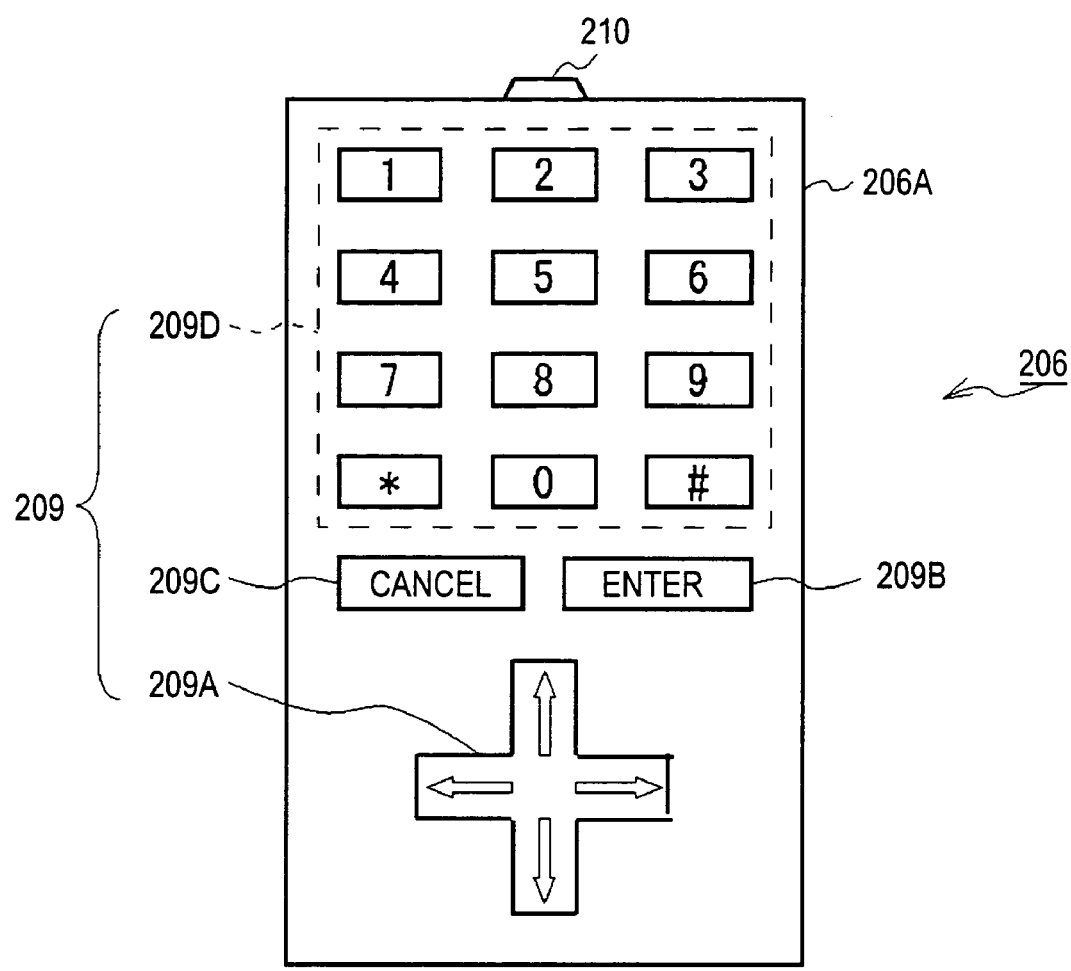
FIG. 40 is a schematic diagram showing the external configuration of a remote-control transmitter shown in FIG. 39.

As shown in FIG. 40, the remote-control transmitter 206 includes a generally thin rectangular-parallelepiped main unit 206A. On a surface thereof, an operating unit 209 having buttons to which various functions are allocated is provided. Furthermore, on a top surface thereof, a wireless communication port 210 conforming to a communication standard supported by the video display 201 is provided.

In the operating unit 209, a cursor button 209A is provided in a lower part. In right and left parts above the cursor button 209A, an enter button 209 for fixing various setting and a cancel button 209C for canceling the setting are provided. Above the enter button 209B and the cancel button 209C, a plurality of numeric buttons 209D is arranged in a specific pattern.

Figure 41:
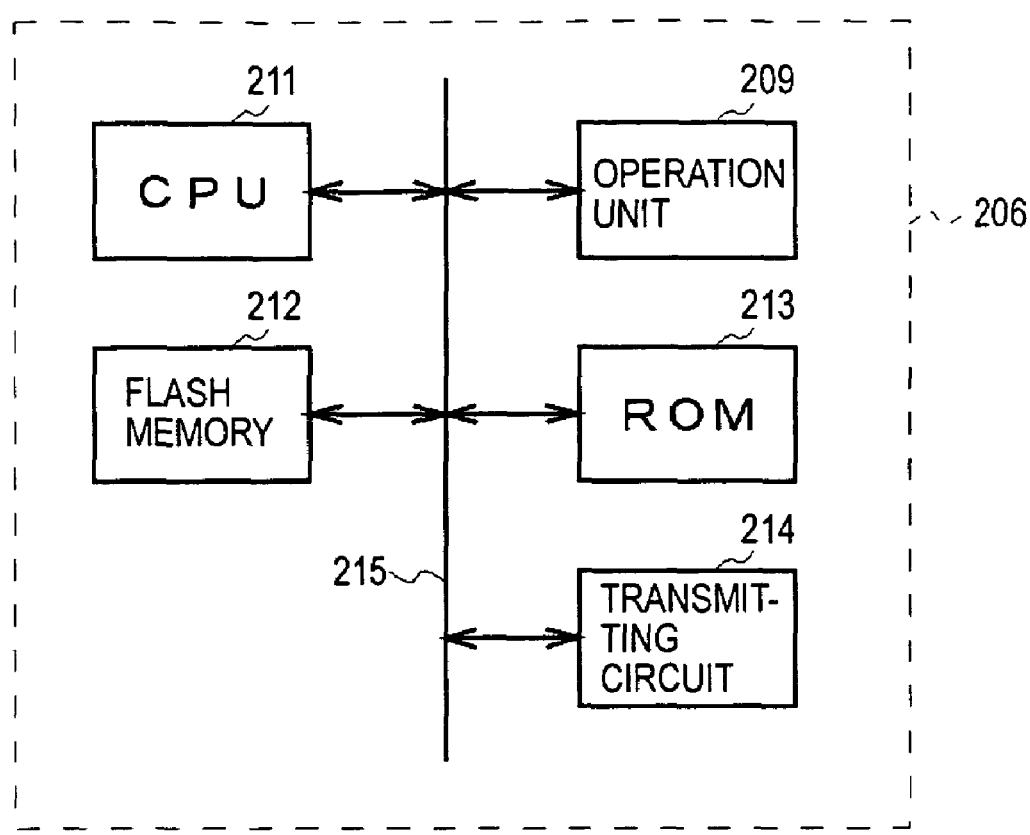
FIG. 41 is a block diagram showing the internal configuration of the remote-control transmitter shown in FIG. 40.

As shown in FIG. 41, the remote-control transmitter 206 includes a CPU 211, the operating unit 209, a flash memory 212, a read-only memory (ROM) 213 for programs, and a transmission circuit 214, these components being connected to each other via a bus 215. The remote-control transmitter 206 further including a battery (not shown), for example, a button battery.

The CPU 211 reads a program corresponding to an operation of the operating unit 209 by the user from various programs stored in the flash memory 212, loads the program in the program ROM 213, and executes processing according to the program. The transmission circuit 214 sends out data fed from the CPU 211 via the wireless communication port 210 (FIG. 40).

In the signal processor 203 in the video display 201 (FIG. 39), the total decision unit 208, which is in charge of the overall control of the system, sequentially sends video data fed to the video input unit 202 to a feature extractor 220 and a plurality of classification and adaptation processor 221 (221A, 221B, 221C, 221D, . . . ) as frame images. The feature extractor 220 extracts features from the frame images sequentially fed thereto, and sends the features to the total decision unit 208.

The features include, for example, a statistical value such as average or variance of frame images, auto-correlation, dynamic range (DR), histogram, or the number of edges having a gradient greater than a certain value in the frame image.

In the signal processor 203 of the video display 201, the plurality of classification and adaptation processors 221, under the control of the total decision unit 208, executes predetermined image conversion on frame images sequentially fed thereto, and sends the resulting frame images (hereinafter simply referred to as processed images) to the associated feature extractors 223 (223A, 223B, 223C, 223D, . . . ).

A difference-feature extractor 222 extracts a difference feature between two or more processed images sequentially fed from the classification and adaptation processors 221, and sends the difference feature to the total decision unit 208. The difference feature refers to a feature representing a difference between the features of two or more processed images, or a feature representing correlation or the like between processed images.

Furthermore, the total decision unit 208 receives from the receiving circuit 207 information transmitted from the remote-control transmitter 206 (i.e., information corresponding to a user's operation), and receives features fed in real time from the classification and adaptation processors 221 via the associated feature extractors 223 and difference features fed in real time from the classification and adaptation processors 221 via the difference feature extractor 222, and reads past previous featured held in a feature-history memory 224 and operation-history information held in an operation-history memory 225 as needed.

The total decision unit 208, based on the remote-control signal RM obtained via the receiving circuit 207, detects the operation of the remote-control transmitter 206 by the user. When the operation relates to adjustment of a volume value for adjustment of image quality such as adjustment of resolution or noise suppression, the total decision unit 208 sends the volume value to each of the classification and adaptation processors 221. When the operation relates to setting regarding display mode of processed images, the total decision unit 208 sends a control signal S3 in accordance with the setting to the video memory 204.

Figure 42:
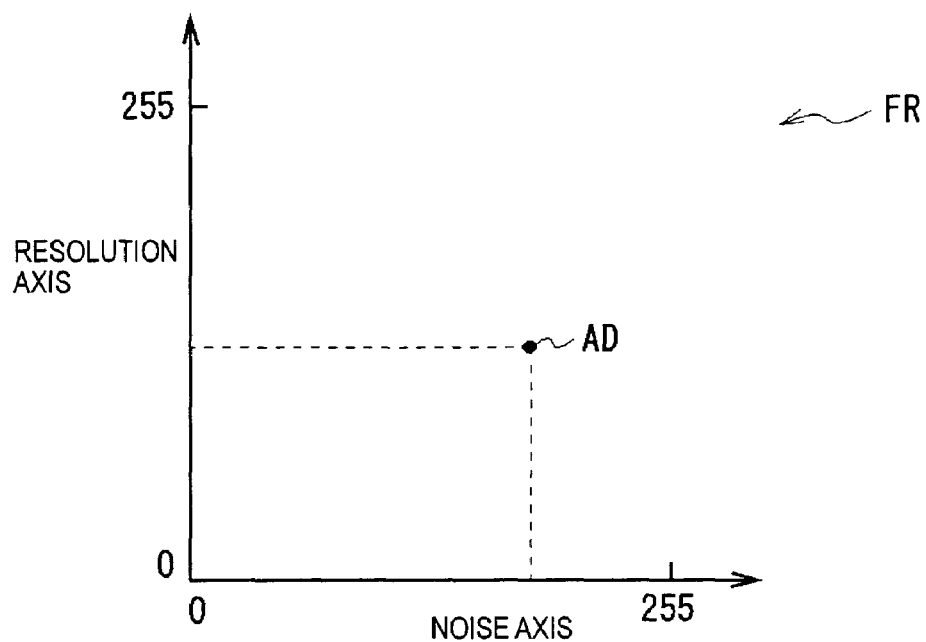
FIG. 42 is a schematic plan view for explaining a two-dimensional coordinate system defining a volume space.

In this embodiment, as shown in FIG. 42, the volume space in which adjustment by the user is allowed can be represented by a two-dimensional coordinate system FR with a vertical axis representing adjustment of resolution (hereinafter referred to as a resolution axis) and a horizontal axis representing adjustment of the degree of noise suppression (hereinafter referred to as a noise axis). The volume values of resolution and noise suppression adjusted by the user can be represented as coordinates (hereinafter referred to as an adjustment point) AD in the two-dimensional coordinate system FR.

In the two-dimensional coordinate system FR defining the volume space as shown in FIG. 42, the volume value can be adjusted in 256 steps with respect to each of the resolution axis and the noise axis, allowing adjustment by 65,536 (=256×256) steps in total.

The user is allowed to move the adjustment point AD freely in a desired direction in the two-dimensional coordinate system FR by vertically or horizontally operating the cursor button 209D on the remote-control transmitter 206, thereby determining the volume values of resolution and noise suppression in accordance with the position of the adjustment point AD.

More specifically, when the adjustment point AD is moved horizontally, the volume value defining the degree of noise suppression is adjusted. When the adjustment point AD is moved vertically, the volume value defining resolution is adjusted. The user is allowed to readily and freely adjust resolution and the degree of noise suppression independently of each other while maintaining correlation by operating the cursor button 209D of the remote-control transmitter 206.

The control signal S3 (FIG. 39) refers to information representing an enlarging or reducing ratio for displaying a specified processed image, or information representing which part of an input frame image is to be extracted.

Each of the classification and adaptation processors 221, when performing image conversion on frame images sequentially fed thereto, adjusts image quality (resolution and the degree of noise suppression) based on volume values fed from the total decision unit 208, sequentially supplies the processed images obtained by adjusting image quality to the video memory 204, and feeds back the processed images to the difference feature extractor 222 and the associated feature extractor 223.

The total decision unit 208 temporarily stores in the video memory 204 the processed images sequentially fed from the classification and adaptation processors 221, selectively needs processed images needed from the video memory 204 at a specific timing based on the control signal S3, and combines the processed images based on a display mode specified by the user (e.g., reduction, cutout, or attachment of image) to generate a combined image.

Figure 43A:
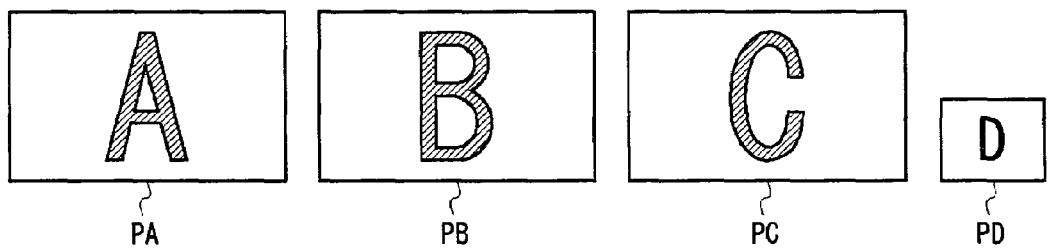
FIGS. 43A and 43B are schematic plan views for explaining generation of a combined image.
Figure 43B:
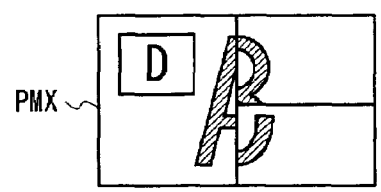

For example, as shown in FIG. 43A, from processed images PA to PD fed from the four classification and adaptation processors 221A to 221D, a combined images PMX shown in FIG. 43B can be generated. Of the four processed images PA to PD, the three processed images PA to PC are images obtained by adjusting resolution and the degree of noise suppression according to different volume values, and the processed image PD has a reduced size compared with the other processed images PA to PC (FIG. 43A). The combined image PMX is obtained by combining a cutout image corresponding to the left half of the processed image PA, cutout images corresponding to the upper right quarter and the lower right quarter of the processed images PB and PC, respectively, and an image obtained by reducing the processed image PD by a specified ratio and attaching the result to the processed image PA (FIG. 43B).

Then, the total decision unit 208 displays the combined image generated in the video memory 204 on a display screen of a display 205 implemented, for example, by a cathode-ray tube (CRT) display or a liquid crystal display (LCD).

Figure 44:
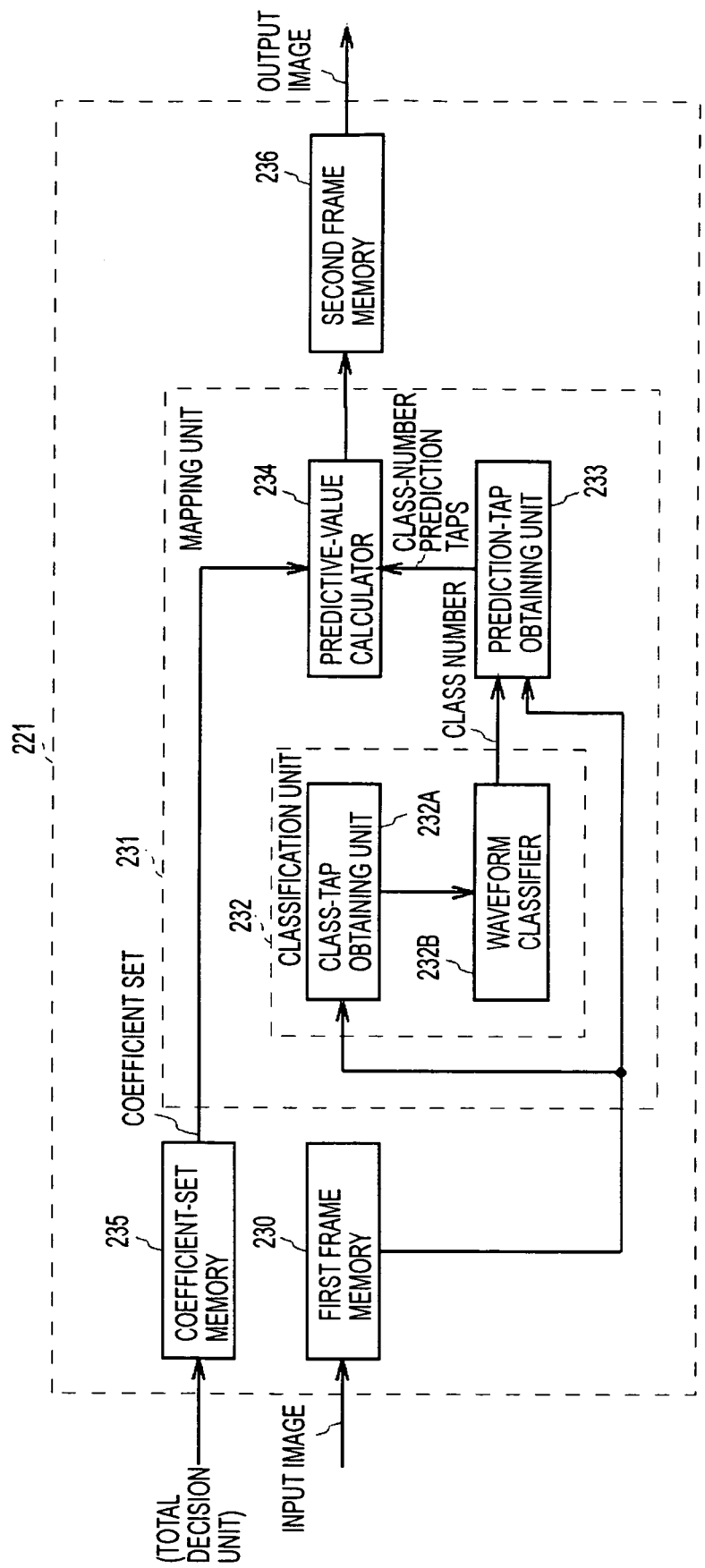
FIG. 44 is block diagram showing the internal configuration of a classification and adaptation processor shown in FIG. 39.

FIG. 44 shows the internal construction of each of the classification and adaptation processors 221. In the classification and adaptation processor 221, a controller (not shown) temporarily stores a video image in a first frame memory 230 on a frame basis, and sequentially sends the video image to a mapping unit 231 as frame images.

The mapping unit 231 includes a classification unit 232, a prediction-tap obtaining unit 233, and a predictive-value calculator 234. The mapping unit 231 sends frame images fed from the first frame memory 230 to the classification unit 232 and the prediction-tap obtaining unit 233.

The classification unit 232 includes a class-tap obtaining unit 232A for obtaining a predetermined number of class taps associated with a subject pixel from a frame image fed thereto, and a waveform classifier 232B that classifies the subject pixel into one of a predetermined number of classes and assigns a class number accordingly.

The prediction-tap obtaining unit 233, based on the class number fed from the waveform classifier 232B of the classification unit 232, obtains a predetermined number of class taps associated with the class corresponding to the class number from the frame image stored in the first frame memory 230, and sends the prediction taps and the class number to the predictive-value calculator 234.

The predictive-value calculator 234 obtains a coefficient set associated with the class based on the class number from coefficient sets stored in a coefficient-set memory 235, and predicts pixel values of a predicted image by linear prediction based on the coefficient set and the prediction taps.

The coefficient set is composed of coefficients for generating a dense image by linear prediction or the like, and is used to generate a predictive image corresponding to an image of a specified region in a classification and adaptation process for predicting pixel values. The process of generating a denser image from an input image based on the coefficient set will be referred to as mapping.

The controller (not shown) temporarily stores the pixel values of a predictive image predicted by the predictive-value calculator 234 in a second frame memory 236, and outputs a frame image of a high resolution in which the predicted pixel values are set.

(4) Third Embodiment (4-1) Adjustment of Volume Values Using Two Display Screens In the video display 201 shown in FIG. 39, in selecting image-quality adjusting mode, when the user adjusts the volume values on the resolution axis and the noise axis to desired values while maintaining correlation using the remote-control transmitter 206, pre-adjusting image and post-adjusting image (successive images) are simultaneously displayed in real time on the display screens of the display 205 so that the user can adjust image quality while directly comparing these images.

Figure 45:
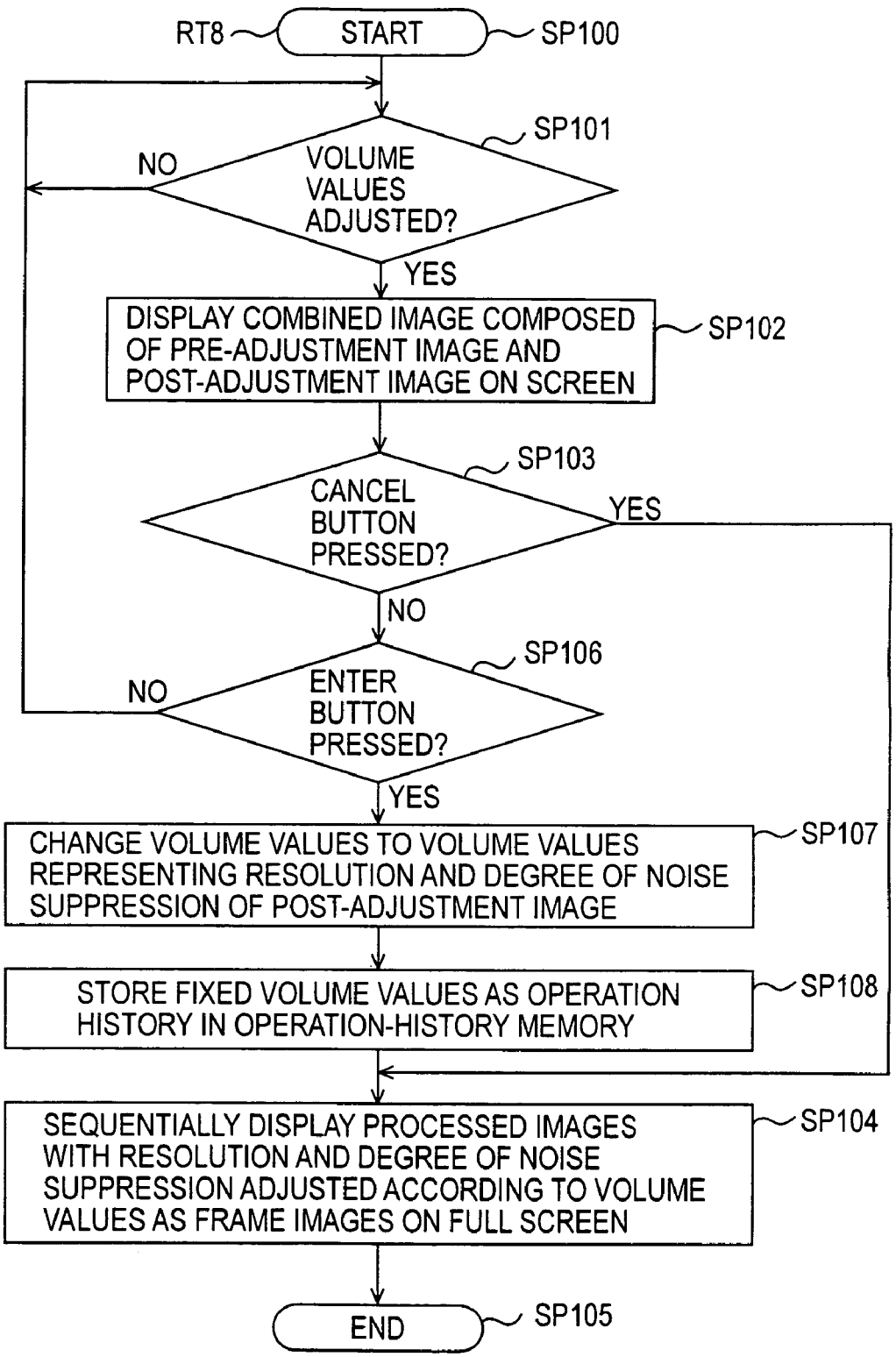
FIG. 45 is a flowchart of a volume-value adjusting routine according to the third embodiment.

With a video image displayed on the display screen of the display 205, when the image-quality adjusting mode is selected by a user's operation of the remote-control transmitter 206, the total decision unit 208 starts a volume-value adjusting routine RT8 shown in FIG. 45 from step SP100. Then, in step SP101, the total decision unit 208 waits for an operation input by the user for adjusting the volume values on the resolution axis and the noise axis.

Then, in step SP102, the total decision unit 208 obtains processed images obtained by two specific classification and adaptation processors 221A and 221B (hereinafter referred to as first and second classification and adaptation processors) among the plurality of classification and adaptation processors 221. More specifically, the total decision unit 208 obtains a processed image obtained by the first classification and adaptation processor 221A by performing image conversion after adjusting image quality based on volume values before adjustment (hereinafter referred to as a pre-adjusting image) and a processed image obtained by the second classification and adaptation processor 221B by performing image conversion after adjusting image quality based on volume values after adjustment (hereinafter referred to as a post-adjusting image).

Then, the total decision unit 208 cuts each of the pre-adjusting image and the post-adjusting image to half of one frame and combines the results, and displays the combined image on the display screen of the display 205.

Figure 46A:
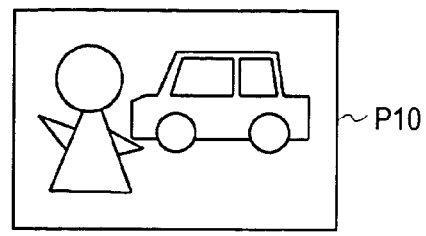
FIGS. 46A to 46D are schematic plan views for explaining methods for displaying a combined image.
Figure 46B:
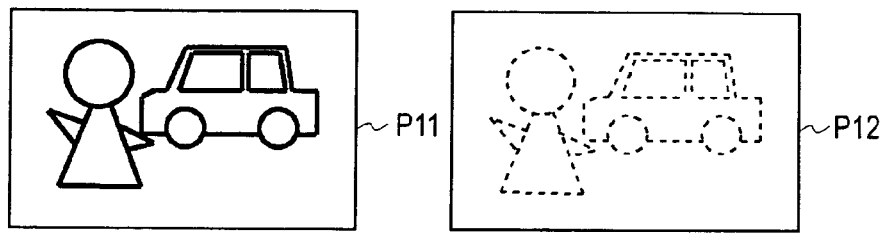
Figure 46C:
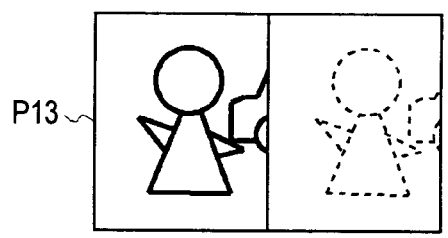
Figure 46D:
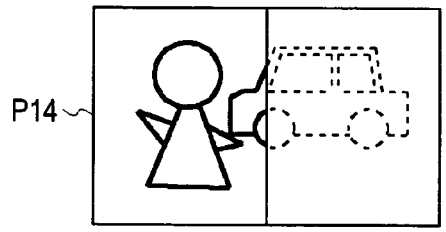

As methods of displaying the combined image, as shown in FIGS. 46A to 46D, in a first display method, a pre-adjusting image P11 and a post-adjusting image P12 (FIG. 46B) corresponding to a specific range of an input frame image P10 (FIG. 46A) are simultaneously displayed in divided regions as a combined image P13 of one frame. In a second display method, a half of a pre-adjusting image P11 and a half of a post-adjusting image P12 (FIG. 46C) are combined so as to form a combined image P14 corresponding to an input frame image P10 (FIG. 46D).

In the case of the first display method, images obtained by processing an image can be displayed simultaneously, so that advantageously, the user is allowed to readily compare the images. In the case of the second display method, advantageously, the user is allowed to visually recognize the content of the input image without any missing part during adjustment of volume values (i.e., without any image region that is not output).

With the pre-adjusting image and the post-adjusting image simultaneously displayed, in step SP103, the total decision unit 208 determines whether the cancel button 209C on the operating unit 209 of the remote-control transmitter 206 has been pressed by the user.

When step SP103 turns out positive, it is indicated that the user intends to choose the volume values of the pre-adjusting image. Then, in step SP104, the total decision unit 208 sequentially displays processed images whose resolution and degree of noise suppression have been adjusted according to the volume values (pre-adjusting images) as frame images on the full display screen of the display 205. Then, in step SP105, the total decision unit 208 exits the volume-value adjusting routine RT8.

On the other hand, when step SP103 turns out negative, in step SP106, the total decision unit 208 determines whether the enter button 209B of the operating unit 209 of the remote-control transmitter 206 has been pressed by the user.

When step SP106 turns out positive, it is indicated that the user is satisfied with the current volume values of the post-adjusting image. Then, in step SP107, the total decision unit 208 changes the current volume values to the volume values representing resolution and degree of suppressing noise of the post-adjusting image. Then, in step SP108, the total decision unit 208 stores the volume values as operation-history information in the operation-history memory 225.

Then, in step SP104, the total decision unit 208 sequentially displays processed images whose resolution and degree of noise suppression have been adjusted according to the volume values (post-adjusting images) as frame images on the full displays screen of the display 205. Then, in step SP105, the total decision unit 208 exits the volume-value adjusting routine RT8.

As described above, in the video display 201, when image conversion is performed by a classification and adaptation process, a pre-adjusting image before starting adjustment of volume values on the resolution axis and the noise axis and a post-adjusting image during or after adjusting the volume values can be simultaneously displayed on the display screen of the display 205. Thus, the user is allowed to readily compare these images when adjusting image quality.

Accordingly, the user is allowed to adjust image quality efficiently by adjusting volume values. Furthermore, the user is allowed to readily find volume values corresponding to most desirable image quality for the individual users.

Furthermore, the user pressed the enter button 209B of the operating unit 209 of the remote-control transmitter 206 only when the user is satisfied with a processed image after adjusting image quality, reflecting the adjustment on the output image. Thus, it is possible to prevent incorrect operation-history information that is not desired or intended by the user from being saved when signal processing is performed using previous operation-history information.

(4-2) Processing for Obtaining Amount of Information

In the video display 201 according to this embodiment, when image conversion is performed by classification and adaptation in the first and second classification and adaptation processors 221A and 221B, a combined image composed of a pre-adjusting image and a post-adjusting image having different volume values on the resolution axis and the noise axis can be sequentially displayed in real time on the display screen of the display 205.

The combined image displayed on the display screen of the display 205 at this time is an image composed of half the frame of the pre-adjusting image and half the frame of the post-adjusting image according to the first and second display methods. Thus, the other halves of the pre-adjusting image and the post-adjusting image are not displayed on the display screen of the display 205.

Thus, in the signal processor 203 of the video display 201 shown in FIG. 39, the difference-feature extractor 222 can extract a difference feature using the pre-adjusting image and the post-adjusting image using the image regions that are not displayed of the pre-adjusting image and the post adjusting image. That is, although the pre-adjusting image and the post-adjusting image have different volume values on the resolution axis and the noise axis, these images are both obtained by converting the same frame image by classification and adaptation. Thus, these images include pixels whose image quality is adjusted according to different volume values.

Thus, the difference-feature extractor 222 is allowed to calculate a difference between the processed images fed from the first and second classification and adaptation processors 221A and 221B (pre-adjusting image and post-adjusting image) since both include two pixels at the same positions.

As described above, in the video display 201, since the plurality of classification and adaptation processors 221 (221A, 221B, . . . ) is provided in the signal processor 203, it is possible to calculate in real time a difference feature such as the average, variance, dynamic range, or correlation of differences among a plurality of processed images having different volume values on the resolution axis and the noise axis. In this case, real time refers to the same rate as the rate of generating a single processed image by image conversion by a single classification and adaptation processor.

By using the signal processor 203 including the plurality of classification and adaptation processors 221 (221A, 221B, . . . ) as in this embodiment, compared with the case where two-screen display is achieved using a single classification and adaptation processor, the processing rate need not be doubled relative to the real-time rate, and volume values for adjusting image quality can be arbitrarily switched even during processing of one screen.

(5) Fourth Embodiment (5-1) Adjustment of Volume Values Using Operation-History Information According to a fourth embodiment of the present invention, in the video display 201 shown in FIG. 39, in selecting an image-quality adjusting mode, when the user adjusts the volume values on the resolution axis and the noise axis as desired while maintaining correlation using the remote-control transmitter 206, past operation-history information of the user is reflected so that operation speed can be further increased.

In the signal processor 203 of the video display 201, the volume values on the resolution axis and the noise axis are each allowed to take on 256 values in the two-dimensional coordinate space defining the volume space. Usually, by default, the value is increased by one step size each time the cursor button 209D of the operating unit 209 is pressed in a desired direction.

In the fourth embodiment, the step size for increasing or decreasing the volume value each time the cursor button 209D is pressed is modified in accordance with past operation-history information of the user, so that the user is freed from the laboriousness of visually checking change in processed images while increasing or decreasing the volume value by one step size over the entire range of the volume value.

In the signal processor 203 of the video display 201, the total decision unit 208 stores the volume values of the resolution and the degree of noise suppression of post-adjusting images previously selected by the user in the operation-history memory 225. The total decision unit 208 reads operation-history information as needed, and creates a map representing relationship between volume values in the volume space and the number of times the respective volume values have been selected by the user as post-adjusting images (hereinafter referred to as a frequency map).

The frequency map represents the number of times that an adjustment point representing the volume values on the resolution axis and the noise axis of a post-adjusting image selected by the user in the two-dimensional coordinate system defining the volume space has been selected by the user.

When creating the frequency map, the total decision unit 208 classifies the number of times of selection by the user into a plurality of frequency levels, and determines which frequency level the selection count of the adjustment point selected by the user belongs to. Then, the total decision unit 208 stores the volume values of the adjustment point, the selection count of the adjustment point, and the corresponding frequency level as operation-history information in the operation-history memory 225.

In step SP108 of the volume-value adjusting routine RT8 (FIG. 45) in the third embodiment, the volume values representing the resolution and the degree of noise suppression of a post-adjusting image selected by the user are stored in the operation-history memory 225 as operation-history information. In the fourth embodiment, an operation-history maintaining routine RT9 is executed to create operation history information including the selection count and the corresponding frequency level based on the frequency map in addition to the volume values.

Figure 47:
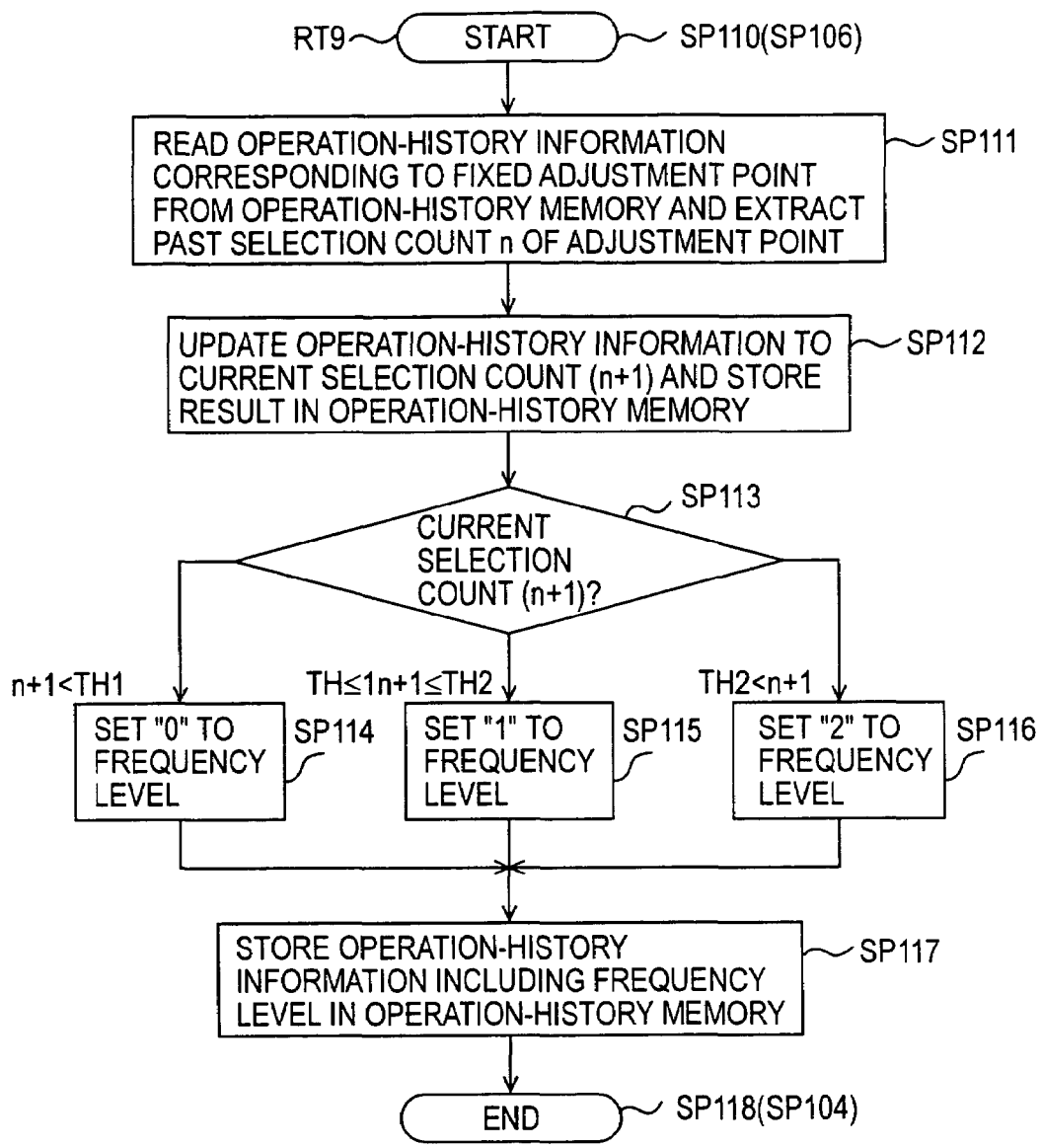
FIG. 47 is a flowchart of an operation-history maintaining routine according to a fourth embodiment of the present invention.

When a post-adjusting image is determined in step SP106, the total decision unit 208 starts the operation-history maintaining routine RT9 shown in FIG. 47 from step SP110. Then, in step SP111, the total decision unit 208 reads operation-history information associated with the adjustment point representing volume values for adjustment of image quality of the post-adjusting image, and extracts previous selection count n (n is a natural number) of the adjustment point from the operation-history information.

Then, in step SP112, the total decision unit 208 increments the selection count n of the adjustment point to (n+1), and stores the operation history information in the operation-history memory 225.

Then, in step SP113, the total decision unit 208 determines whether the current selection count (n+1) of the adjustment point is less than a first threshold TH1, greater than or equal to the first threshold TH1 and less than or equal to a second threshold TH2, or greater than the second threshold TH2.

When it is determined in step SP113 that the current selection count (n+1) of the adjustment point is less than the first threshold TH1, in step SP114, the total decision unit 208 sets "0" to the frequency level. When it is determined that the current selection count (n+1) is greater than or equal to the first threshold TH1 and less than or equal to the second threshold, in step SP115, the total decision unit 208 sets "1" to the frequency level. When it is determined that the current selection count (n+1) is greater than the second threshold TH2, in step SP116, the total decision unit 208 sets "2" to the frequency level.

After executing one of steps SP114 to SP116, in step SP117, the total decision unit 208 stores operation history information of the adjustment point, including the frequency level corresponding to the current selection count (n+1) of the adjustment point, in the operation-history memory 225. Then, in step SP118, the total decision unit 208 exits the operation-history maintaining routine RT9.

Then, proceeding to step SP104 of the volume-value adjusting routine RT8 shown in FIG. 45, the total decision unit 208 sequentially displays processed images with resolution and the degree of noise suppression adjusted according to the volume values selected (post-adjusting images) on the full display screen of the display 205. Then, in step SP105, the total decision unit 208 exits the volume-value adjusting routine RT8.

In the fourth embodiment, as operation history-information, in addition to the volume values representing the resolution and the degree of noise suppression of a post-adjusting image, the selection count and the corresponding frequency level based on the frequency map can be included.

In the video display 201, when adjusting image quality using the remote-control transmitter 206, the user is allowed to achieve desired volume values on the resolution axis and the noise axis in a relatively short time using the operation-history information.

Figure 48:
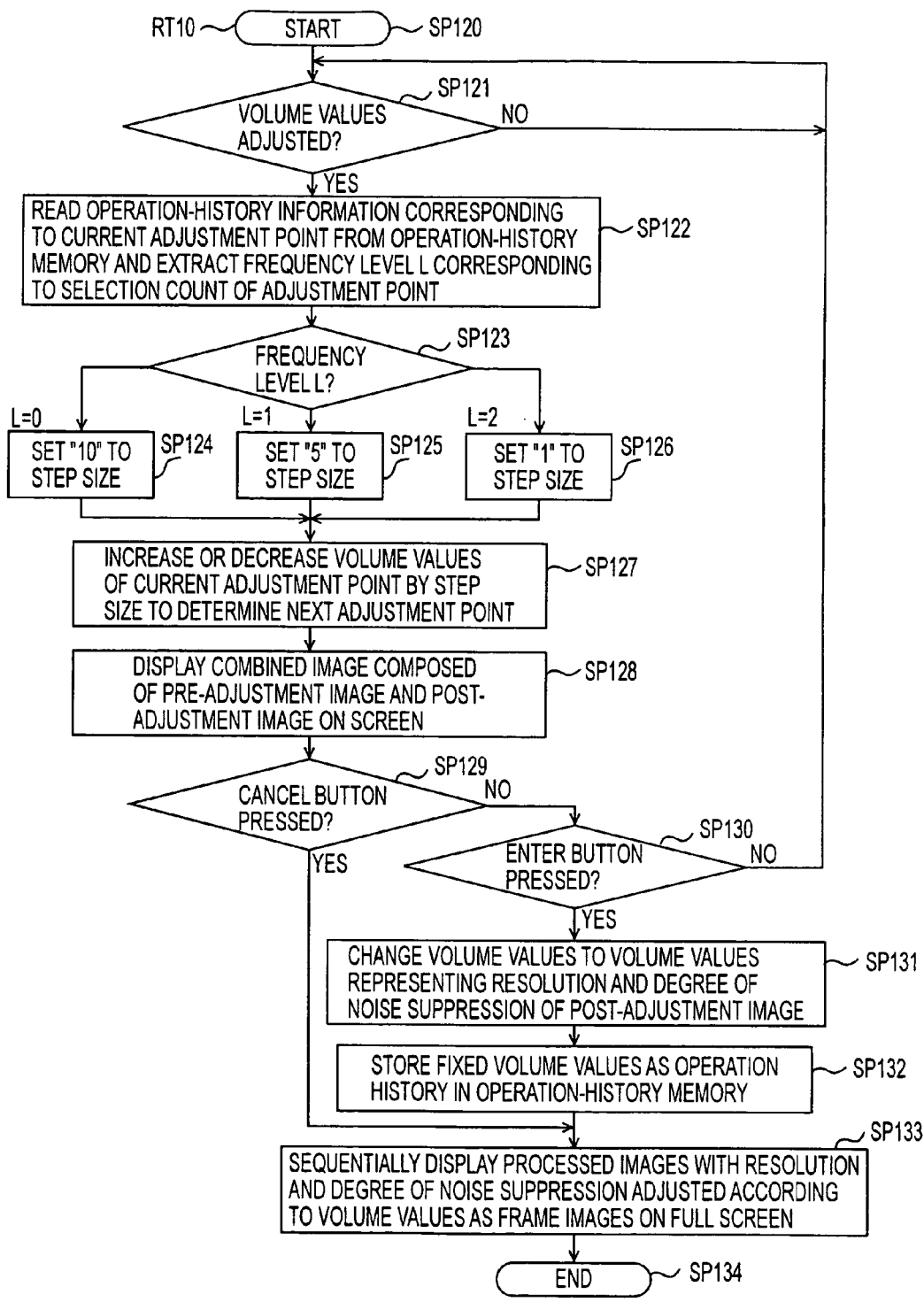
FIG. 48 is a flowchart of a volume-value adjusting routine according to the fourth embodiment.

When an image-quality adjusting mode is selected by the user with a video image displayed on the display screen of the display 205, the total decision unit 208 starts the volume-value adjusting routine RT9 shown in FIG. 48 from step SP120. Then, in step SP121, the total decision unit 208 waits for user's input of operation for adjusting the volume values on the resolution axis and the noise axis.

Then, in step SP122, the total decision unit 208 reads operation-history information associated with the adjustment point representing the volume values for adjustment of the image quality of the current post-adjusting image from the operation-history memory 225, and extracts a frequency level L (L is a natural number) corresponding to the selection count of the adjustment point.

Then, in step SP123, the total decision unit 208 determines whether the frequency level L corresponding to the selection count of the adjustment point representing the volume values for adjustment of the image quality of the post-adjusting image is "0", "1", or "2".

When it is determined in step SP123 that the frequency level L corresponding to the selection count of the adjustment point representing the volume values for adjustment of the image quality of the current post-adjusting image is "0", proceeding to step SP124, the total decision unit 208 sets "10" to the step size of the volume values for adjustment of image quality. When the frequency level L is "1", proceeding to step SP125, the total decision unit 208 sets "5" to the step size of the volume values. When the frequency level is "2", proceeding to step SP126, the total decision unit 208 sets "1" to the step size of the volume values.

That is, each time the cursor button 209D of the operating unit 209 of the remote-control transmitter 206 is pressed, the total decision unit 208 changes the step size of the volume values on the resolution axis and the noise axis to a step size corresponding to the relevant frequency level.

More specifically, the total decision unit 208 sets a relatively small step size of volume values for a single pressing operation of the cursor button 209D in an area where the frequency of selection by the user is relatively high in the volume space (the coordinate sets of the volume values on the resolution axis and the noise axis), while setting a relatively large step size of volume values for a single pressing operation of the cursor button 209D in an area where the frequency of selection by the user is relatively low.

Then, in step SP127, the total decision unit 208 increases or decreases the volume values of the current adjustment point by the step size associated with the relevant frequency level, thereby determining a next adjustment point.

Then, in step SP128, the total decision unit 208 executes processing corresponding to step SP102 of the volume-value adjusting routine RT8 shown in FIG. 45. Then, in steps SP129 to SP134, the total decision unit 208 executes processing corresponding to steps SP103 to SP108 shown in FIG. 45. Then, the total decision unit 208 exits the volume-value adjusting routine RT10 shown in FIG. 48.

In the fourth embodiment, when the user adjusts image quality using the remote-control transmitter 206, the step size of volume values becomes smaller in an area where the frequency of selection by the user is high in the volume space. Thus, each time the cursor button 209D is pressed in a desired direction, the volume values on the resolution axis and the noise axis approach values desired by the user in a relatively short time, and delicate adjustment is allowed in the vicinity of the desired values.

Although the fourth embodiment has been described in the context of an example where the step size of volume values is chosen to be smaller in an area where the frequency of selection by the user in the volume space is high, without limitation thereto, the step size may be changed on the basis of the frequency with respect to each of the volume axes. That is, histograms may be created respectively for the resolution axis and the noise axis, changing step sizes on the basis of the respective histograms.

(6) Fifth Embodiment (6-1) Adjustment of Volume Values by Selecting Display Area In the fourth embodiment, operation-history information is used effectively to reduce time needed to achieve volume values desired by the user. In a fifth embodiment of the present invention, the video display 201 displays a two-dimensional coordinate system defining a volume space on the display screen of the display 205, and causes volume values to converge by sequentially dividing display are into two in accordance with selection by the user so that similar effect can be achieved.

With a video image displayed on the display screen of the display 205, when an image-quality adjusting mode is selected by a user's operation of the remote-control transmitter 206, the total decision unit 208 starts a volume-value adjusting routine RT11 shown in FIG. 49 from step SP140. Then, in step SP141, the total decision unit 208 waits for user's input of operation for adjusting the volume values on the resolution axis and the noise axis.

Figure 50A:
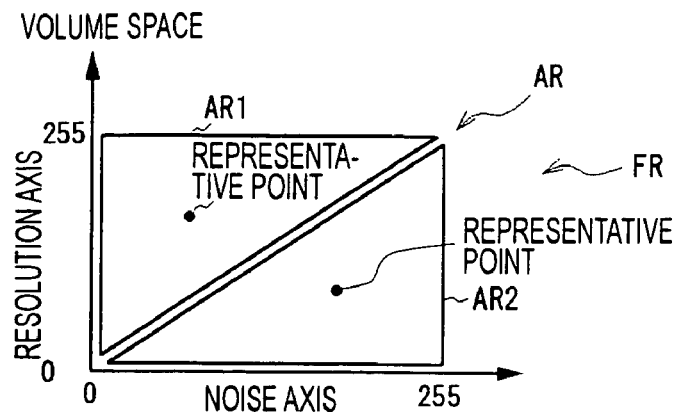
FIGS. 50A to 50D are schematic diagrams for explaining convergence of volume values by selecting areas in the volume space.

Then, in step SP142, the total decision unit 208 divides the entire area AR where the volume values on the resolution axis and the noise axis can be adjusted into two areas in the two-dimensional coordinate system FR defining the volume space, as shown in FIG. 50A, and sets the volume values of the barycenters of the divided areas AR1 and AR2 as representative adjustment points of the respective areas (hereinafter referred to as representative points). At this time, the total decision unit 208 sequentially displays processed images with resolution and degree of noise suppression adjusted according to the respective volume values of the two representative points in two screens of the display screen of the display 205.

With the two processed images simultaneously displayed, proceeding to step SP143, the total decision unit 208 determines whether the cancel button 209C of the remote-control transmitter 206 has been pressed by the user.

When step SP143 turns out positive, it is indicated that the user intends to return to the volume values of the processed image before adjustment. Then, proceeding to step SP144, the total decision unit 208 sequentially displays processed images with resolution and degree of noise suppression adjusted according to the volume values as frame images on the full display screen of the display 205. Then, in step SP145, the total decision unit 208 exits the volume-value adjusting routine RT11.

On the other hand, when step SP143 turns out negative, proceeding to step SP146, the total decision unit 208 determines whether the user has operated the cursor button 209D of the remote-control transmitter 206 to select an area corresponding to one of the processed images.

When step SP146 turns out positive, proceeding to step SP147, the total decision unit 208 determines whether the enter button 209B of the remote-control transmitter 206 has been pressed by the user.

Figure 50B:
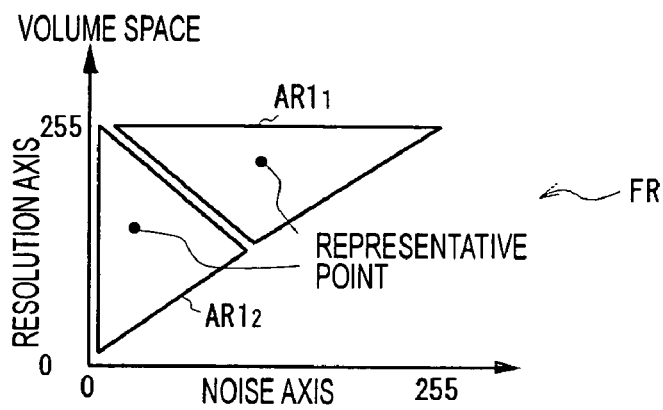

When step SP147 turns out negative, the total decision unit 208 further divides the area AR1 selected by the user from the two areas into two areas, sets representative points of the AR$1_1$ and AR$1_2$ (FIG. 50B), and sequentially displays processed images with resolution and degree of noise suppression adjusted according to the volume values of the two representative points in two screens of the display screen of the display 205.

Figure 50C:
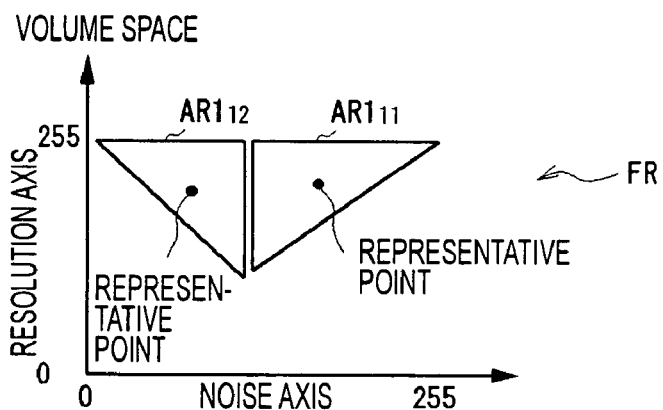
Figure 50D:
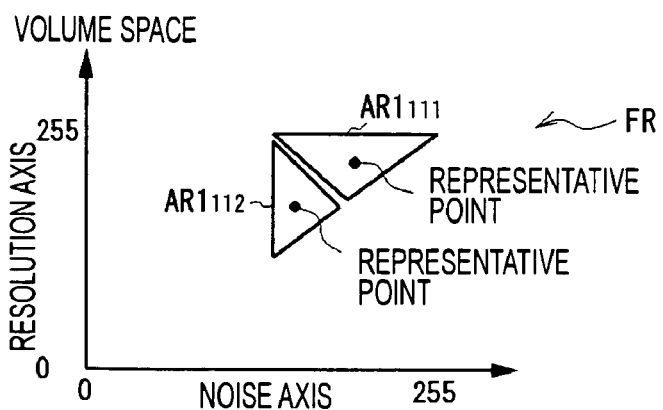

Then, returning to step SP143, the total decision unit 208 repeats the steps described above until the cancel button 209C is pressed or the enter button 209B is pressed in step SP146. That is, one of the specified area of the two areas $AR1_1$ and $AR1_2$ shown in FIG. 50B, the area AR1 in this case, is divided into two areas $AR1_{11}$ and $AR1_{12}$ and representative points are set for the respective areas (FIG. 50C). Furthermore, the specified area $AR1_{11}$ is divided into two areas $AR1_{111}$ and $AR_{112}$ and representative points are set for the respective areas (FIG. 50D). Similarly, area is repeatedly divided to achieve convergence.

In the two-dimensional coordinate system FR defining the volume space in this embodiment, by selecting an area from two alternatives, the area is reduced to half by each selection by the user (i.e., candidates are reduced to half). Thus, a representative point of a volume value is determined by 16 selections.

When step SP147 turns out positive, it is indicated that the representative point of the area selected by the user corresponds to the converged values of the volume values on the resolution axis and the noise axis. Then, proceeding to step SP149, the total decision unit 208 changes the current volume values on the resolution axis and the noise axis of the current processed image to the volume values of the representative point.

Then, in step SP144, the total decision unit 208 sequentially displays processed images with resolution and degree of noise suppression adjusted according to the modified volume values as frame images on the full display screen of the display 205. Then, in step SP145, the total decision unit 208 exits the volume-value adjusting routine RT11.

As described above, the two-dimensional coordinate system defining the volume space is divided into two areas, results of adjustment according to the volume values at the representative points of the respective areas are simultaneously displayed as two processed images, and the area in the volume space is reduced toward convergence each time the user selects a desired processed image. Thus, the user need not visually check processed images of all the levels (65,536 levels).

(7) Sixth Embodiment (7-1) Adjustment of Volume Values Based on Features Using Operation-History Information In a sixth embodiment of the present invention, in the video display 201 shown in FIG. 39, when the image-quality adjusting mode is selected, when the user adjusts the volume values on the resolution axis and the noise axis to desired values while maintaining correlation using the remote-control transmitter 206, the burden of user's operations can be further reduced based on specific regularity based on the relationship between features extracted from sequentially input frame images and past operation-history information.

The sixth embodiment will be described in the context of an example where a dynamic range (DR) is used as a feature. The dynamic range is used to evaluate the range in which the brightness of an object can be reproduced, by a numeric value representing how many times of amount of light relative to the amount of incident light as 100% can be reproduced.

First, with a video image displayed on the display screen of the display 205, when the image-quality adjusting mode is selected by a user's operation of the remote-control transmitter 206, the total decision unit 208 starts an operation-history maintaining routine RT12 shown in FIG. 51 from step SP160. Then, in step SP161, the total decision unit 208 calculates a value of dynamic range as a feature from sequentially input frame images. Then, in step SP162, the total decision unit 208 waits for input of user's operation for adjusting the volume values on the resolution axis and the noise axis.

Then, in step SP163, the total decision unit 208 cuts out half frames of a pre-adjusting image and a post-adjusting image obtained by image conversion by the first and second classification and adaptation processors 221A and 221B (FIG. 39), via the video memory 204, combines the results, and displays the resulting combined image on the display screen of the display 205.

Then, with the pre-adjusting image and the post-adjusting image simultaneously displayed, proceeding to step SP164, the total decision unit 208 determines whether the cancel button 209C of the operating unit 209 of the remote-control transmitter 206 has been pressed by the user.

When step SP164 turns out positive, it is indicated that the user intends to return to the volume values of the pre-adjusting image. Then, in step SP165, the total decision unit 208 exits the operation-history maintaining routine RT12.

On the other hand, when step SP164 turns out negative, proceeding to step SP166, the total decision unit 208 determines whether the enter button 209B of the operating unit 209 of the remote-control transmitter 206 has been pressed by the user.

When step SP166 turns out positive, it is indicated that the user is satisfied with the current volume values of the post-adjusting image. Then, in step SP167, the total decision unit 208 stores the value of dynamic range of a frame image calculated when the enter button 209B is pressed in the feature-history memory 224 (FIG. 39), reads operation-history information associated with the adjustment point representing the volume values for adjustment of the image quality of the post-adjusting image from the operation-history memory 225 (FIG. 39), and extracts the past selection count n (n is a natural number) of the adjustment point from the operation-history information.

When step SP167 turns out negative, returning to step SP161, the total decision unit 208 repeats the steps described above.

Then, in step SP168, the total decision unit 208 increments the past selection count n of the fixed adjustment point to (n+1), and stores the operation-history information of the adjustment point in the operation-history memory 225.

Then, in step SP169, volume values on the resolution axis and the noise axis corresponding to an adjustment point whose dynamic range is less than a predetermined threshold $TH_{DR}$ and whose current selection count is largest, i.e., whose frequency is highest (hereinafter referred to as first highest-frequency volume values), is included in the operation-history information of the adjustment point, and the total decision unit 208 stores the operation history-information in the operation-history memory 225.

Then, in step SP170, volume values on the resolution axis and the noise axis corresponding to an adjustment point whose dynamic range is greater than or equal to the predetermined threshold $TH_{DR}$ and whose current selection count is largest, i.e., whose frequency is highest (hereinafter referred to as second highest-frequency volume values), is included in the operation-history information of the adjustment point, and the total decision unit 208 stores the operation history-information in the operation-history memory 225.

Then, in step SP171, the total decision unit 208 stores the first and second highest-frequency volume values and their respective selection counts in the operation-history memory 225. Then, in step SP165, the total decision unit 208 exits the operation-history maintaining routine RT12.

As described above, according to the sixth embodiment, first and second highest-frequency volume values and their respective selection counts of an adjustment point representing volume values on the resolution axis and the noise axis of a fixed post-adjusting image can be attached to operation-history information of the adjustment point.

In the video display 201, when the user adjusts image quality using the remote-control transmitter 206, the user is allowed to achieve desired volume values on the resolution axis and the noise axis in a relatively short time based on specific regularity based on the relationship between features extracted from input frame images and past operation-history information.

Figure 52:
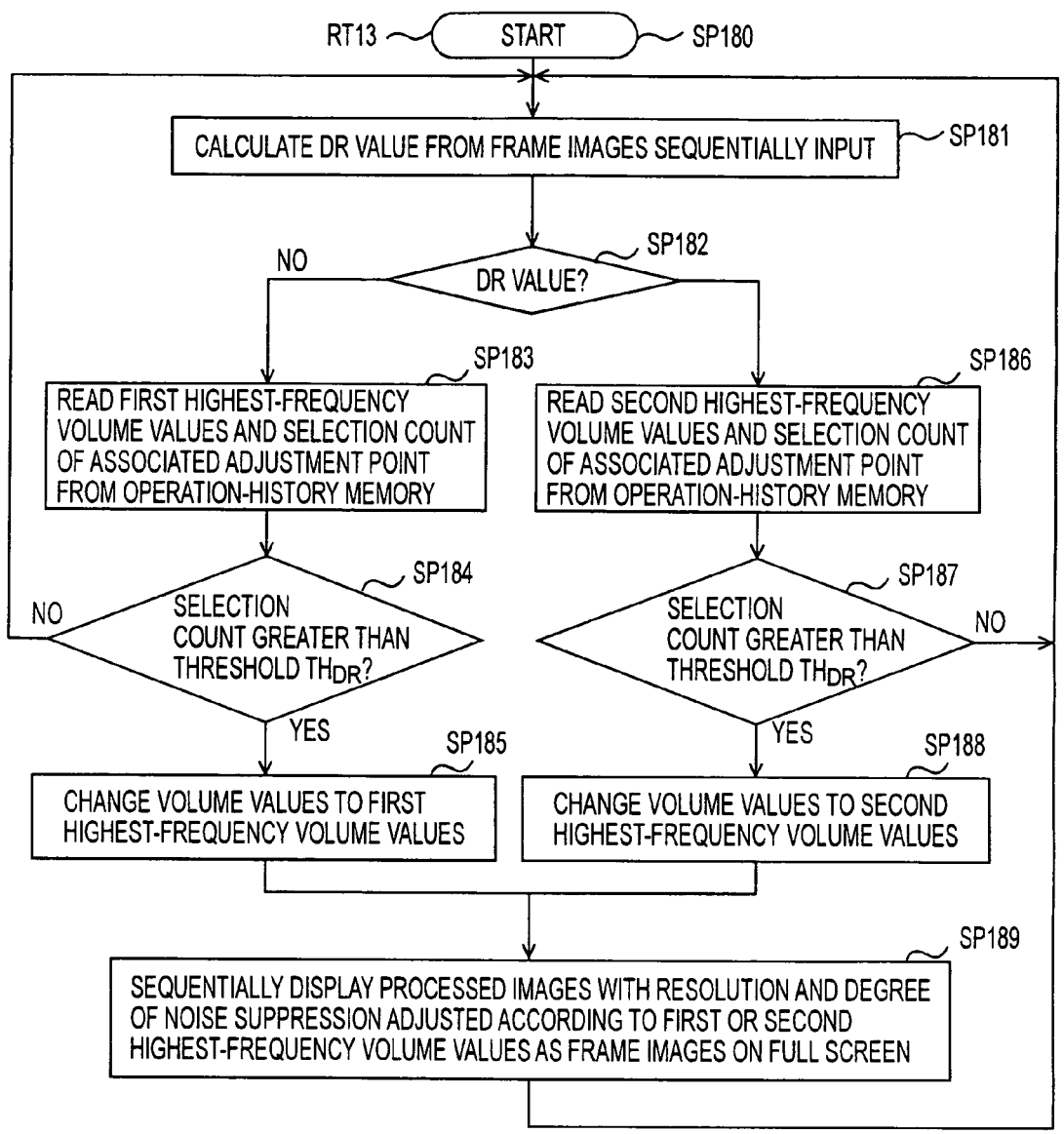
FIG. 52 is a flowchart of a volume-value adjusting routine according to the sixth embodiment.

First, with a video image displayed on the display screen of the display 205, when the image-quality adjusting mode is selected by a user's operation of the remote-control transmitter 206, the total decision unit 208 starts a volume-value adjusting routine RT13 shown in FIG. 52 from step SP180. Then, in step SP181, the total decision unit 208 calculates a value of dynamic range as a feature from sequentially input frame images. Then, in step SP182, the total decision unit 208 determines whether the value of dynamic range is less than the predetermined threshold $TH_{DR}$.

When it is determined in step SP182 that the value of dynamic range is less than the threshold $TH_{DR}$, proceeding to step SP183, the total decision unit 208 reads operation-history information associated with an adjustment point representing the volume values for adjustment of the image quality of the current post-adjusting image from the operation-history memory 225 (FIG. 39), and extracts the first highest-frequency volume values and the selection count of the associated adjustment point.

Then, in step SP184, the total decision unit 208 determines whether the selection count of the adjustment point representing the volume values for adjustment of the image quality of the post-adjusting image is greater than a predetermined threshold TH. When step SP184 turns out positive, proceeding to step SP185, the total decision unit 208 changes the volume values to the first highest-frequency volume values. On the other hand, when step SP184 turns out positive, returning to step SP181, the total decision unit 208 repeats the steps described above.

When it is determined in step SP182 that the value of dynamic range is greater than the threshold THDR, proceeding to step SP186, the total decision unit 208 reads operation-history information associated with the adjustment point representing the volume values for adjustment of the image quality of the current post-adjusting image from the operation-history memory 225 (FIG. 39), and extracts the second highest-frequency volume values and the selection count of the associated adjustment point.

Then, in step SP187, the total decision unit 208 determines whether the selection count of the adjustment point representing the volume values for adjustment of the image quality of the post-adjusting image is greater than the predetermined threshold TH. When step SP187 turns out positive, proceeding to step SP188, the total decision unit 208 changes the volume values to the second highest-frequency volume values. On the other hand, when step SP187 turns out negative, returning to step SP181, the total decision unit 208 repeats the steps described above.

In step SP189, the total decision unit 208 sequentially displays processed images with resolution and degree of noise suppression adjusted according to the fixed first or second high-frequency volume values (post-adjusting images) as frame images on the full display screen of the display 205. Then, returning to step SP181, the total decision unit 208 repeats the steps described above while sequentially monitoring input frame images until an operation for exiting is entered by the user.

As described above, according to the sixth embodiment, when the user adjusts image quality using the remote-control transmitter 206, by automatically considering regularity, for example, the user frequently uses the first highest-frequency volume values if the dynamic range of an input frame image is relatively small while the user frequently uses the second highest-frequency volume values if the dynamic range is relatively large, the user is allowed to naturally obtain processed images with adjusted image quality desired by the user in a relatively short time.

In the sixth embodiment, alternatively, the automatic judgment based on such regularity may be performed on an arbitrary part of an input image, displaying a processed image in which image quality of only the corresponding part is adjusted by appropriate volume values for the user.

(8) Operations and Advantages According to the Third to Sixth Embodiments

According to the third embodiment, in the video display 201, before executing image conversion by classification and adaptation, a pre-adjustment image before starting adjustment of the volume values on the resolution axis and the noise axis and a post-adjustment image after the adjustment are simultaneously displayed on the display screen of the display 205 so that the user can readily adjust image quality by directly comparing these images that are simultaneously displayed. Accordingly, the user is allowed to adjust image quality efficiently by adjusting the volume values. Furthermore, the user is allowed to readily find volume values corresponding to an image quality that the user individually desires.

Furthermore, since the result of adjusting image quality is reflected on an output image based on an operation of the remote-control transmitter 206 only when the user is satisfied with the processed image after adjusting image quality, it is possible to prevent inappropriate operation-history information not wanted or intended by the user when signal processing is performed using past operation-history information or the like.

Furthermore, in the video display 201, a plurality of classification and adaptation processors 221 (221A, 221B, ...) is provided in the signal processor 203. Thus, with regard to a plurality of processed images that are adjusted according to different volume values on the resolution axis and the noise axis, a difference feature such as an average of difference values, variance, dynamic range, or correlation can be calculated in real time. Thus, compared with the case where two-screen display is implemented using a single classification and adaptation processor, the processing rate need not be twice as fast as the real-time rate, and the volume values for adjustment of image quality can be adjusted arbitrarily even during processing of one screen.

According to the fourth embodiment, when the user adjust image quality using the remote-control transmitter 206, smaller step sizes for the volume values are set in areas where the frequency of selection by the user in the volume space is higher. Thus, each time the user presses the cursor button 209D in a desired direction, the volume values on the resolution axis and the noise axis can be approximated to values desired by the user in a relatively short time, and delicate adjustment is allowed in the vicinity of the desired values.

According to the fifth embodiment, the two-dimensional coordinate system defining the volume space is divided into two areas, and results of adjustment according to volume values at representative points of the respective areas are simultaneously displayed as two processed images. Each time the user selects a desired processed image, the area in the volume space is narrowed toward convergence. Thus, the laboriousness for the user of adjusting the volume values on the resolution axis and the noise axis while visually checking all the processed images adjusted according to all the volume values is considerably alleviated.

According to the sixth embodiment, when the user adjusts image quality using the remote-control transmitter 206, if the dynamic range of an input frame image is relatively small, by automatically considering regularity, for example, the user frequently uses the first highest-frequency volume values if the dynamic range of an input frame image is relatively small while the user frequently uses the second highest-frequency volume values if the dynamic range is relatively large, the user is allowed to naturally obtain processed images with adjusted image quality desired by the user in a relatively short time.

(9) Other Embodiments

The third to sixth embodiments have been described above in the context of the video display apparatus shown in FIG. 39, without limitation thereto, applications to various image processing apparatuses that execute predetermined image processing on an image that is based on video signals supplied are possible.

Furthermore, although the third to sixth embodiments have been described above in the context of cases where a plurality of classification and adaptation processors 221 (221A, 221B, . . . ) is provided in the signal processor 203 shown in FIG. 39 as a plurality of image converting means that executes image conversion on each frame image of a video image through a plurality of processing lines, without limitation thereto, applications to various other types of a plurality of image converting means for other types of image conversion are possible.

Furthermore, although the third to sixth embodiments have been described above in the context of cases where the display 205 in the video display 201 shown in FIG. 39 is used as video display means that displays, on a frame basis, processed images obtained by image conversion by the plurality of classification and adaptation processors (image converting means) 221 so that all the processed images are entirely or partially included in the display screen, without limitation thereto, applications to various other types of video display means are possible.

Furthermore, although the third to sixth embodiments have been described above in the context of cases where the remote-control transmitter 206 linked by wireless to the video display 201 is used as operation inputting means for specifying one of a plurality of processed images simultaneously displayed on the display 205 (video display means) by an external operation and setting a volume value representing a degree of adjustment of the image quality of the specified processed image, without limitation thereto, an operation panel or the like corresponding to the one provided on the remote-control transmitter 206 may be directly mounted on the video display 201.

Furthermore, although the third to sixth embodiments have been described in the context of cases where the total decision unit 208, the plurality of classification and adaptation processors 221, and the video memory 204 provided in the signal processor 203 shown in FIG. 39 are used as display setting means for adjusting the image quality of a processed image specified using the remote-control transmitter (operation inputting means) 206 according to a volume value set for the processed image and displaying the resulting image on the display (video display means) 205 on a frame basis, without limitation thereto, applications to various other types of display setting means are possible.

Furthermore, the sixth embodiment has been described above in the context of a case where the display setting means (mainly the total decision unit 208) includes the operation-history memory 225 (storage means) for storing frequencies representing the numbers of times that respective volume values have been set using the remote-control transmitter (operation inputting means) 206 as volume values representing degrees of adjustment of image quality in a volume space in which a plurality of types of adjustment of image quality is allowed, and when desired volume values are set using the remote-control transmitter (operation inputting means) 206, the frequencies of the respective volume values are read from the operation-history memory 225 (storage means), and smaller step sizes are set for the volume values as the frequencies become higher while larger step sizes are set for the volume values as the frequencies become lower. However, without limitation thereto, step sizes for the volume values may be adjusted by various other arrangements as long as the volume values representing the degree of adjustment of image quality can be approximated to values desired by the user in a relatively short time each time the user performs a predetermined operation for adjusting the volume values and delicate adjustment is allowed in the vicinity of the desired values.

Furthermore, the fifth embodiment has been described above in the context of a case where the display setting means (mainly the total decision unit 208) divides a multi-dimensional coordinate system into two areas, the multi-dimensional coordinate system being defined by two adjustment axes for adjusting volume values relating to adjustment of image quality in a volume space in which a plurality of types of adjustment of image quality is allowed, and adjusts image quality by setting volume values at representative points of the respective areas, the display 205 (video display means) simultaneously displays the two processed images whose image qualities have been adjusted according to the volume values, and each time one of the two processed images is specified using the remote-control transmitter 206 (operation inputting means), the display 205 (video display means) further divides one of the areas associated with the specified processed image into two areas, narrowing the area in the two-dimensional coordinate space so that the volume values converge. However, without limitation thereto, three adjustment axes in a three-dimensional coordinate system may be used. Furthermore, the number of divided areas in the multi-dimensional coordinate system may be three or more. That is, applications to various other arrangements are possible as long as the laboriousness for the user of adjusting the volume values while visually checking all the processed images adjusted according to all the values on the resolution axes can be considerably alleviated.

Furthermore, the sixth embodiment has been described above in the context of a case where the feature extractor 220 (feature extracting means) for extracting a feature of each frame image constituting the video image, the operation-history memory 225 (storage means) for storing frequencies representing the number of times that respective volume values have been set using the remote-control transmitter 206 (operation inputting means) as volume values representing degrees of adjustment of image quality in a volume space in which a plurality of types of adjustment of image quality is allowed, and the total decision unit 208 (determining means) for determining regularity that is based on the feature of each frame image extracted by the feature extractor (feature extracting means) 220 and the respective volume values stored in the operation-history memory 225 (storage means) are provided, the total decision unit 208 (determining means) selectively reading volume values associated with the feature from the operation-history memory 225 (storage means) based on the regularity. However, without limitation thereto, instead of dynamic range, for example, a statistical amount such as an average or variance of frame image, auto-correlation, histogram, or the number of edges having gradients not less than a certain value in a frame image may be used as a feature. That is, applications to various arrangements are possible as long as the user is allowed to naturally obtain a processed image adjusted to an image quality desired by the user in a relatively short time.

According to the embodiments described above, a video processing apparatus for executing predetermined video processing on a video image that is based on video signals supplied includes a plurality of image converting means for executing image conversion on each frame image of the video image through a plurality of processing lines; video display means for displaying, on a frame basis, a plurality of processed images obtained by the image conversion by the plurality of image converting means, so that all the plurality of processed images are entirely or partially included simultaneously in a display screen; operation inputting means for specifying, by an external operation, one of the plurality of processed images simultaneously displayed on the video display means, and for setting a volume value representing a degree of adjustment of image quality for the specified processed image; and display setting means for adjusting the image quality of the processed image specified using the operation inputting means according to the volume value set for the processed image, and for displaying the resulting processed image on a frame basis on the video display means. Accordingly, a user is allowed to readily adjust image quality by directly comparing images that are displayed simultaneously. Thus, the video processing apparatus readily allows adjustment of the degree of image processing in accordance with user's preferences.

Furthermore, according to the embodiments described above, a video processing method for executing predetermined image processing on a video image that is based on video signals supplied includes the steps of executing image conversion on each frame image of the video image through a plurality of processing lines; displaying, on a frame basis, a plurality of processed images obtained by the image conversion through the plurality of processing lines, so that all the plurality of processed images are entirely or partially included simultaneously in a display screen; and when one of the plurality of processed images simultaneously displayed in the display screen is specified by an external operation and a volume value representing a degree of adjustment of image quality for the specified processed image is set, adjusting the image quality of the processed image according to the volume value set for the processed image, and displaying the resulting processed image on a frame basis in the display screen. Accordingly, a user is allowed to readily adjust image quality by directly comparing images that are displayed simultaneously. Thus, the video processing method readily allows adjustment of the degree of image processing in accordance with user's preferences.

Image processing apparatuses and image processing methods according to the embodiments can be applied to video apparatuses such as other display apparatuses having display screens that allow video display, as well as television receivers.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for executing predetermined image processing on an original image that is based on supplied image signals, the image processing apparatus comprising:
    display means for displaying a plurality of adjusting images, each of the adjusting images corresponding to a part or an entirety of the original image;
    setting means for setting values of a plurality of parameters defining respective degrees of the image processing for the adjusting images such that the values differ among the plurality of adjusting images; and
    operating means for specifying one of the adjusting images by an external operation, wherein
    when one of the adjusting images is specified using the operating means, the setting means, with reference to a degree of the image processing for the specified one of the adjusting images and to a number of iterations of specifying an adjusting image, modifies the values of the plurality of parameters defining the respective degrees of the image processing for the other adjusting images so that the values for the other adjusting images are approximated to the values for the specified one of the adjusting images, and
    the display means displays the adjusting images according to the respective degrees of the image processing modified by the setting means.

2. The image processing apparatus according to claim 1, wherein each time one of the adjusting images is specified using the operating means, the setting means converges the values of the plurality of parameters defining the degrees of the image processing for the adjusting images other than the specified adjusting image in proportion to a number of times of the specification.

3. The image processing apparatus according to claim 1,
    wherein the display means simultaneously displays icons representing the values of the plurality of parameters defining the respective degrees of the image processing for the adjusting images, the values being set by the setting means, and
    when one of the adjusting images is specified using the operating means, the setting means moves the displayed icons associated with the adjusting images other than the specified adjusting image, in accordance with the respective degrees of the image processing.

4. The image processing apparatus according to claim 1,
    wherein the operating means includes a display configured to simultaneously display icons representing the values of the plurality of parameters defining the respective degrees of the image processing for the adjusting images, the values being set by the setting means, and
    when one of the adjusting images is specified, the display moves the displayed icons associated with the adjusting images other than the specified adjusting image, in accordance with the respective degrees of the image processing.

5. An image processing method for executing predetermined image processing on an original image that is based on supplied image signals, the image processing method comprising:
    displaying a plurality of adjusting images corresponding to a part or an entirety of the original image, and setting values of a plurality of parameters defining respective degrees of the image processing for the adjusting images such that the values differ among the plurality of adjusting images;

modifying, when one of the adjusting images is specified by an external operation, the values of the plurality of parameters defining the respective degrees of the image processing for the other adjusting images with reference to a degree of the image processing for the specified one of the adjusting images and to a number of iterations of specifying an adjusting image so that the values for the other adjusting images are approximated to the values for the specified one of the adjusting images; and displaying the adjusting images according to the respective modified degrees of the image processing.

6. A video processing apparatus for executing predetermined video processing on a video image that is based on supplied video signals, the video processing apparatus comprising:

a plurality of image converting means for executing image conversion on each frame image of the video image through a plurality of processing lines;

video display means for displaying, on a frame basis, a plurality of processed images obtained by the image conversion by the plurality of image converting means, so that all of the processed images are entirely or partially included simultaneously in a display screen;

operation inputting means for specifying, by an external operation, one of the processed images simultaneously displayed on the video display means, and for setting a volume value representing a degree of adjustment of image quality for the specified one of the processed images; and display setting means for adjusting the image quality of the specified one of the processed images according to the volume value set for the specified one of the processed images and to a number of iterations of specifying a processed image, and for displaying a resulting processed image on a frame basis on the video display means.

7. A video processing apparatus for executing predetermined video processing on a video image that is based on video signals supplied, the video processing apparatus comprising:

a plurality of image converting means for executing image conversion on each frame image of the video image through a plurality of processing lines;

video display means for displaying, on a frame basis, a plurality of processed images obtained by the image conversion by the plurality of image converting means, so that all the plurality of processed images are entirely or partially included simultaneously in a display screen;

operation inputting means for specifying, by an external operation, one of the plurality of processed images simultaneously displayed on the video display means, and for setting a volume value representing a degree of adjustment of image quality for the specified processed image; and display setting means for adjusting the image quality of the processed image specified using the operation inputting means according to the volume value set for the processed image, and for displaying the resulting processed image on a frame basis on the video display means, wherein the display setting means includes storage means for storing frequencies representing the numbers of times that respective volume values have been set using the operation inputting means as volume values representing degrees of adjustment of image quality in a volume space in which a plurality of types of adjustment of image quality is allowed, and when desired volume values are set using the operation inputting means, the frequencies of the respective volume values are read from the storage means, and smaller step sizes are set for the volume values as the frequencies become higher while larger step sizes are set for the volume values as the frequencies become lower.

8. A video processing apparatus for executing predetermined video processing on a video image that is based on video signals supplied, the video processing apparatus comprising:

a plurality of image converting means for executing image conversion on each frame image of the video image through a plurality of processing lines;

video display means for displaying, on a frame basis, a plurality of processed images obtained by the image conversion by the plurality of image converting means, so that all the plurality of processed images are entirely or partially included simultaneously in a display screen;

operation inputting means for specifying, by an external operation, one of the plurality of processed images simultaneously displayed on the video display means, and for setting a volume value representing a degree of adjustment of image quality for the specified processed image; and display setting means for adjusting the image quality of the processed image specified using the operation inputting means according to the volume value set for the processed image, and for displaying the resulting processed image on a frame basis on the video display means, wherein the display setting means divides a multi-dimensional coordinate system into a plurality of areas, the multi-dimensional coordinate system being defined by a plurality of adjustment axes for adjusting volume values relating to adjustment of image quality in a volume space in which a plurality of types of adjustment of image quality is allowed, and adjusts image quality by setting volume values at representative points of the respective areas, the video display means simultaneously displays the plurality of processed images whose image qualities have been adjusted according to the volume values, and each time one of the plurality of processed images is specified using the operation inputting means, the video display means further divides one of the areas associated with the specified processed image into a plurality of areas, narrowing the area in the multi-dimensional coordinate space so that the volume values converge.

9. A video processing apparatus for executing predetermined video processing on a video image that is based on video signals supplied, the video processing apparatus comprising:

a plurality of image converting means for executing image conversion on each frame image of the video image through a plurality of processing lines;

video display means for displaying, on a frame basis, a plurality of processed images obtained by the image conversion by the plurality of image converting means, so that all the plurality of processed images are entirely or partially included simultaneously in a display screen;

operation inputting means for specifying, by an external operation, one of the plurality of processed images simultaneously displayed on the video display means, and for setting a volume value representing a degree of adjustment of image quality for the specified processed image;

display setting means for adjusting the image quality of the processed image specified using the operation inputting means according to the volume value set for the processed image, and for displaying the resulting processed image on a frame basis on the video display means;

feature extracting means for extracting a feature of each frame image constituting the video image;

storage means for storing frequencies representing the number of times that respective volume values have been set using the operation inputting means as volume values representing degrees of adjustment of image quality in a volume space in which a plurality of types of adjustment of image quality is allowed; and determining means for determining regularity that is based on the feature of each frame image extracted by the feature extracting means and the respective volume values stored in the storage means, wherein the determining means selectively reads volume values associated with the feature from the storage means based on the regularity.

10. A video processing method for executing predetermined image processing on a video image that is based on supplied video signals, the video processing method comprising:

executing image conversion on each frame image of the video image through a plurality of processing lines;

displaying, on a frame basis, a plurality of processed images obtained by the image conversion through the plurality of processing lines, so that all the plurality of processed images are entirely or partially included simultaneously in a display screen; and adjusting, when one of the plurality of processed images simultaneously displayed in the display screen is specified by an external operation and a volume value representing a degree of adjustment of image quality for the specified one of the processed images is set, the image quality of the specified one of the processed images according to the volume value set for the specified one of the processed images and to a number of iterations of specifying a processed image, and displaying a resulting processed image on a frame basis in the display screen.

11. An image processing apparatus for executing predetermined image processing on an original image that is based on supplied image signals, the image processing apparatus comprising:

a display unit configured to display a plurality of adjusting images, each of the adjusting images corresponding to a part or an entirety of the original image;

a setting unit configured to set values of a plurality of parameters defining respective degrees of the image processing for the adjusting images such that the values differ among the plurality of adjusting images; and an operating unit configured to specify one of the adjusting images by an external operation, wherein when one of the adjusting images is specified using the operating unit, the setting unit, with reference to a degree of the image processing for the specified one of the adjusting images and to a number of iterations of specifying an adjusting image, modifies the values of the plurality of parameters defining the respective degrees of the image processing for the other adjusting images so that the values for the other adjusting images are approximated to the values for the specified one of the adjusting images, and the display unit is configured to display the adjusting images according to the respective degrees of the image processing modified by the setting unit.

12. A video processing apparatus for executing predetermined video processing on a video image that is based on supplied video signals, the video processing apparatus comprising:

a plurality of image conversion units configured to execute image conversion on each frame image of the video image through a plurality of processing lines;

a video display unit configured to display, on a frame basis, a plurality of processed images obtained by the image conversion by the plurality of image conversion units, so that all of the processed images are entirely or partially included simultaneously in a display screen;

an operation inputting unit configured to allow specification, by an external operation, of one of the processed images simultaneously displayed on the video display unit, and to set a volume value representing a degree of adjustment of image quality for the specified one of the processed images; and a display setting unit configured to adjust the image quality of the specified one of the processed images according to the volume value set for the specified one of the processed images and to a number of iterations of specifying a processed image, and to display a resulting processed image on a frame basis on the video display unit.

* * * * *